(12) United States Patent
Sekelja et al.

(10) Patent No.: US 12,462,898 B2
(45) Date of Patent: Nov. 4, 2025

(54) METHOD FOR SELECTING NEOEPITOPES

(71) Applicant: Nykode Therapeutics ASA, Oslo (NO)

(72) Inventors: Monika Sekelja, Oslo (NO); Karoline Schjetne, Lommedalen (NO); Agnete Brunsvik Fredriksen, Rælingen (NO)

(73) Assignee: Nykode Therapeutics ASA, Oslo (NO)

( * ) Notice: Subject to any disclaimer, the term of this patent is extended or adjusted under 35 U.S.C. 154(b) by 1127 days.

(21) Appl. No.: 17/279,946

(22) PCT Filed: Sep. 27, 2019

(86) PCT No.: PCT/EP2019/076210
§ 371 (c)(1),
(2) Date: Mar. 25, 2021

(87) PCT Pub. No.: WO2020/065023
PCT Pub. Date: Apr. 2, 2020

(65) Prior Publication Data
US 2021/0388438 A1    Dec. 16, 2021

(30) Foreign Application Priority Data
Sep. 27, 2018 (EP) ..................................... 18197172

(51) Int. Cl.
*G16B 20/30* (2019.01)
*A61K 39/00* (2006.01)
*G16B 20/20* (2019.01)

(52) U.S. Cl.
CPC .......... *G16B 20/30* (2019.02); *A61K 39/0011* (2013.01); *G16B 20/20* (2019.02)

(58) Field of Classification Search
CPC .... G16B 20/30; G16B 20/20; A61K 39/0011; C40B 30/04; C12Q 1/6881; C12Q 1/6886
See application file for complete search history.

(56) References Cited

U.S. PATENT DOCUMENTS

| | | |
|---|---|---|
| 2016/0331821 A1 | 11/2016 | Levey et al. |
| 2017/0016075 A1 | 1/2017 | Velculescu et al. |

FOREIGN PATENT DOCUMENTS

| | | |
|---|---|---|
| EP | 3 053 592 A1 | 8/2016 |
| WO | WO 2011/143656 | 11/2011 |
| WO | WO 2012/159754 | 11/2012 |
| WO | WO 2014/082729 | 6/2014 |
| WO | WO 2014/168874 | 10/2014 |
| WO | WO 2014/180490 | 11/2014 |
| WO | WO 2016/015095 | 2/2016 |
| WO | WO 2016/040900 | 3/2016 |
| WO | WO 2016/090177 | 6/2016 |
| WO | WO 2016/128060 | 8/2016 |
| WO | WO 2016/128376 A1 | 8/2016 |
| WO | WO 2017/011660 | 1/2017 |
| WO | WO 2017/106638 | 6/2017 |
| WO | WO 2018/136664 A1 | 7/2018 |
| WO | WO2019/048936 | 3/2019 |

OTHER PUBLICATIONS

Grodeland et al.: "Targeting of HA to chemokine receptors induces strong and cross-reactive T cell responses after DNA vaccination in pigs," Vaccine, 38, 1280-1285 (Feb. 2020).
Andreatta, Massimo et al., "Accurate pan-specific prediction of peptide-MHC class II binding affinity with improved binding core identification", Immunogenetics, Nov. 2015; 67(0);641-650.
Brown et al., 2014, Genome research 24(5): 743-750.
Castle, John C., et al., "Exploiting the Mutanome for Tumor Vaccination", American Association for Cancer research, 2012, downloaded from www.aacrjournals.org.
Dobin, Alexander et al., "STAR: ultrafast universal RNA-seq aligner", Bioinformatics, vol. 29, No. 1, 2013, p. 15-21.
Duan Fei et al., "Genomic and bioinformatic profiling of mutational neoepitopes reveals new rules to predict anticancer immunogenicity", The Journal of Experimental Medicine, Rockfeller University Press, US, vol. 211, No. 11, Oct. 20, 2014, p. 2231-2248, XP002757114.
Dutton, G. (2016) "From DNA to Diagnosis without Delay. Purpose-Built for Genomics, Dragen Processor Could Form Core of Clinic-Ready Data Systems." Genet Eng Biotechn N. 36 (5): 8-9.
Fritsch, Edward F. et al., "HLA-Binding Properties of Tumor Neoepitopes in Humans", Cancer Immunology Research, 2(6) Jun. 2014, American Association for Cancer Research.
Gubin, Matthew M. et al., "Tumor neoantigens: building a framework for personalized cancer immunotherapy", The Journal of Clinical Investigation, vol. 125, No. 9, Sep. 2015.
Henikoff, S; Henikoff, JG (1992). "Amino acid substitution matrices from protein blocks". Proceedings of the National Academy of Sciences of the United States of America. 89 (22): 10915-9.
Jurtz, Vanessa et al., "NetMHCpan-4.0: Improved Peptide-MHC Class I Interaction Predictions Integrating Eluted Ligand and Peptide Binding Affinity Data", The Journal of Immunology, 2017.
Kreiter et al—Correction and Amendment to "Mutant MHC class II epitopes drive therapeutic immune responses to cancer" Nature. Apr. 30, 2015;520(7549):692-6.
Kreiter, Sebastian et al., "Mutant MHC class II epitopes drive therapeutic immune responses to cancer", Nalure, Apr. 30, 2015; 520(7549).
Miller, Neil A. et al., "A 26-hour system of highly sensitive whole genome sequencing for emergency management of genetic diseases", Genome Medicine (2015) 7:100.
Nielsen, Morten and Andreatta, Massimo, "NetMHCpan-3.0; improved prediction of biinding to MHC class I molecules integrating information from multiple receptor and peptide length datasets", Genome Medicine, 2016, 8:33.

(Continued)

*Primary Examiner* — Soren Harward
*Assistant Examiner* — Dawn Bickham
(74) *Attorney, Agent, or Firm* — Womble Bond Dickinson (US) LLP

(57) ABSTRACT

The present invention relates to a method for selecting neoepitopes for an individual, by selecting MHC I and/or MHC II binding neoepitopes and ranking them with respect the methods as described herein.

20 Claims, 19 Drawing Sheets
Specification includes a Sequence Listing.

(56) References Cited

OTHER PUBLICATIONS

Nielsen, Morten et al., "The role of the proteasome in generating cytotoxic T-cell epitopes: insights obtained from improved predictions of proteasomal cleavage", Immunogenetics, 2005, 57; 33-41.
Ott, Patrick A., "An immunogenic personal neoantigen vaccine for patients with melanoma", Nature, Nature publishing group, United Kingdom, vol. 547, No. 7662, Jul. 13, 2017, p. 217, XP002785348, ISSN: 1476-4687.
Rasmussen, Michael et al., Pan-Specific Prediction of peptide-MHC Class I Complex Stability, a Correlate of T Cell Immunogenicity, J. Immunol, 2016, 197:1517-1524.
Rubinsteyn, Alex et al.: "Computational Pipeline for the PGV-001 Neoantigen Vaccine Trial", Frontiers in Immunology, vol. 8, Jan. 18, 2018, XP55519329.
Schmidt J et al. J Biol Chem. Jul. 14, 2017;292(28):11840-11849. doi: 10.1074/jbc.M117.789511. Epub May 23, 2017. In silico and cell-based analyses reveal strong divergence between prediction and observation of T-cell-recognized tumor antigen T-cell epitopes.
Uhlén, M. et al. (2015) "Proteomics. Tissue-based map of the human proteome." Science;347(6220).
Van der Auwera G.A. et al. (2013) "From FastQ data to high confidence variant calls: the Genome Analysis Toolkit best practices pipeline." Curr Protoc Bioinformatics. 43.
VUZMAn, D. et al., "Utilityof comprehensive genomic profiling (CGP) for personal cancer vaccine development via neoantigen analysis", Journal of Clinical Oncology, Jun. 1, 2018, XP055571295.
Zhang X et al. Cancer Immunol Res. Jul. 2017;5(7):516-523. doi: 10.1158/2326-6066.CIR-16-0264. Epub Jun. 15, 2017. Breast Cancer Neoantigens Can Induce CD8+ T-Cell Responses and Antitumor Immunity.

FIG. 5

METHOD FOR SELECTING NEOEPITOPES

CROSS-REFERENCE TO RELATED APPLICATIONS

This application is a national stage filing under 35 U.S.C. 371 of PCT/EP2019/076210 filed Sep. 27, 2019, which International Application was published by the International Bureau in English on Apr. 2, 2020, and application claims priority from European Application No. 18197172.2, filed Sep. 27, 2018, which applications are hereby incorporated in their entirety by reference in this application.

TECHNICAL FIELD

The present invention relates to a method for selecting neoepitopes for an individual, by selecting MHC I and/or MHC II binding neoepitopes and ranking them with respect to their clinical utility. The present invention also provides cancer vaccines obtained by the methods as described herein.

BACKGROUND

Although treatment of cancer has been improved over the past few decades in particular due to early detection and diagnosis, which has significantly increased the survival, only about 60% of patients diagnosed with cancer are alive 5 years after the diagnosis.

Most of the cancer treatments in use are surgical procedures, radiation and cytotoxic chemotherapeutics. However they all have serious side effects. Recently also treatment using antibodies directed towards known cancer associated antigens or immunomodulatory molecules have been used.

Within the last few years cancer immune therapies targeting cancer cells with the help of the patient's own immune system, e.g. cancer vaccines, have attracted interest because such therapies may reduce or even eliminate some of the side-effects seen in the traditional cancer treatment.

The foundation of immunology is based on discrimination between self and non-self. Most of the pathogens inducing infectious diseases contain molecular signatures that can be recognized by the host and trigger immune responses. However tumor cells are derived from normal cells, and do not generally express any foreign molecular signatures, making them more difficult to be distinguished from normal cells.

Nevertheless, most tumor cells express different types of tumor antigens. One class of tumor antigens are the so-called tumor associated antigens, e.g. antigens expressed at low levels in normal tissues and expressed at a much higher level in tumor tissue. Such tumor associated antigens have been the target for cancer vaccines for the last decade. However, immunological treatment directed towards tumor associated antigens exhibit several challenges, in that the tumor cells may evade the immune system by down regulating the antigen in question, and the treatment may also lead to toxicities due to normal cell destruction.

Recently, another class of tumor antigens have been identified, the so-called tumor neoantigens which are tumor specific-antigens. Tumor neoantigens arise due to one or more mutations in the tumor genome leading to a change in the amino acid sequence of the protein in question. Since these mutations are not present in normal tissue, the side-effects of the treatment directed towards the tumor-specific neoantigens do not arise with an immunologic treatment towards tumor neoantigens.

However, to create efficient vaccines it is important that the most immunogenic neoepitopes are selected and used for the vaccine.

SUMMARY

The inventors of the present invention have developed a neoepitope selection process to select neoepitopes that have properties proven to be important for immunogenicity. By using this method, the highly immunogenic neoepitopes predicted to bind the major histocompatibility complex (MHC) can be selected for vaccines thereby resulting in vaccines capable of inducing a strong and robust immune-response. Vaccines suitable for personalised cancer therapy may thus be generated. Herein are thus provided methods for ranking neoepitopes according to their clinical utility, which are particularly suitable in the context of producing personalised vaccines for cancer therapy.

Accordingly, the present invention relates to a method for selecting a number A of neoepitopes for an individual, said method comprising the steps of:
a. Obtaining one or more neoepitopes from said individual, each neoepitope comprising at least one minimal epitope, wherein each neoepitope comprises at least one mutation such as an immunogenic mutation compared to a reference sequence;
b. Determining MHC I and/or MHC II binding affinity for at least one minimal epitope, such as at least two, three or four minimal epitopes within each of said neoepitopes;
c. Selecting neoepitopes comprising at least one minimal epitope predicted to bind to MHC I and/or to MHC II, thereby obtaining MHC binding neoepitopes;
d. ranking the MHC binding neoepitopes with respect to their likelihood of clinical utility;
e. Selecting A neoepitopes among the highest ranking MHC binding neoepitopes,
thereby selecting A neoepitopes having clinical utility.

Also provided is a method for selecting a number A of neoepitopes for an individual, said method comprising the steps of:
a. Obtaining one or more neoepitopes from said individual, each neoepitope comprising at least one minimal epitope, wherein each neoepitope comprises at least one mutation such as an immunogenic mutation compared to a reference sequence;
b. Determining MHC I binding affinity for each of said neoepitopes, and determining the number of MHC I binding minimal epitopes for each of said neoepitopes;
c. Ranking the neoepitopes as follows:
 i. prioritizing neoepitopes comprising a high number of minimal epitopes binding to MHC I and/or MHC II and selecting a first group of neoepitopes having a high score;
 ii. optionally, prioritizing neoepitopes from the first group of neoepitopes as follows:
  1) if the mutation is in an anchoring position and the binding differential of the minimal epitope is equal to or greater than 20, the minimal epitope has the highest score;
  2) if the mutation is in a non-anchoring position and the binding differential of the minimal epitope is equal to or greater than 20, the score of the minimal epitope is lower than the score for the minimal epitopes of 1;
  3) if the mutation is in an anchoring position and the binding differential of the minimal epitope is lower than 20 and equal to or greater than 3, the score of the minimal epitope is lower than the score the minimal epitopes of 2);

4) if the mutation is in a non-anchoring position and the binding differential of the minimal epitope is lower than 20 and equal to or greater than 3, the score of the minimal epitope is lower than the score the minimal epitopes of 3);

5) if the mutation is in an anchoring position and the binding differential of the minimal epitope is less than 3 and equal to or greater than 1, the score of the minimal epitope is lower than the score of the minimal epitopes of 4);

6) if the mutation is in a non-anchoring position and the binding differential of the minimal epitope is less than 3 and equal to or greater than 1, the score of the minimal epitope is lower than the score of the minimal epitopes of 5);

7) if the minimal epitope has a mutation with a binding differential lower than 1, regardless of the position of the mutation, the minimal epitope has the lowest score;

wherein the MHC I binding differential is given by the formula (% Rank score (MHC I) for reference)/(% Rank score (MHC I) for minimal epitope); and selecting a second group of neoepitopes having a high score;

iii. optionally, prioritizing neoepitopes from the second group based on their MHC I % Rank score and selecting a third group of neoepitopes having a low MHC I % Rank score;

iv. optionally, selecting a fourth group of neoepitopes from the second or the third group including minimal epitopes with high resemblance to epitopes known to be recognized by T cells, v. optionally, prioritizing neoepitopes from the second group, from the third group or from the fourth group based on their BLOSUM threshold is ranked higher than a BLOSUM score equal to or greater than said threshold, and selecting a fifth group of neoepitopes having a BLOSUM score less than said threshold, wherein said threshold preferably is 1;

vi. optionally, selecting neoepitopes from the first, second, third, fourth or fifth group of neoepitopes based on the neoepitopes being found in two or more samples, and selecting a sixth group of neoepitopes found in two or more samples;

vii. optionally, selecting neoepitopes from the first, second, third, fourth, fifth or sixth group of neoepitopes based on the identification of the mutation by at least two different variant callers, and selecting a seventh group of neoepitopes comprising a mutation identified by at least two different variant callers, wherein the first, second, third, fourth, fifth, sixth or seventh group of neoepitopes comprises said A neoepitopes.

Also provided is a method of preparing a cancer vaccine comprising neoepitopes, said method comprising a step of selecting said neoepitopes using the methods described herein.

Also described herein is a cancer vaccine obtainable by the methods described herein.

Also provided is a method for selecting a number A of neoepitopes for an individual, said method comprising the steps of:

a. Obtaining one or more neoepitopes from said individual, each neoepitope comprising at least one minimal epitope, wherein each neoepitope comprises at least one mutation such as an immunogenic mutation compared to a reference sequence;
b. Determining MHC I and/or MHC II binding affinity for each of said neoepitopes;
c. Selecting neoepitopes comprising at least one minimal epitope, such as at least two, three or four minimal epitopes predicted to bind to MHC I and/or to MHC II, thereby obtaining MHC binding neoepitopes;
d. Ranking the MHC binding neoepitopes with respect to their likelihood of clinical utility;
e. Selecting A neoepitopes among the highest ranking MHC binding neoepitopes, wherein A is an integer and A is at least 3, such as at least 4, such as at least 5,
thereby selecting A neoepitopes capable of inducing a CD8+ T cell response when administered in an immunologically active amount to an individual.

DESCRIPTION OF DRAWINGS

Figure 5:
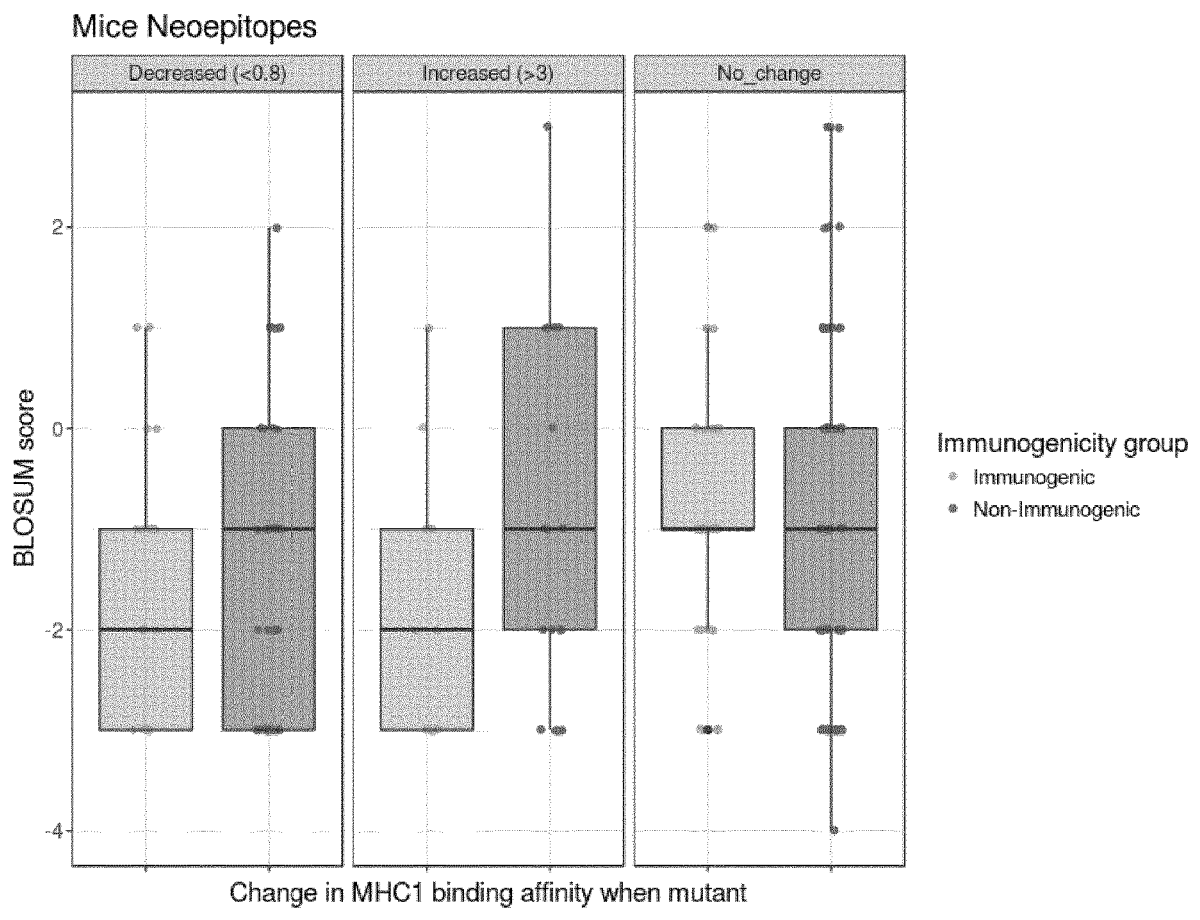

FIG. 5. BLOSUM scores are shown for immunogenic and non-immunogenic neoepitopes with a decreased MHC I binding affinity (MHC I binding differential below 1), an increased MHC I binding affinity (MHC I binding differential above 3) and with no change in MHC I binding affinity. The figure shows that immunogenic neoepitopes (light grey) have a lower BLOSUM score than non-immunogenic neoepitopes (dark grey) when the MHC I binding affinity is changed (left and middle panels), whereas no change in BLOSUM score is observed for neoepitopes for which the MHC I binding affinity is unchanged.

DETAILED DESCRIPTION

Definitions

Figure 1A:
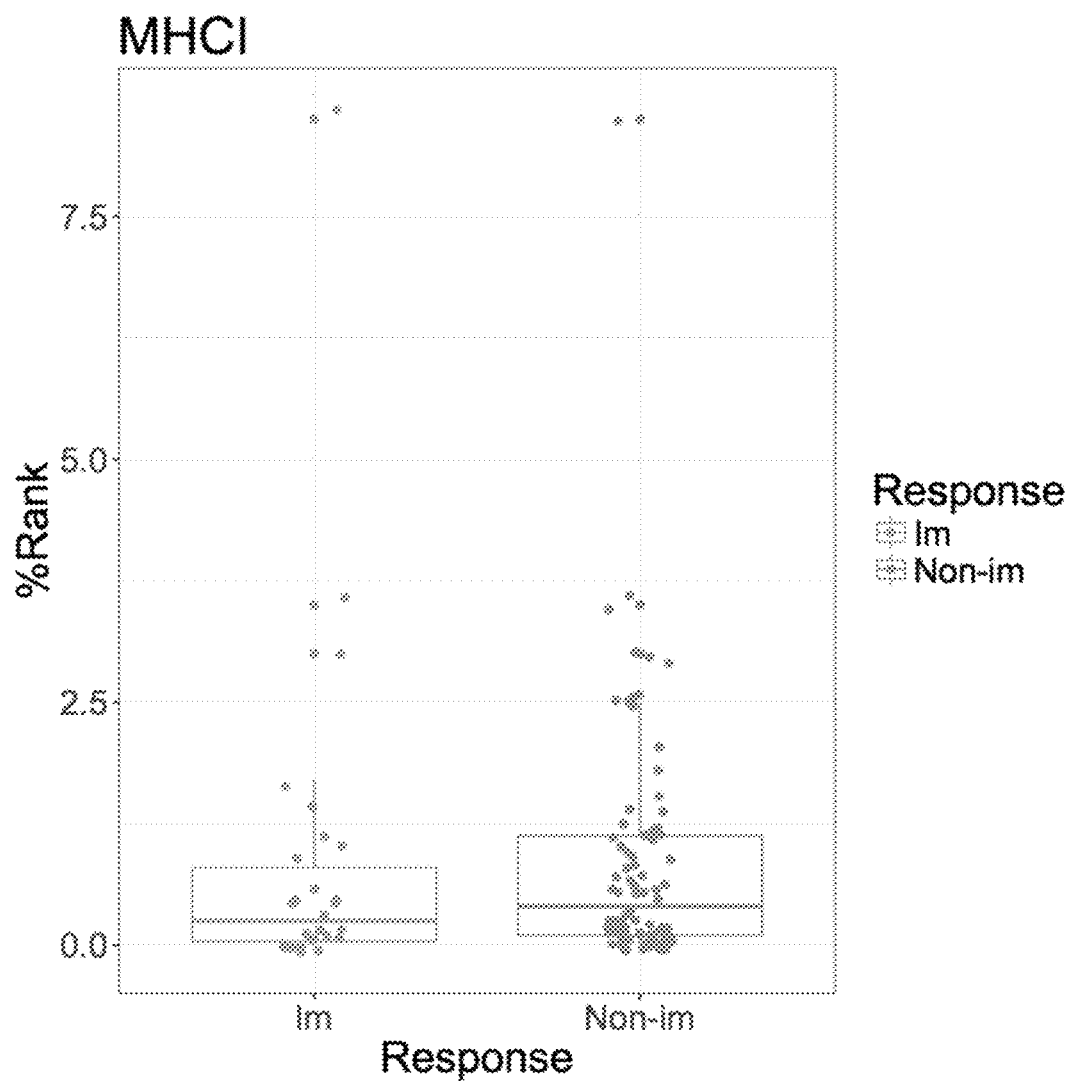
FIGS. 1A-1B. The NetMHCpan/NetMHC IIpan predicted binding affinity % Rank for MHC class I (FIG. 1A) and class II (FIG. 1B) molecules for immunogenic (left) versus non-immunogenic (right) neoepitopes (evaluated in VB10.NEO vaccinated mice).
Figure 1B:
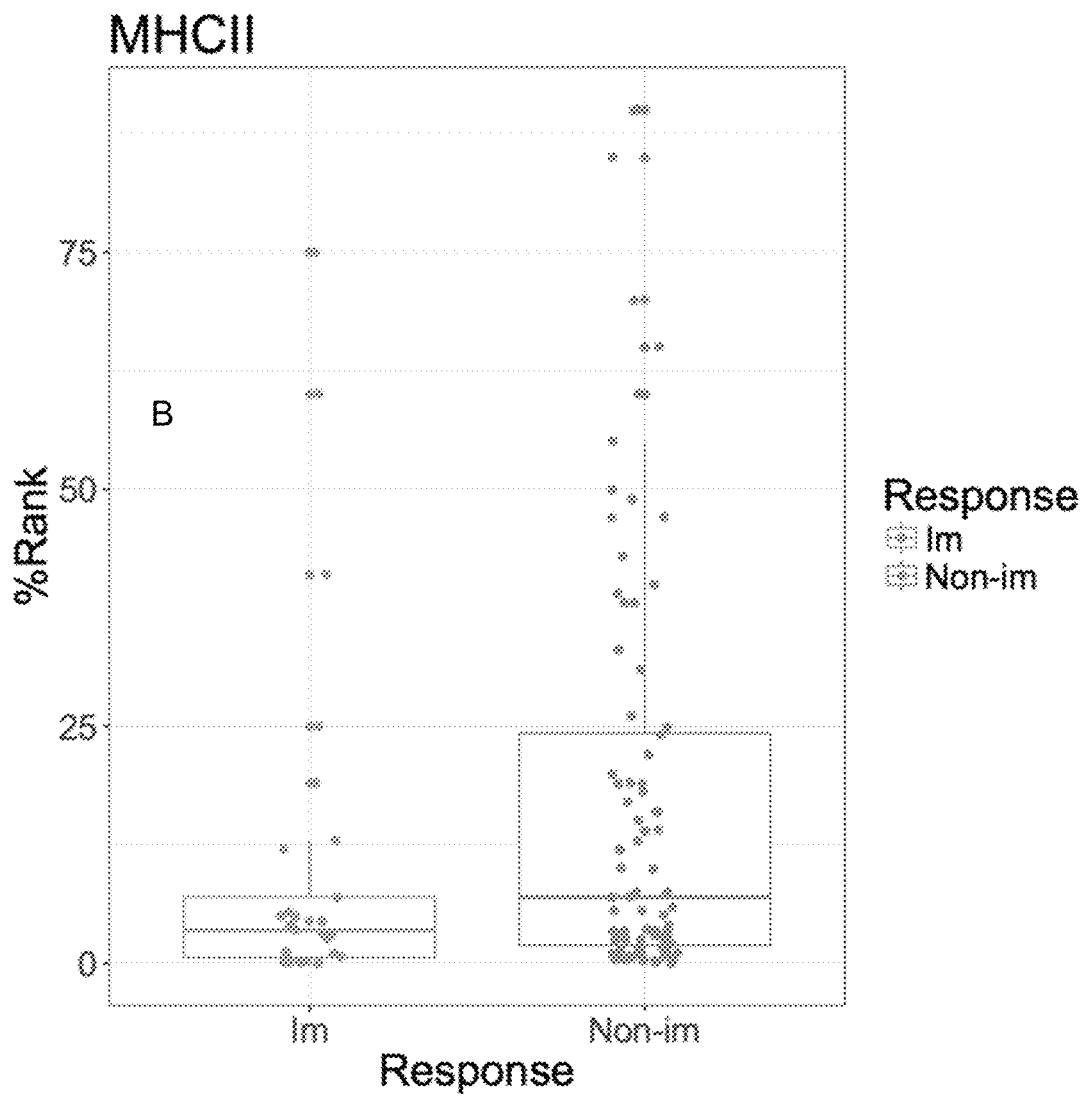

The term "tumor neoantigen" or "neoantigen" as used herein refers to any tumor specific antigen comprising one or more mutations as compared to the host's healthy tissue exome. Tumor neoantigen used synonymously with the term cancer neoantigen. Said one or more mutations may also be referred to as "neoepitope mutations". The mutation may be any mutation leading to a change in at least one amino acid. Accordingly, the mutation may be one of the following:

- a non-synonymous mutation leading to a change in the amino acid
- a mutation leading to a frame shift and thereby a completely different open reading frame in the direction after the mutation
- a read-through mutation in which a stop codon is modified or deleted leading to a longer protein with a tumor-specific neoepitope
- splice mutations that lead to a unique tumor-specific protein sequence
- chromosomal rearrangements that give rise to a chimeric protein with a tumor-specific neoepitope at the junction of the two proteins.

A mutation as understood herein does not necessarily refer to mutation of a single residue, but more generally refers to a difference between a given sequence (e.g. of a potential neoepitope) and a reference sequence. A mutation may thus refer to mutation of more than one amino acid residue. In some embodiments, the mutation is an immunogenic mutation.

The term "tumor neoepitope" or "neoepitope" as used herein refers to any immunogenic mutation in a tumor antigen and is used synonymously with the term cancer neoepitope. The presence of a mutation is determined by comparing the sequence of the neoepitope derived from a tumor sample with a reference sequence present in a reference sample, such as a healthy tissue from the same individual. It typically refers to a peptide with a length of 27 amino acids. A neoepitope may comprise one or several minimal epitopes, as defined herein. The mutation is typically present at or near the center of the neoepitope, i.e. in position 14 in a 27-mer, but not necessarily at the center of the minimal epitope(s).

The term "tumor neoepitope sequence" or "neoepitope sequence" as used herein refers to the sequence comprising the neoepitope in an antigenic subunit, and is used synonymously with the term cancer neoepitope sequence.

The term "tumor neoepitope peptide", "neoepitope peptide" as used herein refers to a peptide sequence of the neoepitope wherein said peptide sequence comprises the mutation.

The term "minimal epitope" refers to a subsequence of a neoepitope predicted to bind to MHC I or MHC II, said subsequence comprising the mutation, which may be immunogenic. In other words, the minimal epitope may be immunogenic, i.e. capable of eliciting an immune response, for example if it comprises a mutation which confers immunogenicity to the minimal epitope or which increases immunogenicity of the minimal epitope. Such a mutation is herein referred to as an immunogenic mutation. The term minimal epitope thus may refer to short subsequences of a neoepitope, which are predicted to bind to MHC I or MHC II, and which comprise the mutation found in the neoepitope. A 27-mer neoepitope comprising a mutation at position 14 may thus encompass several minimal binding epitopes, i.e. minimal binding epitopes, having a length shorter than 27 amino acids, but which each comprise the mutation. For example, a minimal epitope could consist of the first 14 amino acids of the neoepitope, provided that it is predicted to bind to MHC I or MHC II, or it could consist of amino acids 9 to 18 of the neoepitope, or of amino acids 7 to 22.

The term "MHC molecule" as used herein includes both MHC class I (MHC I) and MHC class II (MHC II) molecules. MHC I represents several loci such as HLA-A (Human Leukocyte Antigen-A), HLA-B, HLA-C, HLA-E, HLA-F, HLA-G, HLA-H, HLA-J, HLA-K, HLA-L, HLA-P and HLA-V, whereas MHC II represents loci such as HLA-DRA, HLA-DRB 1-9, HLA-, HLA-DQA1, HLA-DQB1, HLA-DPA1, HLA-DPB1, HLA-DMA, HLA-DMB, HLA-DOA, and HLA-DOB. The terms "MHC molecule" and "HLA molecule" are used interchangeably herein.

The terms "a neoepitope is selected" or "selection of a neoepitope" as used herein refer to the selection of a neoepitope for potential clinical or therapeutic use, preferably for use in a cancer vaccine. Thus, when a neoepitope is selected it is a potential candidate for clinical use or for use in a cancer vaccine. Selected neoepitopes a ranked higher or prioritized above neoepitopes which are not selected.

A nucleotide is herein defined as a monomer of RNA or DNA. A nucleotide is a ribose or a deoxyribose ring attached to both a base and a phosphate group. Both mono-, di-, and tri-phosphate nucleosides are referred to as nucleotides.

The term "genome" as used herein refers to the total amount of genetic information in the chromosomes of an organism or a cell.

The term "exome" as used herein refers to part of the genome formed by exons, the sequences which when transcribed remain within the mature RNA after introns are removed by RNA splicing. It consists of all DNA that is transcribed into mature RNA in cells of any type as distinct from the transcriptome, which is the RNA that has been transcribed only in a specific cell population.

The term "mutation" as used herein includes translocations, inversions, deletions, duplications and point mutations preferably present in a nucleotide encoding a neoepitope. In one preferred embodiment the mutation is an amino acid substitution preferably present in the neoepitope.

The term "cancer vaccine" as used herein refers to a vaccine that either treats existing cancer or prevents development of a cancer. Vaccines that treat existing cancer are known as therapeutic cancer vaccines.

Identifying Neoepitopes

The method according to the present invention may comprise a step of identifying one or more neoepitopes by identifying tumor specific mutations in nucleic acid sequences from a sample obtained from the individual as described herein. Said one or more neoepitopes is preferably a plurality of neoepitopes; however, in some cases even a single neoepitope can be useful in the context of personalised therapy, e.g. personalised cancer therapy, provided that it is capable of inducing the desired immunological response.

Preferably said individual is a cancer patient. One or more samples may be obtained from the cancer patient to identify neoepitopes that may be potential candidates for clinical use such as for example a personalized immunogenic cancer vaccine.

Preferably, tumor specific mutations are identified by comparing nucleotide sequences obtained from a tumor sample from said individual with normal nucleotide sequences. Normal nucleotide sequences can be obtained by sequencing nucleic acids obtained from a body fluid sample or any non-tumor tissue from said individual. Preferably, the normal nucleotide sequences are obtained from a healthy tissue from the same individual. Normal nucleotide sequences may also be obtained from a database. The term "normal" when applied to a sequence, whether a peptide sequence or a nucleotide sequence, will here be used interchangeably with the term "reference" or "wild type". The term may thus apply to the corresponding sequence found under "normal" circumstances within the same individual or within a normal, healthy population. Comparing tumor-specific sequences with the corresponding sequence found in another, non-tumor tissue isolated from the same individual, may thus reduce the number of false positives, because neoepitopes resulting from genetic variation between individuals, for example comprising SNPs which may be individual-specific but not tumor-specific, will be filtered out from the results. The reference sequence isolated from the individual may be from a sample of healthy cells obtained from the same individual prior to diagnosis. The sample may also have been obtained prior to commencement of therapy, or after therapy has started.

The term "tumor sample" as used herein refers to a sample comprising tumor cells. The tumor sample can be obtained by taking a biopsy from said individual or cancer patient. The biopsy may be a small sample of tumor tissue that is taken with a needle or minor surgery. The sample may also be a lymph node biopsy. Also, several biopsies or tumor biopsies may be taken.

The reference sample can be a body fluid sample. The body fluid sample can for example be a urine sample, a faecal sample, a serum sample or a saliva sample. In a preferred embodiment, the body fluid sample is a blood sample. Preferably, the reference sample is obtained from a healthy tissue of the individual in need of treatment.

The nucleic acids obtained from the samples may be sequenced using any known sequencing method. For example, next generation sequencing may be used. In some embodiments, nucleic acid sequences from tumor cells from an individual are compared to nucleic acid sequences from normal cells such as healthy cells from the same individual or reference cells in order to identify differences in sequence.

MHC I and MHC II Binding Affinities

To select and prioritize neoepitopes being the strongest candidates for personalized cancer vaccines, the present inventors have developed a method to rank and select neoepitopes that elicit a strong immune response.

To initiate an immune response the neoepitopes should target major histocompatibility complex (MHC) restricted epitopes, since only peptides that can bind MHC molecules provide eligible T-cell targets. Thus, a first step to select the most promising neoepitopes may be to determine their MHC binding affinities.

MHC I is found on the cell surface of all nucleated cells in the body. One function of MHC I is to display peptides from within the cell to cytotoxic T cells. The MHC I complex-peptide complex is inserted into the plasma membrane of the cell presenting the peptide to the cytotoxic T cells, whereby an activation of cytotoxic T cells against the particular MHC-peptide complex is triggered. The peptide is positioned in a groove in the MHC I molecule, allowing the peptide to be usually about 8-10 amino acids long. MHC I may be used interchangeably with MHC class I.

MHC II molecules are a family of molecules normally found only on antigen-presenting cells such as dendritic cells, mononuclear phagocytes, some endothelial cells, thymic epithelial cells, and B cells. MHC II may be used interchangeably with MHC class II.

As opposed to MHC I, the antigens presented by MHC class II peptides are derived from extracellular proteins. Extracellular proteins are endocytosed, digested in lysosomes, and the resulting antigenic peptides are loaded onto MHC class II molecules and then presented at the cell surface. The antigen-binding groove of MHC class II molecules is open at both ends and is able to present longer peptides, generally between 15 and 24 amino acid residues long. In addition, exogenous antigens, which are normally presented by MHC II on the surface of dendritic cells, can be presented through the MHC I pathway via cross-presentation. Cross-presentation is necessary for immunity against most tumors and viruses.

MHC class I molecules are recognized by T cell receptors (TCR) and co-receptors on the CD8+ T cells, whereas MHC class II molecules are recognized by TCR and co-receptors on the CD4+ T cells.

The inventors of the present invention have established a method for selecting neoepitopes wherein neoepitopes are ranked with respect to their clinical utility, and wherein neoepitopes having affinity for MHC, e.g. MHC I and/or MHC II, are selected.

Thus, one aspect of the present invention relates to a method for selecting a number A of neoepitopes for an individual, said method comprising the steps of:
  a. Obtaining one or more neoepitopes from said individual, each neoepitope comprising at least one minimal epitope, wherein each neoepitope comprises at least one mutation such as an immunogenic mutation compared to a reference sequence;
  b. Determining MHC I and/or MHC II binding affinity for at least one minimal epitope, such as at least two, three or four minimal epitopes within each of said neoepitopes;
  c. Selecting neoepitopes comprising at least one minimal epitope predicted to bind to MHC I and/or to MHC II, thereby obtaining MHC binding neoepitopes;
  d. Ranking the MHC binding neoepitopes with respect to their likelihood of clinical utility;
  e. Selecting A neoepitopes among the highest ranking MHC binding neoepitopes, thereby selecting A neoepitopes likely to have clinical utility.

Neoepitopes with a high likelihood of clinical utility are neoepitopes that are immunogenic and are likely to be suitable for use in a cancer vaccine. Thus, the method of the present invention is a method to select the most immunogenic neoepitopes that are highly suitable for use in a cancer vaccine.

The MHC alleles within the human population display an extreme polymorphism. Each genetic locus comprises a great number of haplotypes comprising distinct alleles encoding different peptides. Therefore, the MHC I and MHC II binding affinities are preferably determined between neoepitope sequences and MHC I and/or MHC II sequences obtained from the same individual.

To determine the MHC binding affinity of a neoepitope identified in an individual, it is necessary to perform a HLA typing of said individual. Thus, the method of the present invention may also comprise a step wherein the MHC binding affinity is determined by determining the HLA genotype of said individual. For example, said HLA genotype is determined from a blood sample of said individual.

Techniques for determining the HLA type of an individual are well-known. HLA typing can be performed by using any suitable sequencing method. Preferably, next generation sequencing is used.

For example, DNA isolated from blood samples from said individual can be sequenced on a next generation sequencing platform, such as for example the Illumina platform.

The MHC I and MHC II binding affinities may be determined or predicted using computer programs that predict the binding affinities between a peptide and MHC I and MHC II molecules.

Thus, in one embodiment, the MHC binding affinity is determined by in silico prediction. Preferably, said in silico prediction is performed by using a computer program that predicts binding of peptides to MHC class I and/or MHC class II molecules. The predicted binding affinity values are translated to a percentile score by comparing them to the predicted binding affinities of a set of 100,000 random natural 9 mer peptides. Preferably, the % Rank score used to predict binding affinities of neoepitopes to MHC I and MHC II molecules is calculated using the NetMHCpan described in Nielsen et al 2016 (Nielsen, M. et al. (2016) "NetMHCpan-3.0: improved prediction of binding to MHC class I molecules integrating information from multiple receptor and peptide length data sets." Genome Medicine: 8:33) and Vannessa, J. et al (2017) "NetMHCpan-4.0: Improved Peptide—MHC Class I Interaction Predictions Integrating Eluted Ligand and Peptide Binding Affinity Data." Vanessa Jurtz, Sinu Paul, Massimo Andreatta, Paolo Marcatili, Bjoern Peters and Morten Nielsen. The Journal of Immunology (2017)) and NetMHC IIpan computer programs as described in Andreatta et al. 2015 (Andreatta M et al. Accurate pan-specific prediction of peptide-MHC class II binding affinity with improved binding core identification. Immunogenetics. 2015; 67(11-12):641-650). The % Rank score as referred to herein is calculated using the above databases of 30 Mar. 2016 for NetMHCpan and 29 Sep. 2015 for NetMHCIIpan.

A low % Rank score indicates a strong binding affinity whereas a higher % Rank score indicates a weaker binding affinity. Thus, neoepitopes with a low % Rank score are preferably ranked above neoepitopes with a higher % Rank score.

% Rank score (MHC I) refers to the % Rank score predicting the MHC I binding affinity for a peptide, a minimal epitope or a neoepitope.

% Rank score (MHC II) refers to the % Rank score predicting the MHC II binding affinity for a peptide, a minimal epitope or a neoepitope.

As explained above, each neoepitope may comprise one or more minimal epitopes. The % Rank score (MHC I) or % Rank score (MHC II) for each minimal epitope within a given neoepitope may also be determined. Preferably, the % Rank score of the neoepitope is then equal to the % Rank score of the minimal epitope it comprises which is lowest, i.e. the binding affinity of the neoepitope is considered to be the same as the binding affinity of the best binder among the minimal epitopes it comprises.

In some embodiments, neoepitopes or minimal epitopes having a % Rank score (MHC I) less than or equal to 2 are considered to bind MHC I. Generally, a lower % Rank score (MHC I) is indicative of a higher binding affinity. For example, a neoepitope or minimal epitope having a % Rank score (MHC I) comprised between 0.5 and 2 (0.5<% Rank score (MHC I) ≤2) may in some embodiments be considered a weak MHC I binder, while a % Rank score (MHC I) equal to or below 0.5 indicates that the neoepitope or minimal epitope is a strong MHC I binder. In some embodiments, neoepitopes or minimal epitopes having a % Rank score >2 are considered not to be capable of binding to MHC I. In preferred embodiments neoepitopes not comprising any minimal epitopes predicted to bind to MHC I are considered not to be of clinical utility and are excluded or down-prioritized. In other words step e of the present methods may comprise or consist of the step of excluding or down-prioritizing neoepitopes which are predicted not to bind to MHC I. Down-prioritizing a neoepitope means that the neoepitope is considered of remote relevance for clinical use. Exclusion of a neoepitope means that the neoepitope is not selected for clinical use and/or that the neoepitope is not selected for use in a vaccine.

In general, neoepitopes including minimal epitopes with a high MHC I binding affinity, i.e. a low % Rank score (MHC I), are ranked above neoepitopes comprising minimal epitopes with a lower MHC I binding affinity, i.e. a higher % Rank score (MHC I). Neoepitopes comprising minimal epitopes with a high MHC I binding affinity, i.e. a low % Rank score (MHC I), are ranked above neoepitopes comprising minimal epitopes with a lower MHC I binding affinity, i.e. a higher % Rank score (MHC I).

In some embodiments, neoepitopes or minimal epitopes having a % Rank score (MHC II) less than or equal to 10 are considered to bind MHC I. For example, a neoepitope or minimal epitope having a % Rank score (MHC II) comprised between 2 and 10 (2<% Rank score (MHC II) ≤10) may in some embodiments be considered a weak MHC II binder, while a % Rank score (MHC II) equal to or below 2 indicates that the neoepitope or minimal epitope is a strong MHC II binder. In some embodiments, neoepitopes or minimal epitopes having a % Rank score >10 are considered not to be capable of binding to MHC II. In preferred embodiments neoepitopes not comprising any binding minimal epitopes are considered not to be of clinical utility and are excluded or down-prioritized. In other words steps of the present methods, for example step c or e of the present methods, may comprise or consist of the step of excluding neoepitopes comprising only minimal epitopes which are predicted not to bind to MHC II. Down-prioritizing a neoepitope means that the neoepitope is considered of remote relevance for clinical use. Exclusion of a neoepitope means that the neoepitope is not selected for clinical use and/or that the neoepitope is not selected for use in a vaccine.

In general, neoepitopes or minimal epitopes with a high MHC II binding affinity, i.e. a low % Rank score (MHC II), are ranked above neoepitopes or minimal epitopes with a lower MHC I binding affinity, i.e. a higher % Rank score (MHC II). Neoepitopes comprising minimal epitopes with a high MHC II binding affinity, i.e. a low % Rank score (MHC II), are ranked above neoepitopes comprising minimal epitopes with a lower MHC II binding affinity, i.e. a higher % Rank score (MHC II).

In one preferred embodiment, the MHC II binding minimal epitopes have a % Rank (MHC II) score below 10. Thus, the MHC II binding minimal epitopes comprised in the neoepitopes selected in step b of the method according to the present invention preferably have a % Rank score (MHC II) below 10. This means that neoepitopes comprising minimal epitopes predicted or determined to bind MHC II with a % Rank score below 10 are selected for potential clinical use and constitute potential vaccine candidates. Neoepitopes comprising minimal epitopes predicted to bind MHC II with a % Rank score (MHC II) greater than 10 are preferably down-prioritised or excluded.

In general, MHC II binding neoepitopes comprising minimal epitopes having a high MHC II binding affinity are ranked above neoepitopes comprising minimal epitopes having a lower MHC II binding affinity.

Number of Minimal Epitopes

Neoepitopes comprising more than one minimal epitope may be expected to have higher clinical utility than neoepitopes comprising only one minimal epitope. Accordingly, in some embodiments, the number of minimal epitopes comprising the immunogenic mutation and capable of binding to MHC molecules is the most important parameter in step d of the method above. It is however also possible that the neoepitopes likely to have clinical utility and selected by the present methods only comprise a single minimal epitope; such neoepitopes may be clinically relevant if no others are available, and/or if the minimal epitope confers binding or strong binding to MHC molecules.

In one embodiment, neoepitopes comprising a higher number of minimal epitopes are ranked higher than neoepitopes comprising a lower number of minimal epitopes. Neoepitopes comprising a lower number of minimal epitopes include neoepitopes comprising only one minimal epitope.

Thus, in one embodiment, the method of the present invention further comprises a step of determining the number of minimal epitopes comprised in the MHC I binding neoepitopes, wherein MHC I binding neoepitopes comprising a higher number of binding minimal epitopes are ranked above MHC I binding neoepitopes comprising a lower number of binding minimal epitopes.

In another embodiment, the method of the present invention comprises or further comprises a step of determining the number of minimal epitopes present in the MHC II binding neoepitopes, wherein MHC II binding neoepitopes comprising a higher number of binding minimal epitopes are ranked above MHC II binding neoepitopes comprising a lower number of binding minimal epitopes.

In some embodiments, the present method comprises a step of determining both the number of minimal epitopes which are capable of binding MHC I molecules and the number of minimal epitopes which are capable of binding MHC II molecules.

In order to rank neoepitopes as a function of the total number of minimal epitopes they comprise, the number of MHC I binding minimal epitopes is in some embodiments weighed higher, for example double, compared to the number of MHC II binding minimal epitopes. This means that the score for the number of MHC I binding minimal epitopes is higher than the score for the number of MHC II binding minimal epitopes, such as twice as high. For example, a neoepitope with 14 MHC I binding minimal epitopes and 13 MHC II binding minimal epitopes is predicted to be more immunogenic than a neoepitope comprising 12 MHC I binding minimal epitopes and 15 MHC II minimal neoepitopes.

A binding score for each neoepitope is thus determined. In practice, the number of minimal (binding) epitopes comprised within a neoepitope is determined, thereby identifying x MHCI binding minimal epitopes and/or y MHCII binding minimal epitopes.

A suitable scoring scheme to determine the binding score of a neoepitope may be:

$$a*2x+b*y$$

wherein a higher binding score is indicative of a higher likelihood of clinical utility as explained above.

For example, a=1 if y>0, and a=0 if y=0, and b=1 if x>0, and b=0 if x=0.

Another suitable scoring scheme may be:

$$a*x+b*y$$

wherein a higher binding score is indicative of a higher likelihood of clinical utility as explained above.

For example, a=2 and b=1, or a=2 if y>0, and a=0 if y=0, and b=1 if x>0, and b=0 if x=0.

In some embodiments, neoepitopes comprising at least one MHC I binding minimal epitope and at least one MHC II binding minimal epitope are ranked higher than neoepitopes comprising only MHC I binding minimal epitopes or only MHC II binding minimal epitopes. In other embodiments, neoepitopes comprising at least one MHC I binding minimal epitope are ranked higher than neoepitopes comprising only MHC II binding minimal epitopes. In other embodiments, neoepitopes comprising at least one MHC II binding minimal epitope are ranked higher than neoepitopes comprising only MHC I binding minimal epitopes.

In some embodiments, neoepitopes comprising at least 2 MHC binding minimal epitopes are ranked higher than neoepitopes comprising only one MHC binding minimal epitopes. In some embodiments, neoepitopes comprising at least 3 MHC binding minimal epitopes are ranked higher than neoepitopes comprising less than 3 MHC binding minimal epitopes. In some embodiments, neoepitopes comprising at least 4 MHC binding minimal epitopes are ranked higher than neoepitopes comprising less than 4 MHC binding minimal epitopes. In some embodiments, neoepitopes comprising at least 5 MHC binding minimal epitopes are ranked higher than neoepitopes comprising less than 5 MHC binding minimal epitopes. In some embodiments, neoepitopes comprising at least 6 MHC binding minimal epitopes are ranked higher than neoepitopes comprising less than 6 MHC binding minimal epitopes. In some embodiments, neoepitopes comprising at least 7 MHC binding minimal epitopes are ranked higher than neoepitopes comprising less than 7 MHC binding minimal epitopes. In some embodiments, neoepitopes comprising at least 8 MHC binding minimal epitopes are ranked higher than neoepitopes comprising less than 8 MHC binding minimal epitopes. In some embodiments, neoepitopes comprising at least 9 MHC binding minimal epitopes are ranked higher than neoepitopes comprising less than 9 MHC binding minimal epitopes. In some embodiments, neoepitopes comprising at least 10 MHC binding minimal epitopes are ranked higher than neoepitopes comprising less than 10 MHC binding minimal epitopes. The MHC binding minimal epitope may be an MHC I binding minimal epitopes or an MHC II binding minimal epitope.

In some embodiments, neoepitopes comprising at least 2 MHC I binding minimal epitopes are ranked higher than neoepitopes comprising only one MHC I binding minimal epitope or than neoepitopes comprising only MHC II binding minimal epitopes. In some embodiments, neoepitopes comprising at least 3 MHC I binding minimal epitopes are ranked higher than neoepitopes comprising less than 3 MHC I binding minimal epitopes or than neoepitopes comprising only MHC II binding minimal epitopes. In some embodiments, neoepitopes comprising at least 4 MHC I binding minimal epitopes are ranked higher than neoepitopes comprising less than 4 MHC I binding minimal epitopes or than neoepitopes comprising only MHC II binding minimal epitopes. In some embodiments, neoepitopes comprising at least 5 MHC I binding minimal epitopes are ranked higher than neoepitopes comprising less than 5 MHC I binding minimal epitopes or than neoepitopes comprising only MHC II binding minimal epitopes. In some embodiments, neoepitopes comprising at least 6 MHC I binding minimal epitopes are ranked higher than neoepitopes comprising less than 6 MHC I binding minimal epitopes or than neoepitopes comprising only MHC II binding minimal epitopes. In some embodiments, neoepitopes comprising at least 7 MHC I binding minimal epitopes are ranked higher than neoepitopes comprising less than 7 MHC I binding minimal epitopes or than neoepitopes comprising only MHC II binding minimal epitopes. In some embodiments, neoepitopes comprising at least 8 MHC I binding minimal epitopes are ranked higher than neoepitopes comprising less than 8 MHC I binding minimal epitopes or than neoepitopes comprising only MHC II binding minimal epitopes. In some embodiments, neoepitopes comprising at least 9 MHC I binding minimal epitopes are ranked higher than neoepitopes comprising less than 9 MHC I binding minimal epitopes or than neoepitopes comprising only MHC II binding minimal epitopes. In some embodiments, neoepitopes comprising at least 10 MHC I binding minimal epitopes are ranked higher than neoepitopes comprising less than 10 MHC I binding minimal epitopes or than neoepitopes comprising only MHC II binding minimal epitopes.

In some embodiments, neoepitopes comprising at least 2 MHC II binding minimal epitopes are ranked higher than neoepitopes comprising only one MHC II binding minimal epitopes. In some embodiments, neoepitopes comprising at least 3 MHC II binding minimal epitopes are ranked higher than neoepitopes comprising less than 3 MHC II binding minimal epitopes. In some embodiments, neoepitopes comprising at least 4 MHC II binding minimal epitopes are ranked higher than neoepitopes comprising less than 4 MHC II binding minimal epitopes. In some embodiments, neoepitopes comprising at least 5 MHC II binding minimal epitopes are ranked higher than neoepitopes comprising less than 5 MHC II binding minimal epitopes. In some embodiments, neoepitopes comprising at least 6 MHC II binding minimal epitopes are ranked higher than neoepitopes comprising less than 6 MHC II binding minimal epitopes. In some embodiments, neoepitopes comprising at least 7 MHC II binding minimal epitopes are ranked higher than neoepitopes comprising less than 7 MHC II binding minimal epitopes. In some embodiments, neoepitopes comprising at least 8 MHC II binding minimal epitopes are ranked higher than neoepitopes comprising less than 8 MHC II binding minimal epitopes. In some embodiments, neoepitopes comprising at least 9 MHC II binding minimal epitopes are ranked higher than neoepitopes comprising less than 9 MHC II binding minimal epitopes. In some embodiments, neoepitopes comprising at least 10 MHC II binding minimal epitopes are ranked higher than neoepitopes comprising less than 10 MHC II binding minimal epitopes.

Binding Differential

In some embodiments, neoepitopes comprising minimal epitopes which have an MHC I binding affinity that is higher or much higher compared to the MHC I binding affinity of the corresponding reference peptide are prioritized above neoepitopes comprising minimal epitopes for which the MHC I binding affinity is only slightly improved compared to the corresponding reference MHC I binding affinity.

Therefore, the ratio of the % Rank scores (MHC I) between neoepitope and the corresponding reference peptide can be used to select neoepitopes for potential clinical use. Herein, the % Rank score ratio for MHC I binding is also referred to as the MHC I binding differential.

Likewise, in some embodiments, neoepitopes which have an MHC II binding affinity that is higher or much higher compared to the MHC II binding affinity of the corresponding reference peptide are prioritized above neoepitopes expressing peptides for which the MHC II binding affinity is only slightly improved compared to the corresponding reference MHC II binding affinity.

Therefore, the ratio of the % Rank scores (MHC II) between neoepitope and the corresponding reference peptide can be used to select neoepitopes for potential clinical use. Herein, the % Rank score ratio for MHC II binding is also referred to as the MHC II binding differential.

The MHC I binding differential between reference peptide and neoepitope is given by the following formula: (% Rank score (MHC I) for reference)/(% Rank score (MHC I) for neoepitope), wherein the % Rank score (MHC I) for reference is the predicted binding affinity between reference peptide and MHC I molecules and the % Rank score (MHC I) for neoepitope is the predicted binding affinity between neoepitope peptide and MHC I molecules.

In one embodiment of the present invention, step b or c of the method described above further comprises determining the MHC I binding differential given by the formula (% Rank score (MHC I) for reference)/(% Rank score (MHC I) for neoepitope), wherein neoepitopes with a high MHC I binding differential are ranked higher than neoepitopes with a lower MHC I binding differential.

In one embodiment, neoepitopes are down-prioritized if the MHC I binding differential, (% Rank score (MHC I) for reference)/(% Rank score (MHC I) for neoepitope) is below 2.

In one embodiment, neoepitopes are down-prioritized if the MHC I binding differential, (% Rank score (MHC I) for reference)/(% Rank score (MHC I) for neoepitope) is below 20, such as below 3, such as below 1. Neoepitopes are considered of potential clinical relevance if the binding differential is equal to or greater than 1, such as equal to or greater than 3, such as equal to or greater than 20.

In a similar manner, the MHC I binding differential between reference peptide and a minimal epitope is given by the following formula: (% Rank score (MHC I) for reference)/(% Rank score (MHC I) for minimal epitope), wherein the % Rank score (MHC I) for reference is the predicted binding affinity between reference peptide and MHC I molecules and the % Rank score (MHC I) for minimal epitope is the predicted binding affinity between minimal epitope peptide and MHC I molecules.

In one embodiment of the present invention, step b or c of the method described above further comprises determining the MHC I binding differential given by the formula (% Rank score (MHC I) for reference)/(% Rank score (MHC I) for minimal epitope), wherein neoepitopes comprising minimal epitopes with a high MHC I binding differential are ranked higher than neoepitopes comprising minimal epitopes with a lower MHC I binding differential.

In one embodiment, neoepitopes are down-prioritized if the MHC I binding differential, (% Rank score (MHC I) for reference sequence of the minimal epitope)/(% Rank score (MHC I) for the minimal epitope) is below 20, such as below 3, such as below 1. Neoepitopes are considered of potential clinical relevance if the binding differential of the minimal epitopes they comprise is equal to or greater than 1, such as equal to or greater than 3, such as equal to or greater than 20.

If a neoepitope comprises only one MHC I binding minimal epitope, the MHC I binding differential of the neoepitope is equal to the MHC I binding differential of said minimal epitope. If a neoepitope comprises two or more MHC I binding minimal epitopes, the MHC I binding differential of the neoepitope is considered to be equal to the highest MHC I binding differential among said two or more MHC I binding minimal epitopes. Likewise, if a neoepitope comprises only one MHC II binding minimal epitope, the MHC II binding differential of the neoepitope is equal to the MHC II binding differential of said minimal epitope. If a neoepitope comprises two or more MHC II binding minimal epitopes, the MHC II binding differential of the neoepitope is considered to be equal to the highest MHC II binding differential among said two or more MHC II binding minimal epitopes. This is true in relation to reference peptides also.

In some embodiments, the position of the mutation is also considered. In other words, clinical utility of a neoepitope or minimal epitope is determined not only in light of the above, but also as a function of the position of the mutation. In preferred embodiments, the mutation is immunogenic. The peptide-binding groove of MHC molecules accommodates peptides or fragments of peptides, generally of 9 amino acid in length, i.e. the minimal epitopes. Contact between the minimal epitope and the MHC molecule is mediated through the side chains of anchor residues. Taking as example a minimal epitope of 9 amino acid in length, the anchoring positions of a minimal epitope to an MHC I molecule are positions 2 and 9. For binding to MHC II molecules, the anchoring positions are positions 1, 4 and 9.

In some embodiments, neoepitopes comprising minimal epitopes in which the mutation is in a non-anchoring position are excluded or down-prioritized regardless of their binding differential. For MHC I binding minimal epitopes, this means that in some embodiments, neoepitopes are excluded or down-prioritized if the mutation is in position 1, 3, 4, 5, 6, 7 or 8 of the minimal epitope or of the part of the minimal epitope which is accommodated within the binding groove of the MHC molecule, no matter how high the binding differential is. Preferred neoepitopes comprise minimal epitopes with a mutation in an anchoring position and a binding differential equal to or greater than 2, such as equal to or greater than 4, such as equal to or greater than 6, such as equal to or greater than 8, such as equal to or greater than 10, such as equal to or greater than 12, such as equal to or greater than 14, such as equal to or greater than 16, such as equal to or greater than 18, most preferably such as equal to or greater than 20.

The MHCII binding differential may also be used as a selection criteria. The MHC II binding differential between reference peptide and neoepitope is given by the following formula: (% Rank score (MHC II) for reference sequence of the minimal epitope)/(% Rank score (MHC II) for the minimal epitope), wherein the % Rank score (MHC II) for the minimal epitope is the predicted binding affinity for the best ranking minimal epitope within the neoepitope, and the % Rank score (MHC II) for the reference is the predicted binding affinity for the corresponding peptide in the reference sequence.

In one embodiment of the present invention, step b or c of the method described above further comprises determining the MHC II binding differential given by the formula (% Rank score (MHC II) for reference sequence of the minimal epitope)/(% Rank score (MHC II) for the minimal epitope), wherein neoepitopes with a high MHC II binding differential are ranked higher than neoepitopes with a lower MHC II binding differential.

In a similar manner, the MHC II binding differential between reference peptide and a minimal epitope is given by the following formula: (% Rank score (MHC II) for reference)/(% Rank score (MHC II) for minimal epitope), wherein the % Rank score (MHC II) for reference is the predicted binding affinity between reference peptide and MHC II molecules and the % Rank score (MHC II) for minimal epitope is the predicted binding affinity between minimal epitope peptide and MHC II molecules.

Methods for determining the MHC II binding affinity are described above.

In one embodiment of the present invention, neoepitopes comprising MHC II binding minimal epitopes predicted to bind MHC II with a % Rank score (MHC II) below 20, such as below 15, such as below 14, such as for example below 13, below 12 or for example below 11 are excluded or down-prioritized.

In a preferred embodiment neoepitopes comprising MHC II binding minimal epitopes with a % Rank score (MHC II) below 10 are excluded or down-prioritized.

In another embodiment, neoepitopes comprising MHC II binding minimal epitopes with a % Rank score (MHC II) at or below 9, such as at or below 8, such as for example at or below 7, at or below 6, such as at or below 5, such as for example at or below 4, at or below 3 or for example at or below 2 are excluded or down-prioritized.

An example of a scoring scheme which can be used in a step of the above method, such as in step d, is given below:
minimal epitope having a mutation with a binding differential <1 regardless of the position of the mutation: score equals 1;
minimal epitope having a mutation in a non-anchoring position, and 1≤binding differential <3: score equals 2;
minimal epitope having a mutation in an anchoring position and 1≤binding differential <3: score equals 3;
minimal epitope having a mutation in a non-anchoring position and 3≤binding differential <20: score equals 4;
minimal epitope having a mutation in an anchoring position and 3≤binding differential <20: score equals 5;
minimal epitope having a mutation in a non-anchoring position and a binding differential >20: score equals 6;
minimal epitope having a mutation in an anchoring position and a binding differential >20: score equals 7.

The binding differential may be the MHCI or MHCII binding differential.

It will be understood that the scores given above are arbitrary values, and could be replaced by other arbitrary values, as long as the score increases as exemplified above. In general, as can be seen, minimal epitopes or epitopes having a low binding differential (e.g. less than 1) are ranked lowest, regardless of the position of the mutation. For minimal epitopes or epitopes having binding differentials in the same range (e.g. 1≤binding differential <3; or 3≤binding differential <20; or binding differential >20), the minimal epitopes or neoepitopes comprising a mutation in an anchoring position are rated higher than the minimal epitopes or neoepitopes comprising a mutation in a non-anchoring position. In general, the higher the binding differential, the higher the score. For similar scores, a mutation in an anchoring position gives a higher score than a mutation in a non-anchoring position.

In the above scoring scheme, minimal epitopes ranked lowest either have a mutation in a non-anchoring position, or have a mutation in an anchoring position and a binding differential <1.

Length of the Neoepitopes

The neoepitope sequence preferably has a length suitable for processing and presentation of minimal epitopes comprised within a neoepitope on MHC molecules. Thus, in one embodiment the neoepitopes have a length of from 7 to 40 amino acids such as from 10 to 35 amino acids, or more preferably from 15 to 30 amino acids such as from 25 to 30 amino acids. In a preferred embodiment the neoepitope is 27 amino acids. The lengths of the neoepitopes include lengths of both MHC I and MHC II binding neoepitopes.

It is preferred that the mutation is positioned essentially in the middle of the neoepitope sequence.

In some embodiments, the minimal epitopes for a given neoepitope consist of a number of amino acids smaller or equal to the number of amino acids of the neoepitope. In cases where the neoepitope is the minimal epitope, the neoepitope and the minimal epitope have the same length. In such embodiments the minimal epitope has a length of from 7 to 40 amino acids such as from 10 to 35 amino acids, or more preferably from 15 to 30 amino acids such as from 25 to 30 amino acids. In one embodiment the length of the minimal epitope is 27 amino acids. The lengths of the minimal epitopes include lengths of both MHC I and MHC II binding neoepitopes.

In other embodiments, the minimal epitopes comprised within a neoepitope are shorter than the neoepitope. For example, the neoepitope has a length of from 7 to 40 amino acids and the corresponding minimal epitope(s) have a length of from 6 to 39 amino acids, or have a length shorter than the length of the neoepitope by at least one amino acid, such as by at least 2 amino acids, such as by at least 3 amino acids, such as by at least 4 amino acids, such as by at least 5 amino acids, such as by at least 6 amino acids, such as by at least 7 amino acids, such as by at least 8 amino acids, such as by at least 9 amino acids, such as by at least 10 amino acids, such as by at least 11 amino acids, such as by at least 12 amino acids, such as by at least 13 amino acids, such as by at least 15 amino acids, such as by at least 16 amino acids, such as by at least 17 amino acids, such as by at least 18 amino acids, such as by at least 19 amino acids, such as by at least 20 amino acids. In a preferred embodiment the neoepitope is 27 amino acids, and the minimal epitope has a length of 6, 7, 8, 9, 10, 11, 12, 13, 14, 15, 16, 17, 18, 19, 20, 21, 22, 23, 24, 25 or 26 amino acids.

In some embodiments, the minimal epitope binds or is predicted to bind to MHC I, and the minimal epitope has a length of between 5 and 20 amino acids, such as between 6 and 19 amino acids, such as between 7 and 18 amino acids, such as between 7 and 17 amino acids, such as between 7 and 16 amino acids, such as between 8 and 15 amino acids, such as between 8 and 14 amino acids. Typically, such minimal epitopes have a length between 8 and 14 amino acids.

In some embodiments, the minimal epitope binds or is predicted to bind to MHC II, and the minimal epitope has a length of between 5 and 20 amino acids, such as between 6 and 19 amino acids, such as between 7 and 18 amino acids, such as between 7 and 17 amino acids, such as between 8 and 16 amino acids, such as between 9 and 15 amino acids. Typically, such minimal epitopes have a length between 9 and 15 amino acids.

Resemblance to Known T Cell Recognized Epitopes

In some embodiments, the method further comprises a step of selecting a group of neoepitopes which comprise minimal epitopes with high resemblance to epitopes which are known to be recognized by T cells. The skilled person knows where to find lists of such epitopes. For example, epitopes which are known to be recognized by T cells may be obtained from the Immune Epitope Database and Analysis Resource (IEDB database), where human infectious epitopes are listed (World Wide Web at iedb.org/). The sequences of the minimal epitopes comprised in the neoepitopes considered likely to have clinical utility can thus be run in the database in order to determine whether the minimal epitopes have high resemblance to epitopes known to be recognized by T cells.

The term "high resemblance" when applied to two sequences means that the sequences share significant similarity, i.e. the sum of identical and similar matches is high. The resemblance can be determined by calculating an alignment score, e.g. using BLOSUM62. The skilled person knows which threshold of alignment scores can be used to determine if the two sequences have high resemblance to one another. For example, for 9-mer epitopes, an alignment score >26 can aptly be used as threshold for selecting epitopes with high resemblance.

Normalised alignment scores can also be used to evaluate whether two peptide sequences have high resemblance to one another. For example, a normalised alignment score may be the BLOSUM62 alignment score obtained for a given minimal epitope and a given epitope in the IEDB database, divided by the alignment score between said minimal epitope and itself (corresponding to the maximal alignment score for this minimal epitope). To obtain a measure for resemblance, the result is then subtracted from 1. In other words, the following calculation may be performed:

Resemblance to known epitope=1−(alignment score minimal epitope)/(alignment score known epitope)

The higher the score, the higher the resemblance to the known epitope.

Number of Total Minimal Epitopes

Useful neoepitopes comprise at least one minimal epitope comprising a mutation, e.g. an immunogenic mutation, and having a length of between 5 and 20 amino acids, preferably between 6 and 19 amino acids, such as between 7 and 18 amino acids, for example between 8 and 17 amino acids, such as between 9 and 16 amino acids, for example between 10 and 15 amino acids, such as between 11 and 14 amino acids, for example 12 or 13 amino acids, such as 5, 6, 7, 8, 9, 10, 11, 12, 13, 14, 15, 16, 17, 18, 19, or 20 amino acids. Preferably, the minimal epitope has a length of 8 to 14 amino acids. A neoepitope may comprise several minimal epitopes, which may overlap. A neoepitope may thus comprise between 1 and 100 minimal epitopes, such as between 1 and 90 minimal epitopes, such as between 1 and 80 minimal epitopes, such as between 1 and 70 minimal epitopes, such as between 1 and 60 minimal epitopes, such as between 1 and 50 minimal epitopes, such as between 1 and 40 minimal epitopes, such as between 1 and 30 minimal epitopes, such as between 1 and 20 minimal epitopes, such as between 2 and 19 minimal epitopes, for example between 3 and 18 minimal epitopes, such as between 4 and 17 minimal epitopes, for example between 5 and 16 minimal epitopes, such as between 6 and 15 minimal epitopes, for example between 7 and 14 minimal epitopes, such as between 8 and 13 minimal epitopes, for example between 9 and 12 minimal epitopes, such as 10 or 11 minimal epitopes, all comprising the immunogenic mutation. A minimal epitope has affinity for an MHC molecule, such as an MHC I molecule or an MHC II molecule. The mutation comprised in the neoepitope is not necessarily centered in the minimal epitope, but may in some embodiments be centered in the minimal epitope. Thus, the mutation may be at the first or last residue of the minimal epitope, or any other residue therebetween. As described above, in preferred embodiments the mutation is in an anchoring position. In some embodiments, minimal epitopes having a mutation in a non-anchoring position are excluded or down-prioritised.

In general, a neoepitope may comprise n different minimal epitopes having a length of k amino acids all comprising the mutation. A given neoepitope may comprise minimal epitopes of different lengths.

Probability that a Mutation Occurs in Nature

In a preferred embodiment, the method of the present invention further comprises a step of determining a probability that a mutation present in the neoepitopes occurs in nature. Changing an amino acid in a protein may reduce its ability to carry out its function, or even change the function. Changes in proteins having important functions in the cell may potentially cause the cell to die. Conversely, the change may allow the cell to continue functioning albeit in a different manner, and may even lead to efficient/advantageous modifications compared to the original protein, allowing the mutation to be passed on to the organism's offspring. If the change does not result in any significant physical disadvantage to the offspring, the possibility that the mutation will persist within the population nevertheless exists. Since amino acids vary greatly in the physical and chemical properties, they are divided into groups with similar properties. Substituting an amino acid with another from the same group is more likely to have a smaller impact on the structure and function of a protein than replacement with an amino acid from a different category. Thus, neoepitopes comprising a mutated amino acid that is from a different physicochemical group than the reference amino acid are in some embodiments prioritized above neoepitopes comprising a mutated amino acid that is from the same physicochemical group as the reference amino acid.

Preferably, the mutation gives rise to an amino acid substitution. The term "substitution pair" as used herein refers to the pair consisting of the amino acid being substituted and of the amino acid which substitutes it.

Thus, in a preferred embodiment of the present invention, step d of the method described herein and above further comprises determining a score reflecting the similarity between the mutated amino acid sequence and the reference amino acid sequence.

To calculate the score for a specific amino acid substitution, substitution matrices may be used. Substitution matrices contain a probability or a log score based on the observed mutation frequencies in all available protein sequences. The lower the log odds score, the less likely is to observe this amino acid substitution when comparing naturally occurring amino acid sequences to each other. It has also been shown that the low log odds score correlates well with high difference in physicochemical properties between the amino acid substitution pair. For example a substitution with a low log odds score, or a lower probability/frequency of this mutation to occur in an evolutionary perspective, has a better chance of being discovered by a T cell receptor than a substitution with a high log odds score due to a larger difference in physicochemical properties between the newly formed mutated peptide (epitope) compared to the reference peptide. T cell receptors have the ability to tolerate not only self-peptides, but also peptides with high similarity to self-peptides, i.e. peptides having mutations with a high log score. This mechanism is known as central tolerance.

The probabilities used in the matrix calculation are computed by looking at "blocks" of conserved sequences found in multiple protein alignments. These conserved sequences are assumed to be of functional importance within related proteins and will therefore have lower substitution rates than less conserved regions. To reduce bias from closely related sequences on substitution rates, segments in a block with a sequence identity above a certain threshold have been clustered, reducing the weight of each such cluster (Henikoff, S; Henikoff, J G (1992). "Amino acid substitution matrices from protein blocks". Proceedings of the National Academy of Sciences of the United States of America. 89 (22): 10915-9.). For the BLOSUM62 matrix, this threshold has been set at 62%. Pair frequencies were then counted between clusters, hence pairs were only counted between segments less than 62% identical. One would use a higher numbered BLOSUM matrix for aligning two closely related sequences and a lower number for more divergent sequences.

Thus, in a preferred embodiment of the present invention a score reflecting the probability that an amino acid substitution present in the neoepitopes occurs randomly is determined using an evolutionary based scoring matrix. In a more preferred embodiment said scoring matrix is a log-odd matrix. In a particularly preferred embodiment said matrix is the BLOSUM matrix, preferably the BLOSUM62 matrix To calculate a BLOSUM matrix, the following equation is used:

$$S_{ij}=(1/\lambda)*\log(\rho_{ij}/(q_i*q_j))$$

$\rho_{ij}$ is the probability of two amino acids i and j replacing each other in a homologous sequence, and $q_i$ and $q_j$ are the background probabilities of finding the amino acids i and j in any protein sequence. The factor $\lambda$ is a scaling factor, set such that the matrix contains easily computable integer values.

Neoepitopes comprising a mutation where the amino acid substitution pair has a low BLOSUM62 score are ranked above neoepitopes with an amino acid substitution pair with a higher BLOSUM62 score.

In one embodiment, neoepitopes not comprising mutations linked to an amino acid substitution pair with a BLOSUM62 score below 3, such as for example below 2 are down-prioritized or excluded.

In a preferred embodiment of the present invention neoepitopes not comprising amino acid substitution pairs with a BLOSUM62 score below 1 are down-prioritized or excluded. Thus, preferably neoepitopes comprising at least one amino acid substitution pair with a BLOSUM62 score below 1 are prioritized or selected for clinical use.

In another embodiment of the present invention neoepitopes not comprising amino acid substitution pairs with a BLOSUM62 score below 1 are down-prioritised or excluded.

Thus, in one embodiment neoepitopes comprising at least one amino acid substitution pair with a BLOSUM62 score below 1 are prioritized or selected for clinical use.

For MHC I binding neoepitopes to be selected for potential clinical use, it is preferred that the neoepitope meets at least one of the following two criteria i and ii:

i. a high MHC I binding differential
ii. a low BLOSUM62 score.

In one embodiment, MHC I binding neoepitopes meeting at least one of the following two criteria i and ii:
   i. the MHC I binding differential for the neoepitope is above 1;
   ii. the neoepitope comprises an amino acid substitution with a BLOSUM62 score below 3, such as below 2, preferably below 1
are ranked higher than MHC I binding neoepitopes not meeting any of criteria i and ii.

In a preferred embodiment MHC I binding neoepitopes meeting at least one of the following two criteria i and ii:
   i. the MHC I binding differential for the neoepitope is above 3;
   ii. the neoepitope comprises an amino acid substitution with a BLOSUM62 score below 3, such as below 2, preferably below 1
are ranked higher than MHC I binding neoepitopes not meeting any of criteria i and ii.

In an even more preferred embodiment, MHC I binding neoepitopes meeting at least one of the following two criteria i and ii:
   i. the MHC I binding differential for the neoepitope is above 2;
   ii. the neoepitope comprises an amino acid substitution pair with a BLOSUM62 score below 3, such as below 2, preferably below 1
are ranked higher than MHC I binding neoepitopes not meeting any of criteria i and ii.

In some embodiments, MHC I binding neoepitopes not meeting any of the criteria i and ii above are preferably excluded or down-prioritized. In addition, in some embodiments MHC I binding neoepitopes meeting criteria i but wherein the mutation is a non-anchoring position are excluded or down-prioritised, as described herein above.

For MHC II binding neoepitopes to be selected for potential clinical use, it is preferred that at least one of the following two criteria i and ii is met:
   i. a high MHC II binding differential
   ii. a low BLOSUM62 score.

In one embodiment, MHC II binding neoepitopes meeting at least one of the following two criteria i and ii:
   i. the MHC II binding differential for the neoepitope is above 2
   ii. the neoepitope comprises an amino acid substitution pair with a BLOSUM62 score below 3, such as below 2 or preferably below 1
are ranked higher than MHC II binding neoepitopes not meeting any of criteria i and ii.

In a preferred embodiment MHC II binding neoepitopes meeting at least one of the following two criteria i and ii:
   i. the MHC II binding differential for the neoepitope is above 3
   ii. the neoepitope comprises an amino acid substitution pair with a BLOSUM62 score below 3, such as below 2 or preferably below 1
are ranked higher than MHC II binding neoepitopes not meeting any of criteria i and ii.

In an even more preferred embodiment, MHC II binding neoepitopes meeting at least one of the following two criteria i and ii:
   i. the MHC II binding differential for the neoepitope is above 2
   ii. the neoepitope comprises an amino acid substitution pair with a BLOSUM62 score below 1
are ranked higher than MHC II binding neoepitopes not meeting any of criteria i and ii.

MHC II binding neoepitopes not meeting any of the criteria i and ii above are preferably excluded or down-prioritized. In addition, in some embodiments MHC II binding neoepitopes meeting criteria i but wherein the mutation is a non-anchoring position are excluded or down-prioritised, as described herein above.

Level of RNA Expression

The level of RNA expression of the source gene where a mutation is found may be an important factor for the immunogenicity of a neoepitope. A higher RNA expression level will normally lead to a higher expression of the protein and presentation of the neoepitope on MHC molecules on the tumor cell and thus a higher potential for induction of cancer-specific immunogenicity.

Thus, in a preferred embodiment, the method of the present invention further comprises a step of determining the RNA expression levels of the neoepitopes.

In general neoepitopes with a high RNA expression level are ranked higher than neoepitopes with a lower RNA expression level.

In a particular embodiment, in step d of the present methods, MHC I binding neoepitopes with a high RNA expression level are ranked higher than MHC I binding neoepitopes with a lower RNA expression level. In another particular embodiment, MHC II binding neoepitopes with a high RNA expression level are ranked higher than MHC II binding neoepitopes with a lower RNA expression level.

Preferably, neoepitopes for which RNA of the source gene is not detected are excluded or down-prioritized. In particular, neoepitopes having a normalised transcript-level expression of 0 transcript per million (TPM) are excluded or down-prioritized. Transcripts having a detectable normalised transcript-level expression, such as a transcript-level expression above 0 TPM, are not excluded.

The RNA expression levels can be determined by RNA sequencing of nucleic acids obtained from the tumor samples as defined above. RNA sequencing can be performed by techniques known in the art. Methods for determining RNA expression levels are well known to the skilled person. For example, RNA expression levels can be determined using next-generation sequencing technologies such as for example the Illumina platform.

Risk of Autoimmunity

To minimize the risk of cross-reactivity, it is preferred that neoepitopes comprising a naturally occurring core peptide (such as a 9 aa long peptide including the mutation) that matches a peptide sequence in the human proteome are excluded or down-prioritized. Thus, the methods of the present invention may further comprise a step of comparing neoepitope peptide sequences with peptide sequences of the human proteome.

The human proteome is here defined as all translations resulting from known genes of the human genome. Known genes are published at World Wide Web at ensembl.org. Thus, for the purpose of determining if the neoepitope core peptide sequence matches a peptide sequence in the human proteome, the sequences may be compared with peptide sequences of the human genome obtained from a database.

The neoepitope core peptide sequences are comprised in the neoepitopes as described above. Neoepitopes comprising a peptide sequence including a mutation, which matches a naturally occurring peptide sequence in the human proteome will preferably be excluded or down-prioritized.

This is because, without being bound by theory, it is expected that mutations matching a naturally occurring peptide sequence are at greater risk of being tolerated by T cell receptors as a consequence of central tolerance, and are thus expected to be less immunogenic than mutations which do not match a naturally occurring sequence.

In one embodiment, the neoepitope core peptide sequence, which is compared with peptide sequences of the human genome, comprises or consists of 9 to 27 amino acids, such as for example 10 to 25 amino acids, such as 11 to 15 amino acids or such as 12, 13 or 14 amino acids.

In one embodiment, the neoepitope peptide sequence, which is compared with peptide sequences of the human genome, comprises or consists of 5 to 15 amino acids, such as for example 6 to 12 amino acids, preferably 7 to 11 amino acids or more preferably 8 to 10 amino acids.

In a preferred embodiment said neoepitope peptide sequence, which is compared with peptide sequences of the human genome, comprises or consists of 9 amino acids.

In another embodiment said neoepitope peptide sequence, which is compared with peptide sequences of the human genome, comprises or consists of 15 amino acids, 14 amino acids, 13 amino acids, 12 amino acids, 11 amino acids or for example 10 amino acids.

The neoepitope peptide sequence comprises the neoepitope mutation. In a preferred embodiment said mutation is an amino acid substitution. It will be clear to the skilled person that instead of comparing the sequence of a given neoepitope to peptide sequences of the human genome, it is possible to compare the sequence of the minimal epitopes comprised within said neoepitope to peptide sequences of the human genome.

To further minimize the risk of organ-specific autoimmunity, neoepitopes which are found in genes that are highly expressed in specific organs/tissues, will be excluded or down-prioritized in some embodiments.

In one embodiment, neoepitopes or minimal epitopes present in genes, wherein said genes show at least 3-fold, such as at least 4-fold higher RNA expression level in any organ compared to other tissues, are excluded or down-prioritized.

In a preferred embodiment, neoepitopes or minimal epitopes such as MHC I and/or MHC II binding neoepitopes, present in genes, wherein said genes show at least 5-fold higher RNA expression level in any organ compared to other tissues, are excluded or down-prioritized.

In another embodiment, neoepitopes or minimal epitopes, such as MHC I and/or MHC II binding neoepitopes or minimal epitopes, present in genes, wherein said genes show at least 6-fold, at least 7-fold or such as at least 8-fold higher RNA expression level in any organ compared to other tissues, are excluded or down-prioritized.

It is preferred that the organ and the tissue are from the same species such as a human. RNA expression levels can for example be obtained from databases such as for example World Wide Web at gtexportal.org. RNA expression levels are also described in Uhlén, M. et al. (2015) (Uhlén, M. et al. (2015) "Proteomics. Tissue-based map of the human proteome." Science; 347(6220)). Alternatively, the RNA expression levels are obtained from the individual from which the neoepitopes are derived.

The organ can for example be selected from heart and brain. In another embodiment said organ is selected from liver, lungs, stomach, kidney, spleen, colon and intestine.

Allele Frequency

In one embodiment, the methods of the present invention comprise a step of determining the allele frequency of the mutation present in each neoepitope. The term allele frequency as used herein refers to the relative frequency of an allele sequence containing a specific genomic mutation at a particular locus compared to the total number of sequences for all alleles at this specific genomic region. The term mutant allele frequency refers to the frequency of alleles comprising the mutation or the neoepitope mutation and is used herein interchangeably with the term variant allele frequency (VAF). In general, a high mutant allele frequency or VAF is indicative of a higher clinical utility. A high mutant allele frequency or VAF is indicative of a higher proportion of cancer cells containing the same mutation. Thus, without being bound by theory, neoepitopes having a high allele frequency or VAF may be expected to be present in a higher proportion of cancer cells than neoepitopes having a low mutant allele frequency or VAF.

In a particular embodiment, MHC I binding neoepitopes with a high mutant allele frequency or VAF are ranked higher than MHC I binding neoepitopes with a lower mutant allele frequency or VAF. In another particular embodiment, MHC II binding neoepitopes with a high mutant allele frequency or VAF are ranked higher than MHC II binding neoepitopes with a lower mutant allele frequency or VAF.

The allele frequency of a mutation can for example be determined by analysing the sequencing data from the tumor samples and comparing the frequency of the mutant allele with other alleles present in the same gene.

In some embodiments, a mutant allele frequency or VAF greater than 0.05 is indicative of clinical utility for the minimal epitope or neoepitope comprising said mutation. Thus in some embodiments, a neoepitope or minimal epitope comprising a mutation having a VAF greater than 0.05, such as greater than 0.06, such as greater than 0.07, such as greater than 0.08, such as greater than 0.09, such as greater than 0.1, such as greater than 0.15, such as greater than 0.20, is ranked higher than a neoepitope or minimal epitope comprising a mutation having a VAF equal to or lower than 0.05, such as equal to or lower than 0.06, such as equal to or lower than 0.07, such as equal to or lower than 0.08, such as equal to or lower than 0.09, such as equal to or lower than 0.1, such as equal to or lower than 0.15, such as equal to or lower than 0.20, respectively.

Variant Calling

Many types of somatic mutation identification software (variant callers) are available in the art. In some embodiments, neoepitopes or minimal epitopes are considered likely to have clinical utility if the mutations they comprise are identified by at least two different variant callers. Thus in some embodiments the neoepitopes or minimal epitopes are ranked depending on how many variant callers identify the mutation(s) they contain. Neoepitopes or minimal epitopes comprising mutation(s) that are identified by at least two different variant callers are ranked higher than neoepitopes or minimal epitopes comprising mutation(s) that are identified by only one variant caller. In some embodiments, the mutation is identified by at least 3 different variant callers, such as at least 4 different variant callers, such as at least 5 different variant callers, such as at least 6 different variant callers, such as at least 7 different variant callers, such as at least 8 different variant callers, such as at least 9 different variant callers, such as 10 different variant callers or more.

Similarity to Known Cancer Related Gene

In some embodiments, neoepitopes that arise from a known cancer related gene are prioritized.

A cancer related gene is defined as a gene which is involved in the development of cancer. Cancer related genes can be found e.g. in the Catalogue Of Somatic Mutations in Cancer (COSMIC) database, or other databases containing a curated list of cancer-associated mutations and/or genes, as is known to the skilled person. Thus, a match to a known cancer related gene can be found by comparing the neoepitope's source gene, genomic position or variant position (HGVS-nomenclature) with the corresponding information in the COSMIC database.

In some embodiments, neoepitopes are considered likely to be of clinical utility if the gene in which they are comprised is a gene which is known to be associated with cancer. Such neoepitopes are thus prioritized above neoepitopes comprised in genes which are not known to be associated with cancer.

Clonality

The term "clonality" as used herein refers to the occurrence of the neoepitope across tumor samples. If for example a neoepitope or a minimal epitope is found in more than one tumor biopsy, it is indicative of a high clonality and thus a higher likelihood to be present in the majority of cancer cells and thus a higher likelihood to be of clinical utility.

The clonality of a neoepitope can be determined by obtaining at least two tumor samples from the same individual and determining whether a mutation is present in more than one biopsy. Preferably, neoepitopes found in more than one tumor sample are prioritized above neoepitopes that are found in only one biopsy. By "more than one tumor sample" is understood several samples originating from the same individual, either from the same lesion or from different lesions.

In some embodiments, minimal epitopes or neoepitopes having a mutation found in at least two different samples from the same individual are likely to have a higher clinical utility than minimal epitopes or neoepitopes having a mutation found in only one tumor sample. In some embodiments, the at least two different samples are samples from:

the same tumor or lesion, for example multi-angled biopsies from the same tumor or lesion at least two different tumors or lesions at least one tumor or lesion and at least one archival tumor material such as an archival biopsy or archival resected material from the tumor or lesion, where finding minimal epitopes or neoepitopes comprising the mutation in at least two different samples is indicative of a higher clinical utility. The term "archival tumor material" refers to material sampled at earlier time points from tumour tissue from the same individual, for example an archival biopsy or archival resected material from the tumor or lesion.

In some embodiments the at least two different samples is at least three different samples, such as at least four different samples, such as at least five different samples, such as at least six different samples, such as at least seven different samples, such as at least eight different samples, such as at least nine different samples, such as at least ten different samples or more. In some embodiments at least one of the at least two different samples is archival tumor material from the individual and at least one of the at least two different samples is a sample from a tumor or a lesion.

Liquid Biopsies

It may be advantageous, when selecting neoepitopes comprising minimal epitopes which are likely to have clinical utility, to determine whether the neoepitopes or minimal epitopes are also found in the individual's plasma. Thus in some embodiments, the methods comprise sequencing of the nucleic acid sequences from cell free DNA, for example circulating tumour DNA in plasma from a liquid biopsy obtained from the individual. This may be useful to identify, confirm and/or track neoepitopes, and can be done e.g. by sequencing cell free DNA.

In some embodiments, a neoepitope which is found in circulating tumor DNA in a plasma sample from the individual is ranked higher than a neoepitope which is not found in said sample.

The Individual

The individual according to the method of the present invention is preferably a human. Preferably the individual or the human is a cancer patient. Thus, the individual is preferably a human having cancer. The cancer can be all types of cancer. Preferably the individual has at least one tumor.

The cancer may be any cancer wherein the cancer cells comprise at least one mutation. The cancer may be a primary tumor, metastasis or both. The tumor examined for mutations may be a primary tumor or a metastasis. The cancer to be treated may be a cancer known to have a high mutational load, such as melanomas or lung cancer. The cancer to be treated may also be a cancer characterised by only one cancer-specific mutation.

Further Criteria

It is preferred that the MHC I binding and/or MHC II binding neoepitopes fulfil at least one of the following criteria i-vii:
  i. a high RNA expression level
  ii. a high allele frequency
  iii. a high clonality
  iv. match a known cancer related gene
  v. comprise a mutation identified by at least two different variant callers
  vi. are also found in the individual's plasma as determined e.g. by sequencing cell free DNA
  vii. are found in at least two samples from the same individual, such as two samples from the same lesion or from two different lesions, or at least one tumor or lesion and at least one archival tumor material sample from the tumor or lesion.

RNA expression level, allele frequency, clonality, match to a known cancer related gene, identification by at least two different variant callers, presence in the individual's plasma, and presence in at least two samples from the same individual are as defined herein above.

In a more preferred embodiment the MHC I binding and/or MHC II binding neoepitopes fulfil at least two of the following criteria i-vii:
  i. a high RNA expression level
  ii. a high allele frequency
  iii. a high clonality
  iv. match a known cancer related gene
  v. comprise a mutation identified by at least two different variant callers
  vi. are also found in the individual's plasma as determined e.g. by sequencing cell free DNA
  vii. are found in at least two samples from the same individual, such as two samples from the same lesion or from two different lesions, or at least one tumor or lesion and at least one archival tumor material sample from the tumor or lesion.

In an even more preferred embodiment the MHC I binding and/or MHC II binding neoepitopes fulfil at least three of the following criteria i-vii:
  i. a high RNA expression level
  ii. a high allele frequency
  iii. a high clonality
  iv. match a known cancer related gene v. comprise a mutation identified by at least two different variant callers
vi. are also found in the individual's plasma as determined e.g. by sequencing cell free DNA
vii. are found in at least two samples from the same individual, such as two samples from the same lesion or from two different lesions, or at least one tumor or lesion and at least one archival tumor material sample from the tumor or lesion.

In a preferred embodiment the MHC I binding and/or MHC II binding neoepitopes fulfil at least four of the following criteria i-vii:
i. a high RNA expression level
ii. a high allele frequency
iii. a high clonality
iv. match a known cancer related gene
v. comprise a mutation identified by at least two different variant callers
vi. are also found in the individual's plasma as determined e.g. by sequencing cell free DNA
vii. are found in at least two samples from the same individual, such as two samples from the same lesion or from two different lesions, or at least one tumor or lesion and at least one archival tumor material sample from the tumor or lesion.

In another preferred embodiment the MHC I binding and/or MHC II binding neoepitopes fulfil at least five of the following criteria i-vii:
i. a high RNA expression level
ii. a high allele frequency
iii. a high clonality
iv. match a known cancer related gene
v. comprise a mutation identified by at least two different variant callers
vi. are also found in the individual's plasma as determined e.g. by sequencing cell free DNA
vii. are found in at least two samples from the same individual, such as two samples from the same lesion or from two different lesions, or at least one tumor or lesion and at least one archival tumor material sample from the tumor or lesion.

In another preferred embodiment the MHC I binding and/or MHC II binding neoepitopes fulfil six of the following criteria i-vii:
i. a high RNA expression level
ii. a high allele frequency
iii. a high clonality
iv. match a known cancer related gene
v. comprise a mutation identified by at least two different variant callers
vi. are also found in the individual's plasma as determined e.g. by sequencing cell free DNA
vii. are found in at least two samples from the same individual, such as two samples from the same lesion or from two different lesions, or at least one tumor or lesion and at least one archival tumor material sample from the tumor or lesion.

In another preferred embodiment the MHC I binding and/or MHC II binding neoepitopes fulfil all of the following criteria i-vii:
i. a high RNA expression level
ii. a high allele frequency
iii. a high clonality
iv. match a known cancer related gene
v. comprise a mutation identified by at least two different variant callers
vi. are also found in the individual's plasma as determined e.g. by sequencing cell free DNA
vii. are found in at least two samples from the same individual, such as two samples from the same lesion or from two different lesions, or at least one tumor or lesion and at least one archival tumor material sample from the tumor or lesion.

The criteria i-vii above are not listed in any preferred order, and may be prioritized in any manner. RNA expression level, allele frequency, clonality, match to a known cancer related gene, identification by at least two different variant callers, presence in the individual's plasma, and presence in at least two samples from the same individual are as defined herein above.

Thus, preferably MHC I binding and/or MHC II binding neoepitopes with a higher RNA expression level are ranked above neoepitopes with a lower RNA expression level.

Preferably, MHC I binding and/or MHC II binding neoepitopes with a higher allele frequency are ranked above neoepitopes with a lower allele frequency.

Preferably, MHC I binding and/or MHC II binding neoepitopes with a higher clonality are ranked above neoepitopes with a lower clonality.

Preferably, MHC I binding and/or MHC II binding neoepitopes matching a known cancer related gene are ranked above neoepitopes not matching a known cancer related gene.

Preferably, MHC I binding and/or MHC II binding neoepitopes comprising a mutation identified by at least two different variant callers are ranked above neoepitopes comprising a mutation identified by only one variant caller.

Preferably, MHC I binding and/or MHC II binding neoepitopes which are found in the individual's plasma are ranked above neoepitopes which are not found in the individual's plasma.

Preferably, MHC I binding and/or MHC II binding neoepitopes which are found in two or more samples from the same individual are ranked above neoepitopes which are found in only one sample from the individual. The two or more samples may be samples from the same lesion or from different lesions, or from at least one tumor or lesion and at least one archival tumor material sample from the tumor or lesion.

Number of Selected Neoepitopes

The neoepitopes which are selected for the individual are preferably used in a cancer vaccine such as a cancer vaccine construct, preferably a nucleotide vaccine construct. The vaccine is also referred to as a personalized cancer vaccine. The vaccine is immunogenic.

In the method according to the present invention, A neoepitopes having clinical utility are selected. The A neoepitopes are preferably used in a cancer vaccine or in a cancer vaccine construct. Thus, the A neoepitopes are preferably included in the same vaccine construct. The vaccine construct is preferably a nucleotide construct. The nucleotide construct can be an RNA construct and/or a DNA construct. Preferably, the vaccine is a DNA construct, also referred to as a vaccibody DNA vaccine.

A is an integer. For example A is at least 1, such as at least 3, such as at least 5, such as at least 7, or for example at least 10, for example at least 20, such as at least 30, such as 40 or more. A may be a predetermined number.

In addition, the inventors of the present invention have found that increasing the numbers of neoepitopes in the vaccine constructs from 1 to 3 neoepitopes or from 3 neoepitopes to 10 neoepitopes leads to a surprising increase in the immune response. In addition, it has been found that increasing the number of neoepitopes in the vaccine constructs from 10 neoepitopes to 15 or 20 neoepitopes leads to a further increase in the immune response. In some embodiments, the number of neoepitopes in the vaccine construct is between 20 and 40, such as 30. In some embodiments, the number of neoepitopes in the vaccine construct is 40 or more.

In one embodiment A is an integer of from 3 to 100, such as from 3 to 75, such as from 3 to 50, such as from 3 to 30, such as from 3 to 20, such as from 3 to 15 or such as for example from 3 to 10 neoepitopes.

In another embodiment A is an integer of from 5 to 50, such as from 5 to 30, such as for example from 5 to 25, such as from 5 to 20, such as from 5 to 15, such as from 5 to 10.

In a further embodiment A is an integer of from 10 to 50, such as from 10 to 40, such as from 10 to 30, such as from 10 to 20, such as from 10 to 25, such as from 10 to 20 or such as for example from 10 to 15.

The neoepitopes selected by the present methods may be used to design vaccibody vaccines, which are described in detail further below. Vaccibody vaccines comprise at least one antigenic unit, a targeting unit and a dimerization unit. The neoepitopes are preferably comprised in the antigenic unit.

The inventors of the present invention have shown that vaccibody DNA vaccines comprising 10 neoepitopes induce a stronger and broader total immune response than vaccibody DNA vaccines comprising only 3 neoepitopes. Similarly, vaccibody DNA vaccines comprising 20 neoepitopes induce a stronger and broader total immune response than vaccines comprising only 10 neoepitopes. However, the cancer to be treated may be associated with only one cancer-specific neoepitope, and it may not be possible to construct a vaccibody DNA vaccine comprising more than one epitope.

In a preferred embodiment A is an integer of from 10 to 20.

In another embodiment A is an integer of from 15 to 50, such as from 15 to 30 or such as from 15 to 20.

In a specific embodiment A is 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40.

In one embodiment, the antigenic unit comprises one copy of each cancer neoepitope, so that when 10 neoepitopes are included in the vaccine, a cell-mediated immune response against 10 different neoepitopes can be evoked.

In the method of the present invention x neoepitopes among the highest ranking of MHC I binding neoepitopes are selected, whereas y neoepitopes among the highest ranking MHC II binding neoepitopes are selected, wherein x+y=A. A is the total number of neoepitopes selected. A is as defined herein above.

x and y are integers.

In a preferred embodiment x>y. For example, x≥2y. In another embodiment x>2.5y. I one embodiment x≥3y.

In one embodiment 0.5A<x<A, wherein A is as defined above. Preferably A is an integer of from 10 to 20.

In another embodiment 0.6A<x<A, such as 0.7A<x<A, such as for example 0.8A<x<A wherein A is as defined above. Preferably A is an integer of from 10 to 20.

Specific Methods

In a particular embodiment, the method is a method for selecting a number A of neoepitopes for an individual, said method comprising the steps of:
 a. Obtaining one or more neoepitopes from said individual, each neoepitope comprising at least one minimal epitope, wherein each neoepitope comprises at least one immunogenic mutation compared to reference sequences;
 b. Determining MHC I binding affinity for at least one minimal epitope, such as at least two, three or four minimal epitopes within each of said neoepitopes, and determining the number of MHC I binding minimal epitopes for each of said neoepitopes; thereby identifying x MHC I binding neoepitopes;
 c. Ranking the neoepitopes as follows:
  i. prioritizing neoepitopes comprising a high number of minimal epitopes and select a first group of neoepitopes having a high score;
  ii. optionally, prioritizing neoepitopes from the first group of neoepitopes as follows:
   1) if the mutation is in an anchoring position and the binding differential of the minimal epitope is equal to or greater than 20, the minimal epitope has the highest score;
   2) if the mutation is in a non-anchoring position and the binding differential of the minimal epitope is equal to or greater than 20, the score of the minimal epitope is lower than the score for the minimal epitopes of 1);
   3) if the mutation is in an anchoring position and the binding differential of the minimal epitope is lower than 20 and equal to or greater than 3, the score of the minimal epitope is lower than the score the minimal epitopes of 2);
   4) if the mutation is in a non-anchoring position and the binding differential of the minimal epitope is lower than 20 and equal to or greater than 3, the score of the minimal epitope is lower than the score the minimal epitopes of 3);
   5) if the mutation is in an anchoring position and the binding differential of the minimal epitope is less than 3, the score of the minimal epitope is lower than the score of the minimal epitopes of 4);
   6) if the mutation is in a non-anchoring position and the binding differential of the minimal epitope is less than 3, the score of the minimal epitope is lower than the score of the minimal epitopes of 5);
   7) if the minimal epitope has a mutation with a binding differential lower than 1, regardless of the position of the mutation, the minimal epitope has the lowest score,
   wherein the MHC I binding differential is given by the formula (% Rank score (MHC I) for reference)/(% Rank score (MHC I) for minimal epitope); and selecting a second group of neoepitopes having a high score;
  iii. optionally, prioritizing neoepitopes from second group based on their MHC I % Rank score and selecting a third group of neoepitopes having a low MHC I % Rank score;
  iv. optionally, selecting a fourth group of neoepitopes including minimal epitopes with high resemblance to epitopes known to be recognized by T cells;
  v. optionally, prioritizing neoepitopes from the third group or from the fourth group based on their BLOSUM score, wherein a BLOSUM score less than a predetermined threshold is ranked higher than a BLOSUM score equal to or greater than said threshold, and selecting a fifth group of neoepitopes having a BLOSUM score less than said threshold, wherein said threshold preferably is 1;

wherein the first, second, third, fourth or fifth group of neoepitopes comprises said A neoepitopes.

In a particular embodiment, the method is a method for selecting a number A of neoepitopes for an individual, said method comprising the steps of:
a. Obtaining one or more neoepitopes from said individual, each neoepitope comprising at least one minimal epitope, wherein each neoepitope comprises at least one immunogenic mutation compared to reference sequences;
b. Determining MHC I binding affinity for at least one minimal epitope, such as at least two, three or four minimal epitopes within each of said neoepitopes, and determining the number of MHC I binding minimal epitopes for each of said neoepitopes; thereby identifying x MHC I binding neoepitopes;
c. Ranking the neoepitopes as follows:
  i. prioritizing neoepitopes comprising a high number of minimal epitopes and select a first group of neoepitopes having a high score;
  ii. optionally, prioritizing neoepitopes from the first group of neoepitopes as follows:
    1) if the mutation is in an anchoring position and the binding differential of the minimal epitope is equal to or greater than 20, the minimal epitope has the highest score;
    2) if the mutation is in a non-anchoring position and the binding differential of the minimal epitope is equal to or greater than 20, the score of the minimal epitope is lower than the score for the minimal epitopes of 1);
    3) if the mutation is in an anchoring position and the binding differential of the minimal epitope is lower than 20 and equal to or greater than 3, the score of the minimal epitope is lower than the score the minimal epitopes of 2);
    4) if the mutation is in a non-anchoring position and the binding differential of the minimal epitope is lower than 20 and equal to or greater than 3, the score of the minimal epitope is lower than the score the minimal epitopes of 3);
    5) if the mutation is in an anchoring position and the binding differential of the minimal epitope is less than 3, the score of the minimal epitope is lower than the score of the minimal epitopes of 4);
    6) if the mutation is in a non-anchoring position and the binding differential of the minimal epitope is less than 3, the score of the minimal epitope is lower than the score of the minimal epitopes of 5);
    7) if the minimal epitope has a mutation with a binding differential lower than 1, regardless of the position of the mutation, the minimal epitope has the lowest score,
    wherein the MHC I binding differential is given by the formula (% Rank score (MHC I) for reference)/(% Rank score (MHC I) for minimal epitope); and selecting a second group of neoepitopes having a high score;
  iii. optionally, prioritizing neoepitopes from second group based on their MHC I % Rank score and selecting a third group of neoepitopes having a low MHC I % Rank score;
  iv. optionally, selecting a fourth group of neoepitopes including minimal epitopes with high resemblance to epitopes known to be recognized by T cells;
  v. optionally, prioritizing neoepitopes from the third group or from the fourth group based on their BLOSUM score, wherein a BLOSUM score less than a predetermined threshold is ranked higher than a BLOSUM score equal to or greater than said threshold, and selecting a fifth group of neoepitopes having a BLOSUM score less than said threshold, wherein said threshold preferably is 1;
  vi. optionally, selecting neoepitopes from the first, second, third, fourth or fifth group of neoepitopes based on the neoepitopes being found in two or more samples, and selecting a sixth group
  vii. optionally, selecting neoepitopes from the first, second, third, fourth, fifth or sixth group of neoepitopes based on the identification of the mutation by at least two different variant callers, and selecting a seventh group of neoepitopes comprising a mutation identified by at least two different variant callers,
wherein the first, second, third, fourth, fifth, sixth or seventh group of neoepitopes comprises said A neoepitopes.

The method may also further comprise ranking the neoepitopes according to any of the additional parameters described herein, such as clonality, levels of RNA expression and allele frequency.

In some embodiments, the second group is a subgroup of the first group. In some embodiments, the third group is a subgroup of the second group and/or of the first group. In some embodiments, the fourth group is a subgroup of the third group and/or of the second group and/or of the first group. In some embodiments, the fifth group is a subgroup of the fourth group and/or of the third group and/or of the second group and/or of the first group. In some embodiments, the sixth group is a subgroup of the fifth group and/or of the fourth group and/or of the third group and/or of the second group and/or of the first group. In some embodiments the seventh group is a subgroup of the sixth group and/or of the fifth group and/or of the fourth group and/or of the third group and/or of the second group and/or of the first group. Subgroups may be of identical sizes.

In one embodiment, the method comprises step i. above. In another embodiment, the method comprises steps i. and ii. above. In another embodiment, the method comprises steps i. and iii. above. In another embodiment, the method comprises steps i. and iv. above. In another embodiment, the method comprises steps i., ii. and iii. above. In another embodiment, the method comprises steps i., ii. and iv. above. In another embodiment, the method comprises steps i., iii. and iv. above. In another embodiment, the method comprises steps i., ii., iii. and iv. above. In some embodiments, the method further comprises step v. and/or step vi. and/or step vii. above.

In one embodiment, the method for selecting a number A of neoepitopes for an individual suffering from or suspected of suffering from cancer comprises the steps of:
a. Obtaining one or more neoepitopes from said individual, each neoepitope comprising at least one minimal epitope, wherein each neoepitope comprises at least one mutation such as an immunogenic mutation compared to a reference sequence, wherein the minimal epitope consists of a number of amino acids equal to or smaller than the number of amino acids of the neoepitope and comprises said at least one mutation; wherein preferably obtaining the neoepitopes comprises the step of identifying mutations in nucleic acid sequences which are specific for the tumor;
b. Determining MHC I and/or MHC II binding affinity for at least one minimal epitope, such as at least two, three or four minimal epitopes within each of said neoepitopes, optionally wherein the binding affinity is determined by in silico prediction;
c. Selecting neoepitopes comprising at least one minimal epitope predicted to bind to MHC I and/or to MHC II, thereby obtaining MHC binding neoepitopes;
d. Ranking the MHC binding neoepitopes with respect to their likelihood of clinical utility as described herein;
e. Selecting A neoepitopes among the highest ranking MHC binding neoepitopes, thereby selecting A neoepitopes likely to have clinical utility, wherein step d further comprises ranking the neoepitopes as follows:
  i) determining whether the mutation is in an anchoring position or a non-anchoring position of the minimal neoepitope for each minimal epitope comprised within the neoepitope;
  ii) prioritizing the neoepitopes,
    optionally wherein prioritizing the neoepitopes in step ii) is performed by assigning to each neoepitope the highest score of the minimal epitopes they comprise, and wherein the prioritizing of the neoepitopes is performed as follows:
      1) if the mutation is in an anchoring position and the binding differential of the minimal epitope is equal to or greater than 20, the minimal epitope has the highest score;
      2) if the mutation is in a non-anchoring position and the binding differential of the minimal epitope is equal to or greater than 20, the score of the minimal epitope is lower than the score for the minimal epitopes of 1);
      3) if the mutation is in an anchoring position and the binding differential of the minimal epitope is lower than 20 and equal to or greater than 3, the score of the minimal epitope is lower than the score the minimal epitopes of 2);
      4) if the mutation is in a non-anchoring position and the binding differential of the minimal epitope is lower than 20 and equal to or greater than 3, the score of the minimal epitope is lower than the score the minimal epitopes of 3);
      5) if the mutation is in an anchoring position and the binding differential of the minimal epitope is less than 3 and equal to or greater than 1, the score of the minimal epitope is lower than the score of the minimal epitopes of 4);
      6) if the mutation is in a non-anchoring position and the binding differential of the minimal epitope is less than 3 and equal to or greater than 1, the score of the minimal epitope is lower than the score of the minimal epitopes of 5);
      7) if the minimal epitope has a mutation with a binding differential lower than 1, regardless of the position of the mutation, the minimal epitope has the lowest score.

In one embodiment, the method for selecting a number A of neoepitopes for an individual suffering from or suspected of suffering from cancer comprises the steps of:
  a. Obtaining one or more neoepitopes from said individual, each neoepitope comprising at least one minimal epitope, wherein each neoepitope comprises at least one mutation such as an immunogenic mutation compared to a reference sequence, wherein the minimal epitope consists of a number of amino acids equal to or smaller than the number of amino acids of the neoepitope and comprises said at least one mutation; wherein preferably obtaining the neoepitopes comprises the step of identifying mutations in nucleic acid sequences which are specific for the tumor;
  b. Determining MHC I and/or MHC II binding affinity for at least one minimal epitope, such as at least two, three or four minimal epitopes within each of said neoepitopes, optionally wherein the binding affinity is determined by in silico prediction;
  c. Selecting neoepitopes comprising at least one minimal epitope predicted to bind to MHC I and/or to MHC II, thereby obtaining MHC binding neoepitopes;
  d. Ranking the MHC binding neoepitopes with respect to their likelihood of clinical utility;
  e. Selecting A neoepitopes among the highest ranking MHC binding neoepitopes, thereby selecting A neoepitopes likely to have clinical utility,
wherein step d comprises ranking the neoepitopes with respect to the number of minimal epitopes they comprise, where a higher number of minimal epitopes gives a higher rank.

In another embodiment, the method for selecting a number A of neoepitopes for an individual suffering from or suspected of suffering from cancer comprises the steps of:
  a. Obtaining one or more neoepitopes from said individual, each neoepitope comprising at least one minimal epitope, wherein each neoepitope comprises at least one mutation such as an immunogenic mutation compared to a reference sequence, wherein the minimal epitope consists of a number of amino acids equal to or smaller than the number of amino acids of the neoepitope and comprises said at least one mutation; wherein preferably obtaining the neoepitopes comprises the step of identifying mutations in nucleic acid sequences which are specific for the tumor;
  b. Determining MHC I and/or MHC II binding affinity for at least one minimal epitope, such as at least two, three or four minimal epitopes within each of said neoepitopes, optionally wherein the binding affinity is determined by in silico prediction;
  c. Selecting neoepitopes comprising at least one minimal epitope predicted to bind to MHC I and/or to MHC II, thereby obtaining MHC binding neoepitopes;
  d. Ranking the MHC binding neoepitopes with respect to their likelihood of clinical utility;
  e. Selecting A neoepitopes among the highest ranking MHC binding neoepitopes, thereby selecting A neoepitopes likely to have clinical utility,
wherein step d comprises ranking the neoepitopes with respect to the number of samples in which they are found, wherein neoepitopes found in a higher number of samples are ranked higher than neoepitopes found in a lower number of samples, preferably wherein the samples are samples from different lesions.

Each of the above steps of the specific methods described in this section may be as described herein elsewhere.

Vaccine

Another aspect of the present invention relates to a method of preparing a cancer vaccine comprising neoepitopes, said method comprising a step of selecting said neoepitopes using the methods for selecting neoepitopes as defined herein.

In some embodiments 10-40 neoepitopes are selected. That is, A is an integer of from 10 to 40. In other embodiment, 10-30 or 10-20 neoepitopes are selected.

In one embodiment said cancer vaccine comprises a nucleotide construct comprising:

a targeting unit
a dimerization unit
a first linker
an antigenic unit, wherein said antigenic unit comprises A-1 antigenic subunits, each subunit comprising a sequence encoding at least one of said neoepitopes and a second linker and said antigenic unit further comprising a final sequence encoding one of said neoepitopes, wherein A is an integer from 1 to 100, such as from 3 to 50.
wherein said nucleotide construct is applied to the anti-cancer vaccine in an immunologically effective amount.

The integer A is as described herein and above. The above DNA vaccine is also called a vaccibody DNA vaccine.

The present invention relates to a vaccine prepared by the method as described above.

Thus, the neoantigen vaccines provided by the methods described herein may comprise a polynucleotide encoding a polypeptide comprising three units, i.e. a targeting unit, a dimerization unit and an antigenic unit. Due to the dimerization unit the polypeptide forms a dimeric protein called a vaccibody.

The genes encoding the three units are genetically engineered to be expressed as one gene. When expressed in vivo, the polypeptides/dimeric proteins target antigen presenting cells (APCs), which results in enhanced vaccine potency compared to identical non-targeted antigens.

Antigenic Unit

The antigenic unit comprises a plurality of tumor neoepitopes, wherein each neoepitope corresponds to a mutation identified in a tumor neoantigen. Said mutation may be one or more mutations, as explained above.

In the antigenic unit, all but the last of the tumor neoepitopes are arranged in antigenic subunits, wherein each subunit consists of a tumor neoepitope sequence and a second linker, whereas the last subunit comprises a neoepitope only, i.e. no such second linker. Due to the separation of the tumor neoepitope sequences by said second linker, each neoepitope is presented in an optimal way to the immune system, whereby the efficiency of the vaccine is ensured as discussed below.

The cancer neoepitope sequence preferably has a length suitable for presentation by the MHC molecules discussed above. Preferred neoepitope lengths are described above.

In order to avoid that tumors escape the immune system by shutting down expression of a mutated gene if the vaccine is directed towards the expression product of said gene, it is preferred to include a plurality of different neoepitopes into the antigenic unit. In general the more genes the tumor has to shut down the less likely is it that the tumor is capable of shutting down all of them and still be able to proliferate or even survive. Furthermore, the tumor may be heterogeneous in that not each and every neoantigen is expressed by all the tumor cells. Accordingly, in accordance with the present invention, the approach is to include many neoepitopes into the vaccine in order to attack the tumor efficiently. Preferably, the plurality of neoepitopes targets the expression of a plurality of genes. Also, in order to secure that all neoepitopes are loaded efficiently to the same antigen presenting cell they are arranged as one amino acid chain instead of as discrete peptides.

The number of neoepitopes that are selected and included in the vaccine construct is as described above.

In one embodiment, the antigenic unit comprises one copy of each cancer neoepitope, so that a response can be evoked against as many different neoepitopes as are included in the vaccine. For example, when 10 neoepitopes are included in the vaccine a cell-mediated immune response against 10 different neoepitopes can be evoked, or when 20 neoepitopes are included in the vaccine a cell-mediated immune response against 20 different neoepitopes can be evoked. In some embodiments, the vaccine may comprise more than 20 neoepitopes, thereby evoking a response against as many neoepitopes.

If however only a few relevant antigenic mutations are identified, then the antigenic unit may comprise at least two copies of at least one neoepitope in order to strengthen the immune response to these neoepitopes. Also for manufacturing and regulatory reasons it may be an advantage to keep the length of plasmid and i.e. the antigenic unit constant or of similar length, and therefore it may be advantageous to include more than one copy of the same neoepitope in the antigenic unit.

As discussed above, it may be an advantage to keep the length of the antigenic unit constant, and therefore it is preferred in one embodiment that all the cancer neoepitope sequences have identical length. However, if one or more of the neoepitopes result from a mutation leading to a frame shift or stop codon mutation, the neoepitope may have a substantial length, such as consisting of at least the mutated part of the protein, the most antigenic portion of the mutated protein or maybe of the whole mutated protein, whereby the length of at least one of the neoepitopes is substantially longer than the neoepitopes arising from a non-synonymous point mutation.

The length of the antigenic unit is primarily determined by the length of the neoepitopes and the number of neoepitopes arranged in the antigenic unit and is from about 21 to 1500, preferably from about 30 amino acids to about a 1000 amino acids, more preferably from about 50 to about 500 amino acids, such as from about 100 to about 400 amino acids, from about 100 to about 300 amino acids.

The cancer neoepitope sequence inserted into the vaccine may comprise the mutation flanked at both sides by an amino acid sequence. Preferably, the mutation is positioned essentially in the middle of a cancer neoepitope sequence, in order to ensure that the immunogenic mutation is presented by the antigen presenting cells after processing. The amino acid sequences flanking the mutation are preferably the amino acid sequences flanking the mutation in the neoantigen, whereby the cancer neoepitope sequence is a true subsequence of the cancer neoantigen amino acid sequence.

The second linker is designed to be non-immunogenic and is preferably also a flexible linker, whereby the tumor neoepitopes, in spite of the high numbers of antigenic subunits present in the antigenic unit, are presented in an optimal manner to the T cells. Preferably, the length of the second linker is from 4 to 20 amino acids to secure the flexibility. In another preferred embodiment, the length of the second linker is from 8 to 20 amino acids, such as from 8 to 15 amino acids, for example 8 to 12 amino acids or such as for example from 10 to 15 amino acids. In a particular embodiment, the length of the second linker is 10 amino acids.

In a specific embodiment, the vaccine of the present invention comprises 10 neoepitopes, wherein the second linkers have a length of from 8 to 20 amino acids, such as from 8 to 15 amino acids, for example 8 to 12 amino acids or such as for example from 10 to 15 amino acids. In a particular embodiment, the vaccine of the present invention comprises 10 neoepitopes and wherein the second linkers have a length of 10 amino acids.

The second linker is preferably a serine-glycine linker, such as a flexible GGGGS linker, such as GGGSS, GGGSG, GGGGS or multiple variants thereof such as GGGGSGGGGS or (GGGGS)m, (GGGSS)m, (GGGSG)m, where m is an integer from 1 to 5, from 1 to 4 or from 1 to 3. In a preferred embodiment m is 2.

Targeting Unit

Due to the targeting unit, the polypeptide/dimeric protein leads to attraction of dendritic cells (DCs), neutrophils and other immune cells. Thus, the polypeptide/dimeric protein comprising the targeting module will not only target the antigens to specific cells, but in addition facilitate a response-amplifying effect (adjuvant effect) by recruiting specific immune cells to the administration site of the vaccine. This unique mechanism is of great importance in a clinical setting where patients can receive the vaccine without any additional adjuvants since the vaccine itself gives the adjuvant effect.

The term "targeting unit" as used herein refers to a unit that delivers the polypeptide/protein with its antigen to an antigen presenting cell for MHC class II-restricted presentation to CD4+ T cells or for providing cross presentation to CD8+ T cells by MHC class I restriction.

The targeting unit is connected through the dimerization unit to the antigenic unit, wherein the latter is in either the COOH-terminal or the NH$_2$-terminal end of the polypeptide/dimeric protein. It is preferred that the antigenic unit is in the COOH-terminal end of the polypeptide/dimeric protein.

The targeting unit is designed to target the polypeptide/dimeric protein of the invention to surface molecules expressed on the relevant antigen presenting cells, such as molecules expressed exclusively on subsets of dendritic cells (DC).

Examples of such target surface molecules on APC are human leukocyte antigen (HLA), cluster of differentiation 14 (CD14), cluster of differentiation 40 (CD40), chemokine receptors and Toll-like receptors (TLRs). HLA is a major histocompatibility complex (MHC) in humans. The Toll-like receptors may for example include TLR-2, TLR-4 and/or TLR-5.

The polypeptide/dimeric protein of the invention can be targeted to said surface molecules by means of targeting units comprising for example antibody binding regions with specificity for CD14, CD40, or Toll-like receptor; ligands, e.g. soluble CD40 ligand; natural ligands like chemokines, e.g. RANTES or MIP-1a; or bacterial antigens like for example flagellin.

In one embodiment the targeting unit has affinity for an MHC class II protein. Thus, in one embodiment the nucleotide sequence encoding the targeting unit encodes the antibody variable domains (VL and VH) with specificity for MHC class II proteins, selected from the group consisting of anti-HLA-DP, anti-HLA-DR and anti-HLA-II.

In another embodiment the targeting unit has affinity for a surface molecule selected from the group consisting of CD40, TLR-2, TLR-4 and TLR-5, Thus, in one embodiment the nucleotide sequence encoding the targeting unit encodes the antibody variable domains (VL and VH) with specificity for anti-CD40, anti-TLR-2, anti-TLR-4 and anti-TLR-5. In one embodiment the nucleotide sequence encoding the targeting unit encodes Flagellin. Flagellin has affinity for TLR-5.

Preferably, the targeting unit has affinity for a chemokine receptor selected from CCR1, CCR3 and CCR5. More preferably, the nucleotide sequence encoding the targeting unit encodes the chemokine hMIP-1alpha (LD78beta), which binds to its cognate receptors, CCR1, CCR3 and CCR5 expressed on the cell surface of APCs. hMIP-1alpha (human MIP-1alpha) is also known as Chemokine (C-C motif) ligand 3 (CCL3), which in humans is encoded by the CCL3 gene. CCL3, also known as Macrophage inflammatory protein-1a (MIP-1a), is a cytokine belonging to the CC chemokine family that is involved in the acute inflammatory state in the recruitment and activation of polymorphonuclear leukocytes. While mouse CCL3 is a single copy gene encoding for a mature chemokine of 69 amino acids, the human homolog has been duplicated and mutated to generate two non-allelic variants, LD78α (CCL3) and LD78β (CCL3-L1), both showing a 74% homology with the mouse CCL3.

The binding of the polypeptide/dimeric protein of the invention to its cognate receptors leads to internalization in the APC and degradation of the proteins into small peptides including the minimal epitopes—and hence the mutation—that are loaded onto MHC molecules and presented to CD4+ and CD8+ T cells to induce tumor specific immune responses. Once stimulated and with help from activated CD4+ T cells, CD8+ T cells will target and kill tumor cells expressing the same neoantigens.

In one embodiment of the present invention, the targeting unit comprises an amino acid sequence having at least 80% sequence identity to the amino acid sequence 5-70 of SEQ ID NO: 1. In a preferred embodiment, the targeting unit comprises an amino acid sequence having at least 85% sequence identity to the amino acid sequence 5-70 of SEQ ID NO: 1, such as at least 86%, such as at least 87%, such as at least 88%, such as at least 89%, such as at least 90%, such as at least 91%, such as at least 92%, such as at least 93%, such as at least 94%, such as at least 95%, such as at least 96%, such as at least 97%, such as at least 98%, such as at least 99% sequence identity.

In a more preferred embodiment the targeting unit consists of an amino acid sequence having at least 80% sequence identity to the amino acid sequence 5-70 of SEQ ID NO: 1, such as at least 85%, such as at least 86%, such as at least 87%, such as at least 88%, such as at least 89%, such as at least 90%, such as at least 91%, such as at least 92%, such as at least 93%, such as at least 94%, such as at least 95%, such as at least 96%, such as at least 97%, such as at least 98%, such as at least 99%, such as at least 100% sequence identity to the amino acid sequence 5-70 of SEQ ID NO: 1.

Dimerization Unit

The term "dimerization unit" as used herein, refers to a sequence of amino acids between the antigenic unit and the targeting unit. Thus, the dimerization unit serves to connect the antigenic unit and the targeting unit, and facilitates dimerization of two monomeric polypeptides into a dimeric protein. Furthermore, the dimerization unit also provides the flexibility in the polypeptide/dimeric protein to allow optimal binding of the targeting unit to the surface molecules on the antigen presenting cells (APCs), even if they are located at variable distances. The dimerization unit may be any unit that fulfils these requirements.

Accordingly, in one embodiment the dimerization unit may comprise a hinge region and optionally another domain that facilitates dimerization, and the hinge region and the other domain may be connected through a third linker.

The term "hinge region" refers to a peptide sequence of the dimeric protein that facilitates the dimerization. The hinge region functions as a flexible spacer between the units allowing the two targeting units to bind simultaneously to two target molecules on APCs, even if they are expressed with variable distances. The hinge region may be Ig derived, such as derived from IgG3. The hinge region may contribute to the dimerization through the formation of covalent bond(s), e.g. disulfide bridge(s). Thus, in one embodiment the hinge region has the ability to form one or more covalent bonds. The covalent bond can for example be a disulfide bridge.

In one embodiment, the other domain that facilitates dimerization is an immunoglobulin domain, such as a carboxyterminal C domain, or a sequence that is substantially identical to the C domain or a variant thereof. Preferably, the other domain that facilitates dimerization is a carboxyterminal C domain derived from IgG.

The immunoglobulin domain contributes to dimerization through non-covalent interactions, e.g. hydrophobic interactions. For example, the immunoglobulin domain has the ability to form dimers via noncovalent interactions. Preferably, the noncovalent interactions are hydrophobic interactions.

It is preferred that the dimerization unit does not comprise a CH2 domain capable of binding to F cell receptors. In some embodiments, the dimerisation unit is devoid of the CH2 domain altogether. In other embodiments, the CH2 domain is mutated so that it has lost its ability to bind to F cell receptors.

In a preferred embodiment, the dimerization unit consists of hinge exons h1 and h4 connected through a third linker to a CH3 domain of human IgG3.

CD8+ T Cell Response

The vaccines described herein, obtained by the present ranking methods, may induce a shift of the immune response from a CD4+ T cell response to a CD8+ T cell response for a given neoepitope. Thus in one aspect is provided a method for selecting a number A of neoepitopes for an individual, said method comprising the steps of:
  a. Obtaining one or more neoepitopes from said individual, each neoepitope comprising at least one minimal epitope, wherein each neoepitope comprises at least one mutation such as an immunogenic mutation compared to a reference sequence;
  b. Determining MHC I and/or MHC II binding affinity for at least one minimal epitope, such as at least two, three or four minimal epitopes within each of said neoepitopes;
  c. Selecting neoepitopes predicted to bind to MHC I and/or to MHC II, thereby obtaining MHC binding neoepitopes;
  d. Ranking the MHC binding neoepitopes with respect to their likelihood of clinical utility;
  e. Selecting A neoepitopes among the highest ranking MHC binding neoepitopes, wherein A is an integer and A is at least 3, such as at least 4, such as at least 5,
thereby selecting A neoepitopes capable of inducing a CD8+ T cell response when administered as a vaccine as described herein.

In some embodiments, the vaccines comprising the neoepitopes selected by the methods described herein are thus able to induce a CD8+ T cell response. In particular embodiments, such vaccines are capable of inducing a dominant CD8+ T cell response in contrast to other vaccine formats. For example, a neoepitope which induces a CD4+ T cell response when administered as a peptide vaccine and/or as an RNA vaccine may induce a CD8+ T cell response when administered as a vaccibody DNA vaccine as described herein. In particular, the neoepitopes selected by the present methods may not previously have been found to be able to induce a CD8+ T cell response. The inventors have found this to be the case for several neoepitopes, as shown in example 13 and FIG. 6.

In some embodiments, A is an integer as otherwise described herein.

EXAMPLES

Figure 7A:
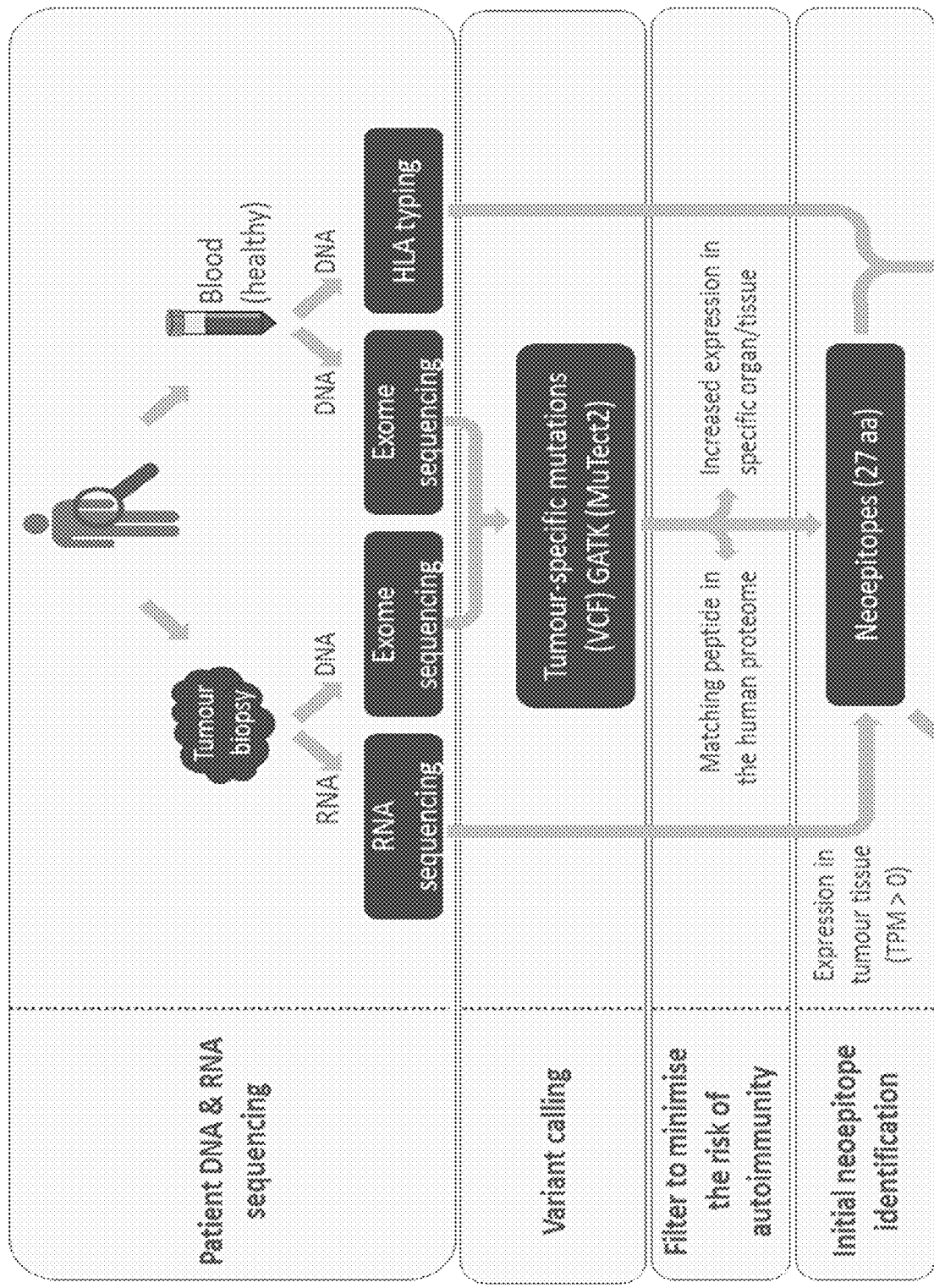
FIGS. 7A-7B. Overview of the neoepitope selection process.
Figure 7B:
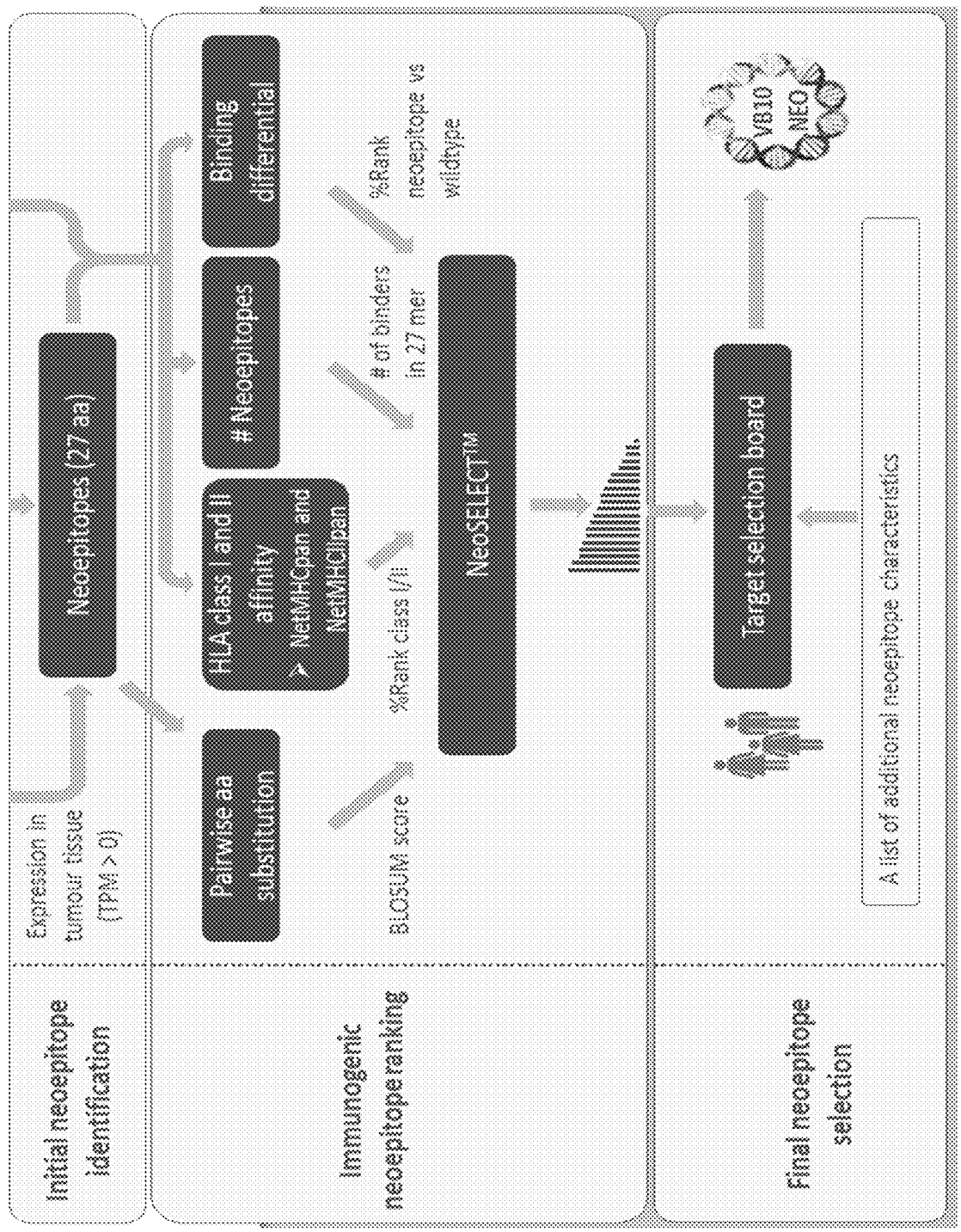

Example 1—Source, History and Generation of the VB10.NEO Patient-Specific Host Cell Lines The design of the Neoepitope Antigenic Module is based on unique tumor-specific sequences identified for each patient. In order to predict the most immunogenic neoepitopes, an optimized workflow is established as summarized below and illustrated in FIG. 7.

1) The first step of neoepitope selection is the identification of all tumor specific mutations. The neoepitopes that are not expressed in the tumor or may for example comprise 9 aa peptides (including the mutation site) that have an identical sequence match elsewhere in the proteome are excluded or down-prioritized. Furthermore, neoepitopes in genes that show at least five-fold higher RNA expression level in a specific organ/tissue compared to all other tissues are also excluded or down-prioritized.

2) The next step is the construction of the neoepitopes (27 amino acid long, the mutation being in the middle) and ranking of these based on an optimal combination of peptide binding affinity to HLA molecules and their residue properties.

3) In some embodiments, the finalization of the neoepitope set includes an evaluation of neoepitopes based on carefully selected evaluation criteria consisting of properties of the neoepitopes and/or their source genes reported to be potentially important for defining immunogenic neoepitopes. This evaluation is performed by a target selection board consisting of a clinician (CMO), immunologist (CSO) and a bioinformatician.

Example 2—Patient Tissue Collection and Handling

Solid tumor tissue as well as blood samples are collected from eligible patients during screening.

At least one core biopsy is collected for exome sequencing and RNA sequencing. Cryopreservation is ideal to maintain specimen integrity for exome and transcriptome sequencing and thus this material is preferentially used for sequencing purposes. In case fresh tumor material cannot be obtained at screening, tumor material preserved in FFPE before screening may be accepted for sequencing.

Blood samples are collected. For cryopreserved tumor biopsy samples, the samples are submerged into liquid nitrogen for flash freezing and stored in liquid nitrogen. For FFPE tumor material, tissue samples are fixed in 4-10% neutral buffered formalin. Samples are then dehydrated prior to embedding and storage at room temperature.

Example 3—Patient Exome and RNA Sequencing and HLA Typing

Exome and RNA sequencing data are obtained from blood and tumor as well as patient's HLA type. Sequencing of tumor and blood samples are performed using at least 2×100 bp read length. The raw data output is at least 24 gigabases (Gbs).

RNA sequencing is performed from tumor samples with at least 2×100 bp read length. The total data output is at least 100 million reads.

For HLA typing, DNA isolated from blood samples is sequenced with at least 2×150 bp read length on Illumina platform with more than 100× coverage.

Example 4—Bioinformatics Processing and Identification of Mutations in Tumor

The exome and RNA expression data is provided as FASTQ files for download from the sequencing provider's internal secured server. The analysis of the QC-passed raw exome sequences (FASTQ files) follows the best practices workflow defined by the latest technology and optimized algorithms for fastq processing and variant calling for pairs of tumor and normal samples (e.g. Miller et al., 2015; Van der Auwera et al., 2013).

The raw FASTQ files from RNA sequencing are mapped using the most advanced practices within RNA sequencing analysis (e.g. Dobin et al., 2013; Dutton G. 2016).

The patient's HLA-alleles are identified from EDTA-blood sample using Illumina sequencing platform.

All mutations (variants identified in vcf files) found in the protein coding genes for which RNA expression is detected in tumor tissue (TPM>0, as defined in Gubin et al., 2015) are investigated for their potential utility as a neoepitope.

A peptide sequence spanning 13 amino acids on each side of the mutation is extracted, forming the neoepitope sequence with a total length of 27 amino acids. For the non-synonymous mutations located closer than 13 amino acids to the protein C-terminal or N-terminal, the mutation flanking sequence is shorter than 13 amino acids on one side, thus, the total length of the neoepitope sequence will be shorter than 27 amino acids.

Example 5—the Exclusion Criteria to Minimize the Risk of Autoimmunity

To minimize the risk of cross-reactivity, all neoepitopes with a core peptide of 9 amino acids (including the mutation) that match any peptide sequence in the normal human proteome are preferably excluded or down-prioritized at this stage. Furthermore, neoepitopes in genes that show at least five-fold higher RNA expression level in a specific tissue or organ compared to all other tissues or organs (as defined by Human Proteome Atlas, Uhlén et al., 2015) are excluded or down-prioritized as well.

Example 6—Development of Computational Model for Neoepitope Prioritisation in Mouse Tumor Models In order to identify the most immunogenic neoepitopes, the data and results from two in vivo mouse tumor models were utilized to develop a computational model for prediction of neoepitope prioritization.

Using multiple data sets from pre-clinical experiments in vivo in mice, features relevant for prediction of immunogenic neoepitopes were collected and their prediction potential was assessed. Neoepitopes identified in the CT26 colon carcinoma model and their immunogenicity observed in VB10.NEO vaccinated BALB/c mice (H-2d) were used to develop a strategy to prioritise neoepitopes based on predicted immunogenicity. The prediction ability of this strategy was validated using immunogenicity data collected for neoepitopes identified in the B16 melanoma model and in the LL2 lung cancer model and their immunogenicity observed in VB10.NEO vaccinated C57Bl/6 mice (H-2b). The neoepitopes were classified as immunogenic if the number of IFN-γ>the negative control+2×SD and number of spots >25 analysed by IFN-γ ELISpot assays performed in-house. Binding affinity (% Rank) for the MHC molecules class I and II using the prediction tools NetMHCpan (Nielsen et al., 2016) and NetMHCIIpan (Andreatta et al., 2015), the total number of binding minimal epitopes, the difference between binding affinity between the mutated and wildtype epitope (binding differential) and the BLOcks SUbstitution Matrix (BLOSUM) score (Henikoff et al., 1992) showed a distinct pattern between immunogenic and non-immunogenic neoepitopes.

Example 7—Binding Affinity (% Rank), the Total Number of Binding Epitopes, Binding Differential and BLOSUM Score In mice, only peptides that have an affinity for MHC class I or II (in humans HLA class I or II) provide eligible T-cell targets. One strategy for selecting vaccine targets is to choose candidate neoepitopes based on their predicted affinities for the MHC molecules class I and II using NetMHCpan and NetMHCIIpan, respectively. For all neoepitopes of 27 amino acids, these servers provide binding affinity scores for the selected MHC molecules. The binding affinity prediction servers provide several score values for MHC affinity, of which % Rank is highly recommended (Nielsen et al., 2016 and Andreatta. et al., 2015). A low % Rank score indicates strong binding affinity.

Figure 2A:
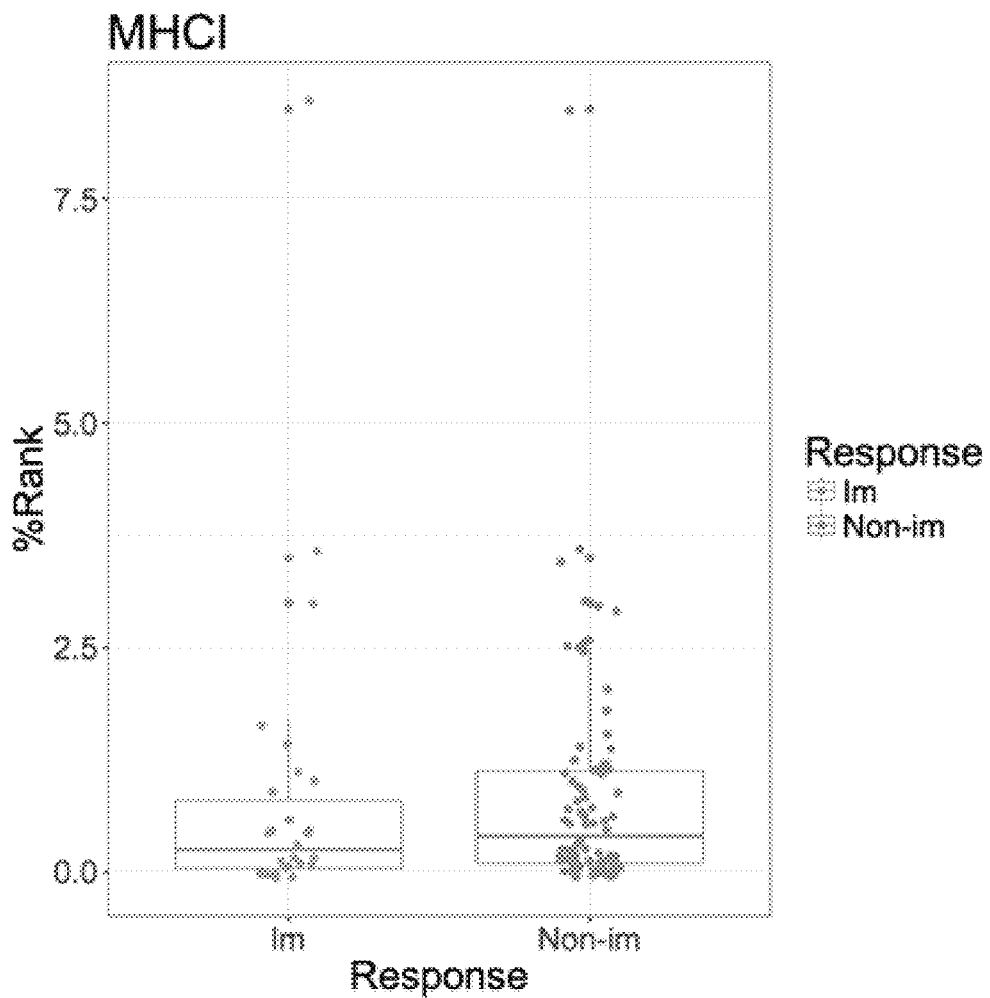
FIGS. 2A-2B. The BLOSUM score for selected neoepitopes with low % Rank for MHC class I (FIG. 2A) and class II (FIG. 2B) molecules. Immunogenic peptides: left; non-immunogenic peptides: right.
Figure 2B:
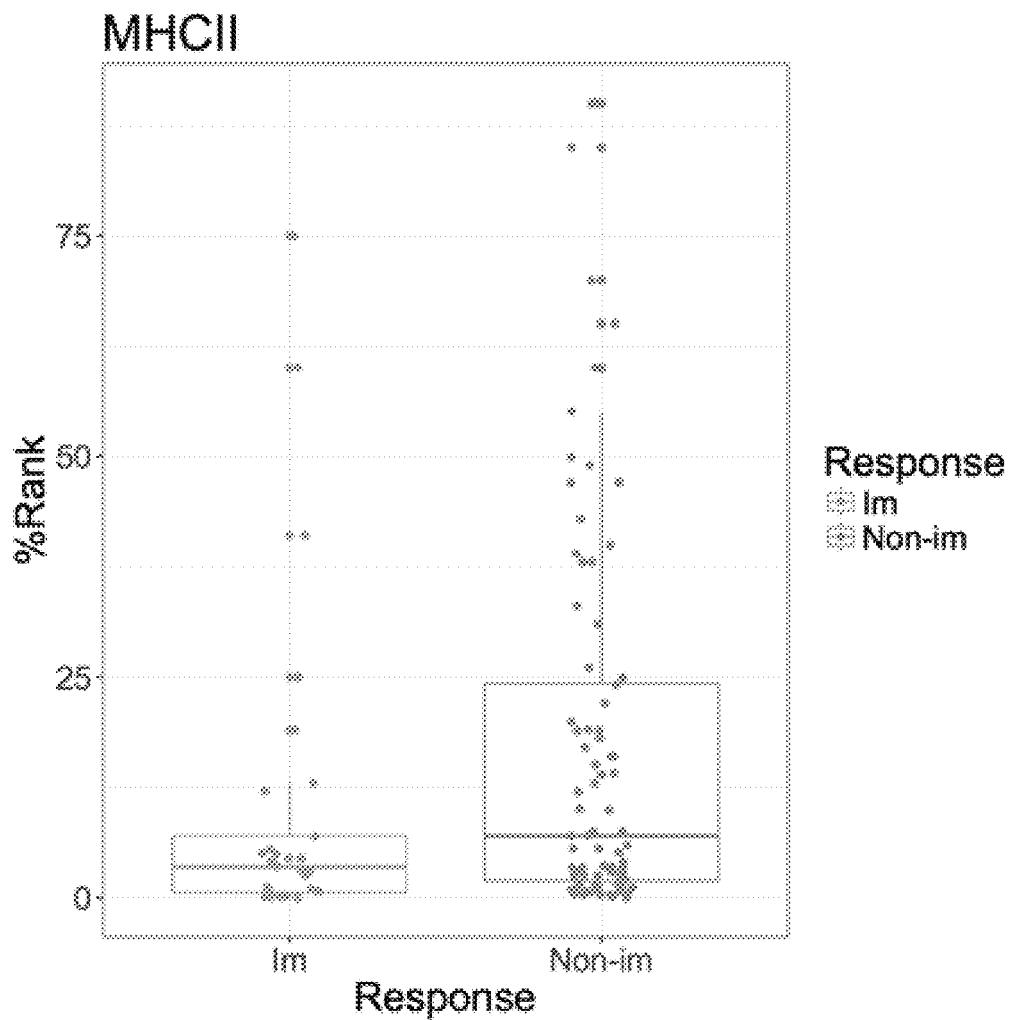

FIG. 2 illustrates the distribution of the % Rank for the immunogenic and non-immunogenic neoepitopes tested in VB10.NEO vaccinated mice, for MHC class I and MHC class II.

Figure 8A:
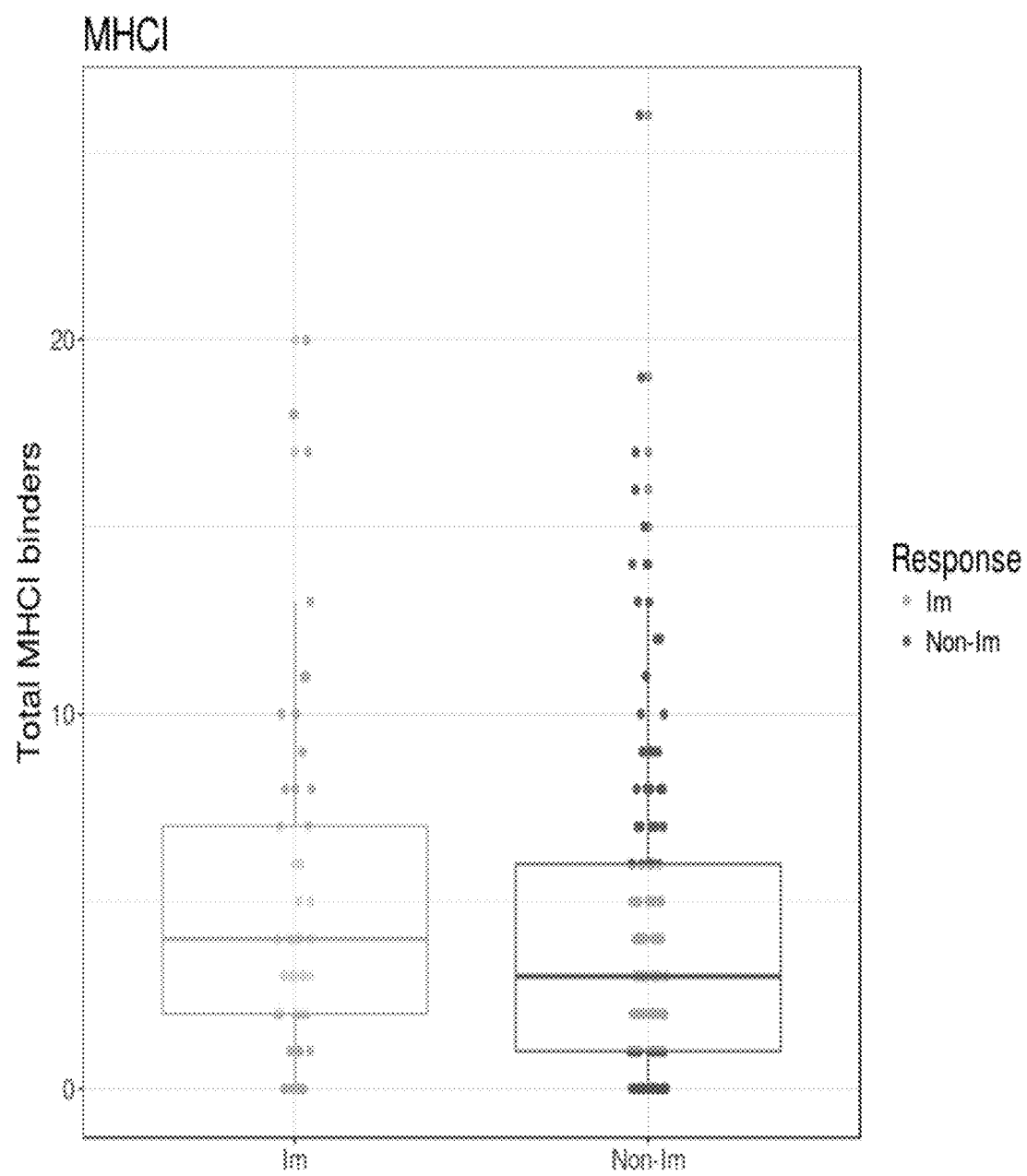
FIGS. 8A-8B. The total number of predicted minimal epitopes for MHCI class I (FIG. 8A) and II (FIG. 8B) within 27 amino acid long neoepitopes (evaluated in VB10.NEO vaccinated mice). Im: immunogenic; Non-Im: non-immunogenic.
Figure 8B:
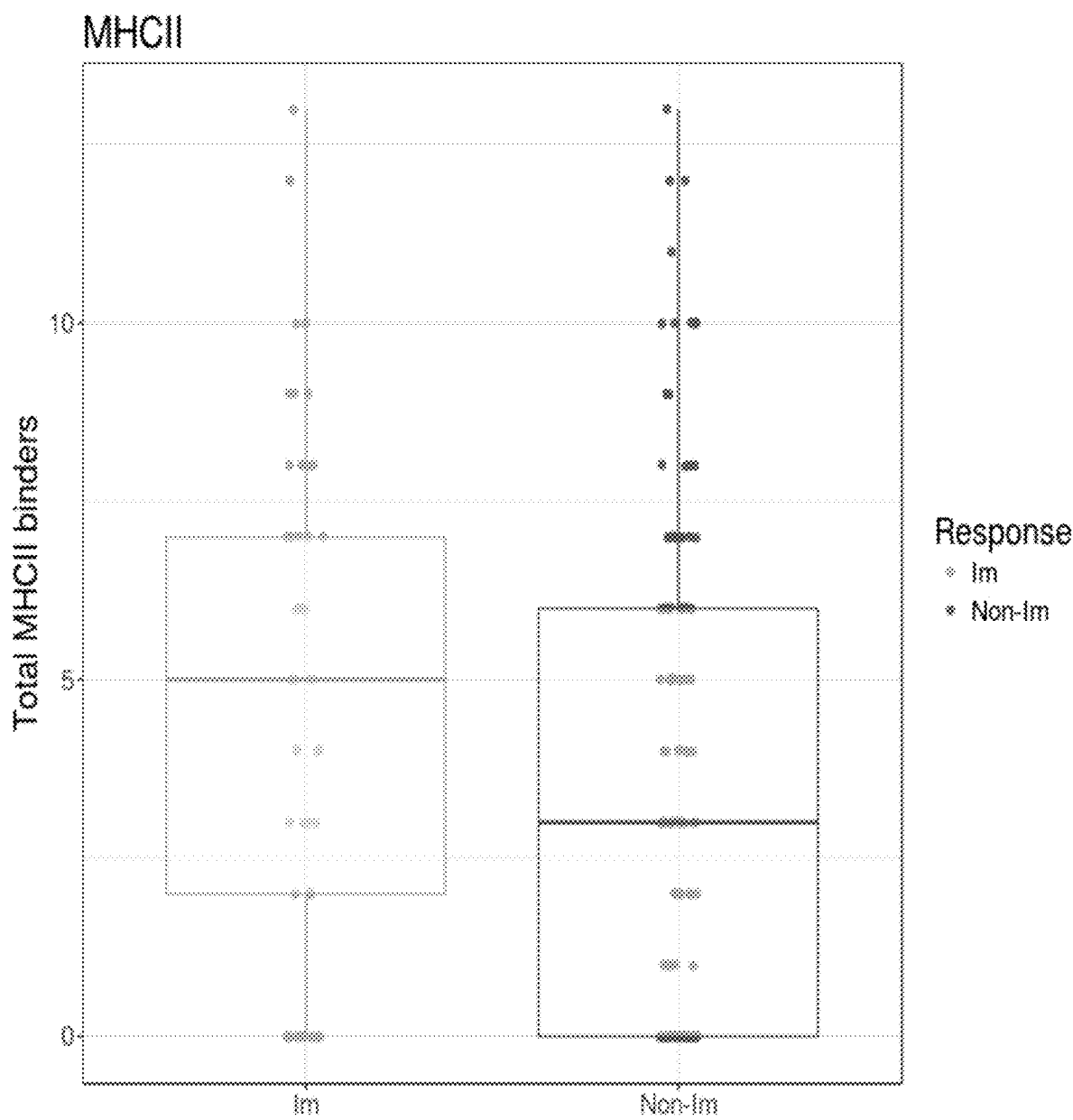

Within a 27 amino acid long neoepitope, it is possible to have more than one minimal epitope (8-14 amino acids for MHC class I and 9-15 amino acids for MHC class II, respectively) predicted to bind to the relevant MHC molecule. The neoepitopes containing the highest number of predicted minimal epitopes have an increased chance to process and present one or more immunogenic peptide(s) on the patient's MHC molecule(s) and thus elicit a more effective tumor-specific immune response. FIG. 8 shows a comparison of the total number of minimal epitopes between the immunogenic and non-immunogenic neoepitopes in the B16 and CT26 data.

Figure 9:
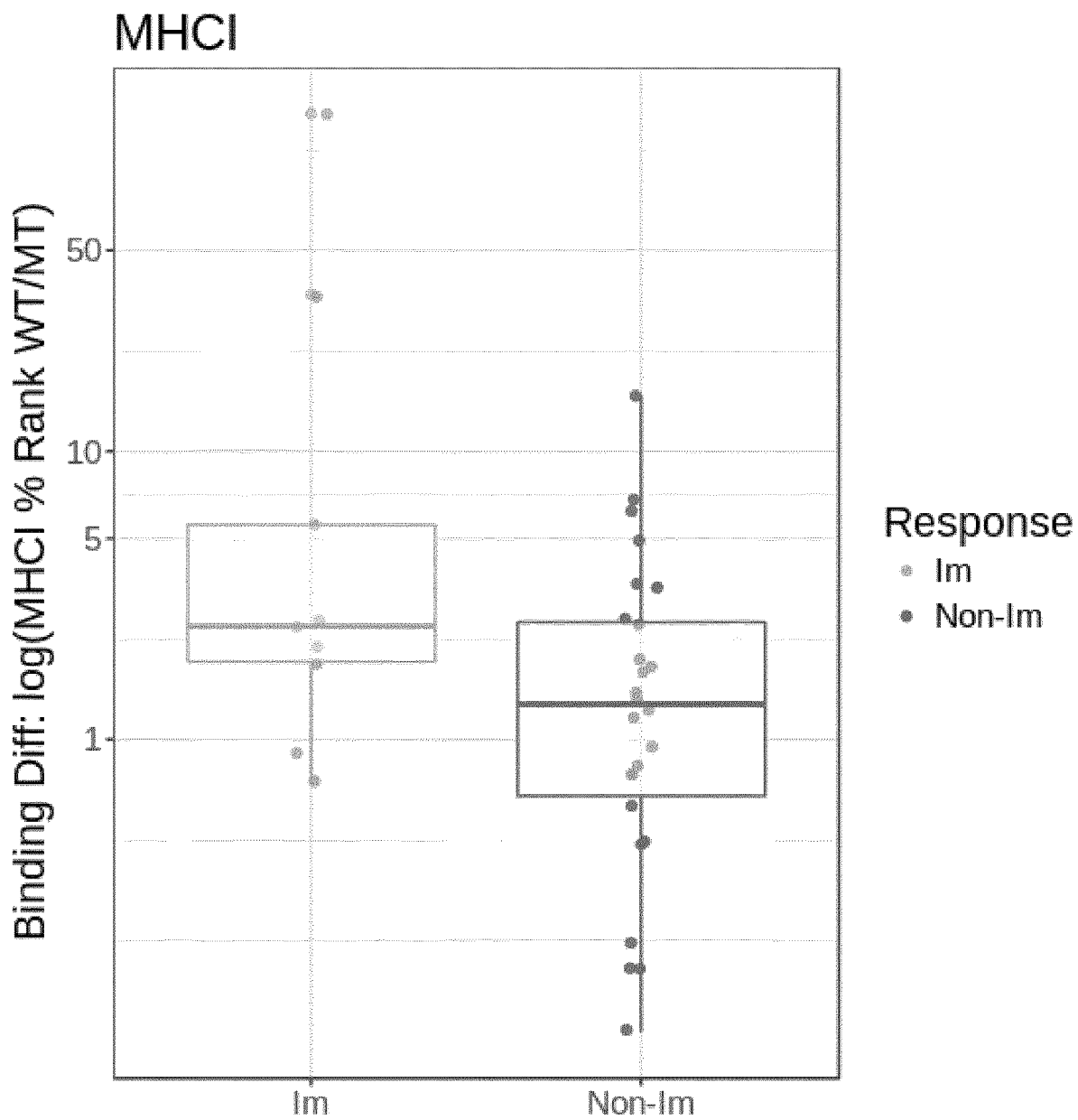
FIG. 9. A comparison between immunogenic and non-immunogenic neoepitopes with respect to their binding differential between WT and MT for MHC class I molecules for neoepitopes with mutation in the anchoring position.

If the neoepitope has a higher binding affinity to MHC molecules than the corresponding wildtype sequence (high binding differential), it is likely that the wildtype is poorly or not presented in healthy tissue and thus the neoepitope-specific T cells should have a low risk for recognizing healthy cells and a high potential for recognizing cancer cells expressing the neoepitope. To measure the binding differential between the reference and the mutant neoepitope sequence, one can use the ratio between their % Rank values (reference/mutant) and group them by the residue type: anchor (P2 or P8/P9) and non-anchor (all other residue positions). FIG. 9 illustrates that if an epitope has a mutation in an anchoring position and a high binding differential, it has a higher chance of being immunogenic.

Figure 10A:
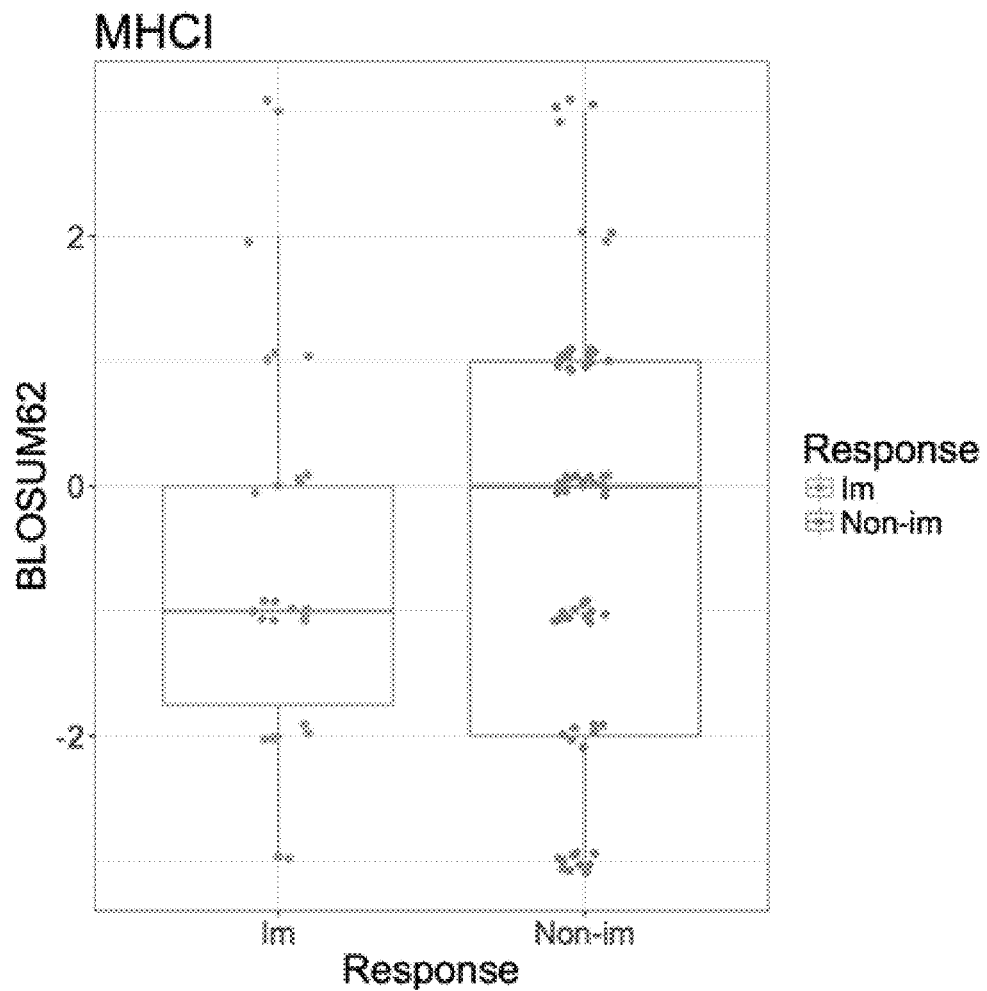
FIGS. 10A-10B. BLOSUM score for selected neoepitopes with low % Rank for MHC class I (FIG. 10A) and class II (FIG. 10B) molecules.
Figure 10B:
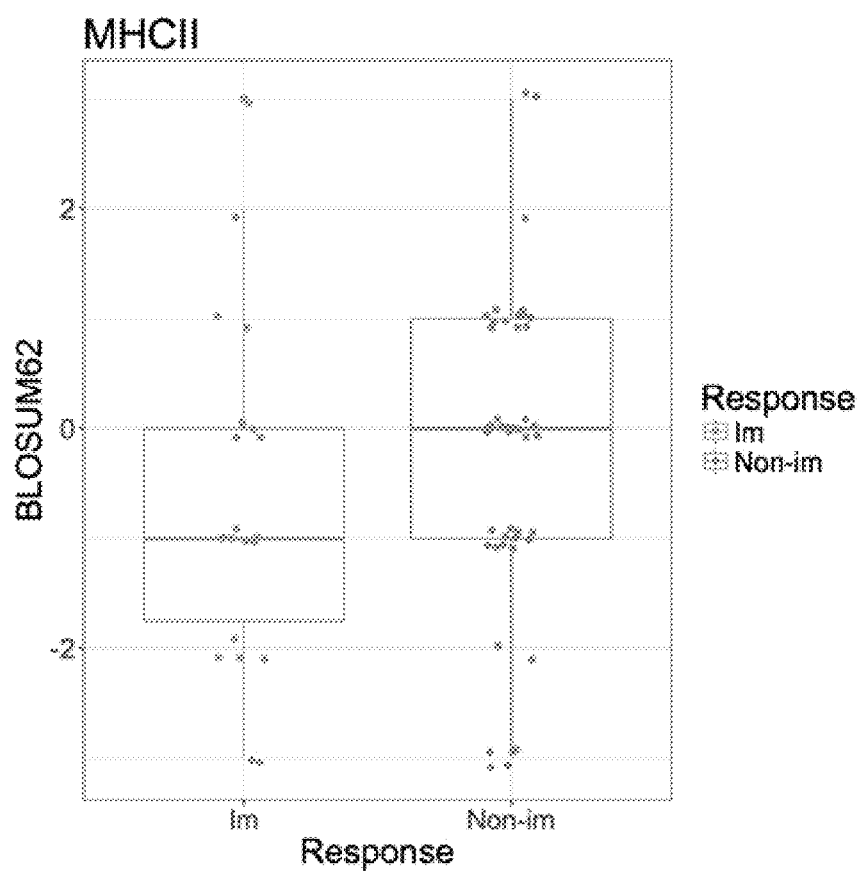

BLOSUM score describes the likelihood of the occurrence of a pairwise amino acid substitution. In our case, the amino acids found in proteins expressed in healthy tissue has been replaced by the mutated amino acid. The lower the score, the less likely it is that this substitution will occur in the alignment of related proteins. The BLOSUM score for the neoepitopes in the CT26 melanoma model data set with high binding affinity is in general lower for immunogenic neoepitopes (FIG. 10).

Figure 3A:
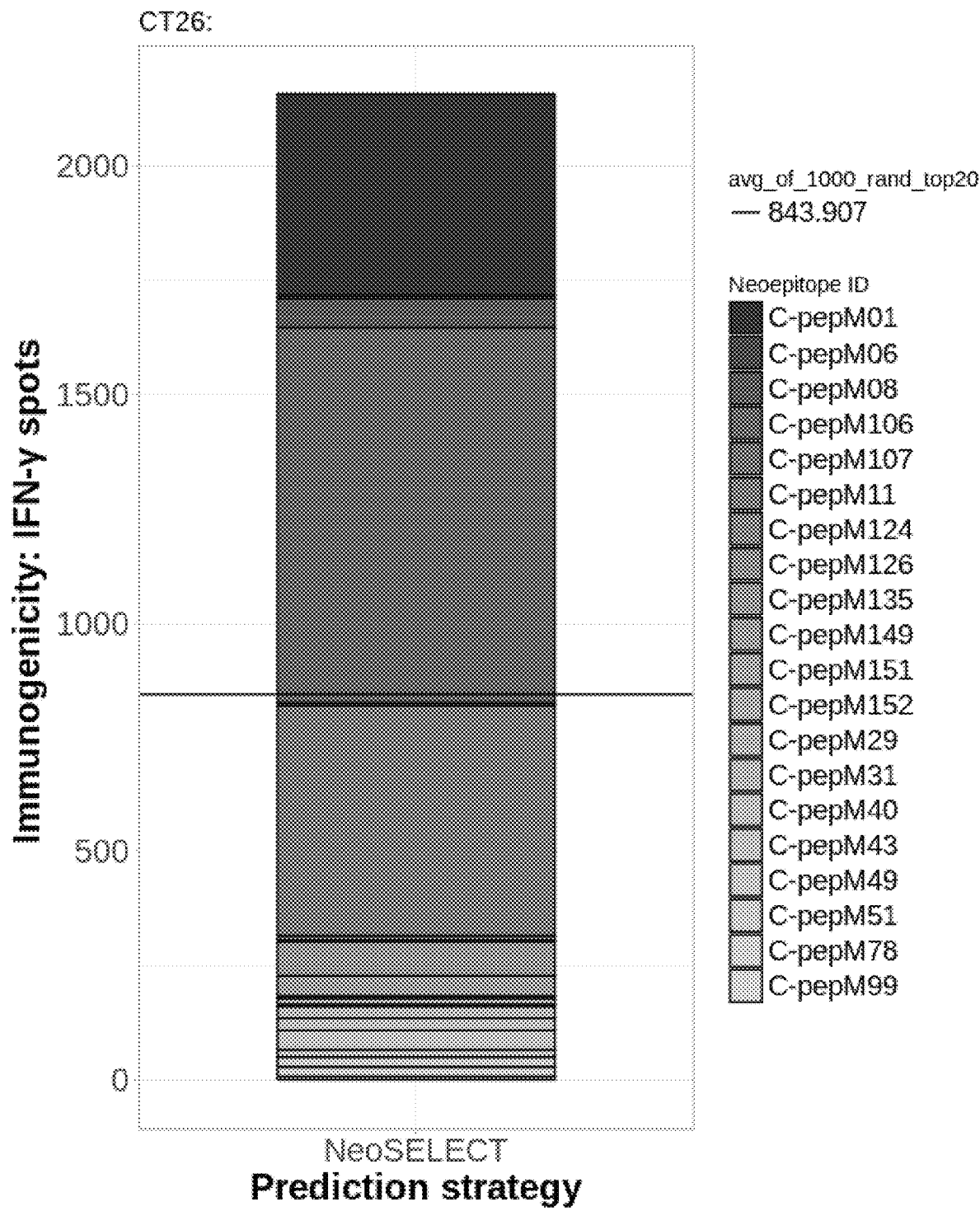
FIGS. 3A-3C. The accumulated number of IFN-γ spots for top 20 neoepitopes chosen using NeoSELECT on CT26 (FIG. 3A) and B16 (FIG. 3B) model data set. The average accumulated number of IFN-γ spots for 1 000 randomly chosen neoepitopes for each data set is depicted with the black line (FIG. 3C).
Figure 3B:
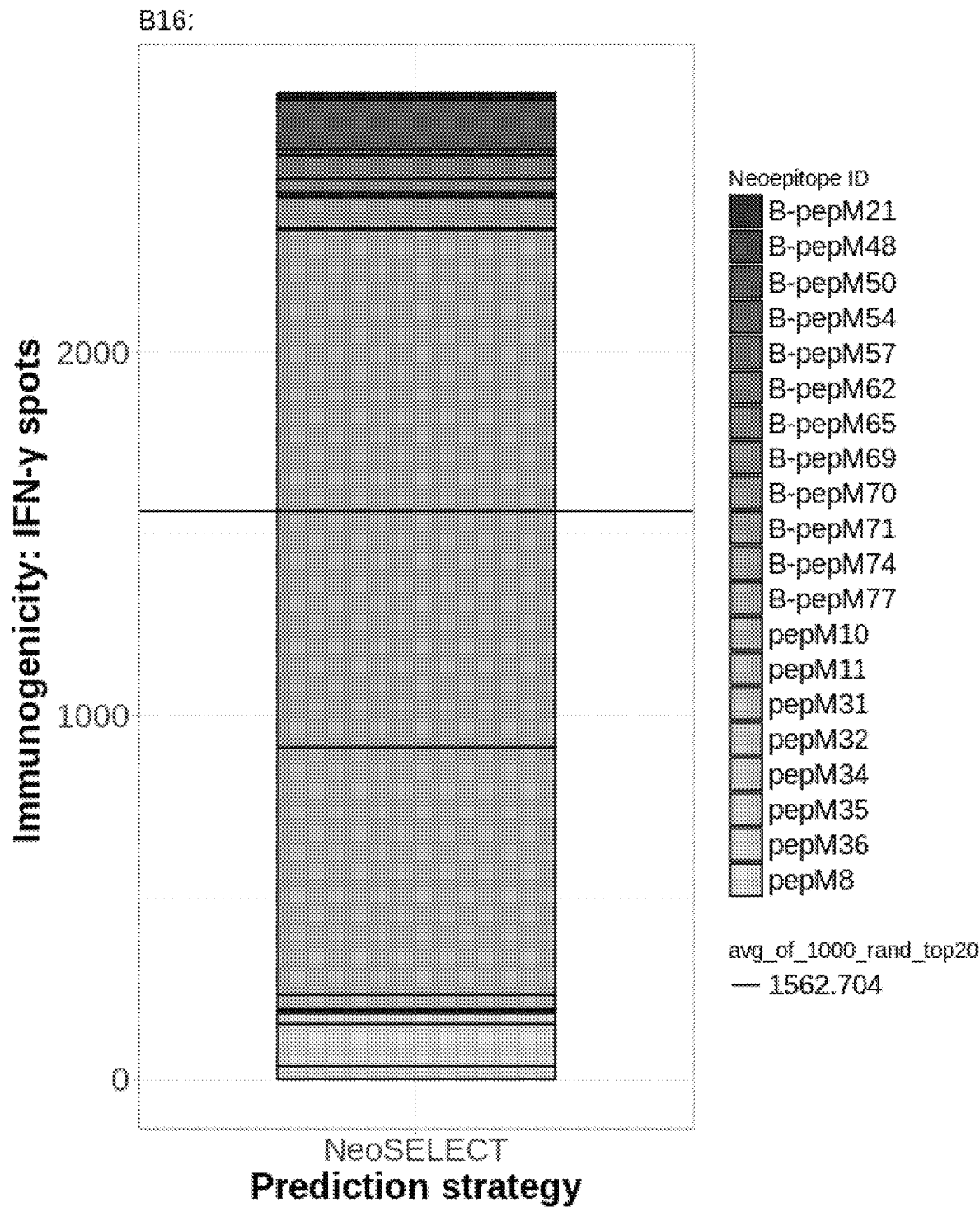
Figure 3C:
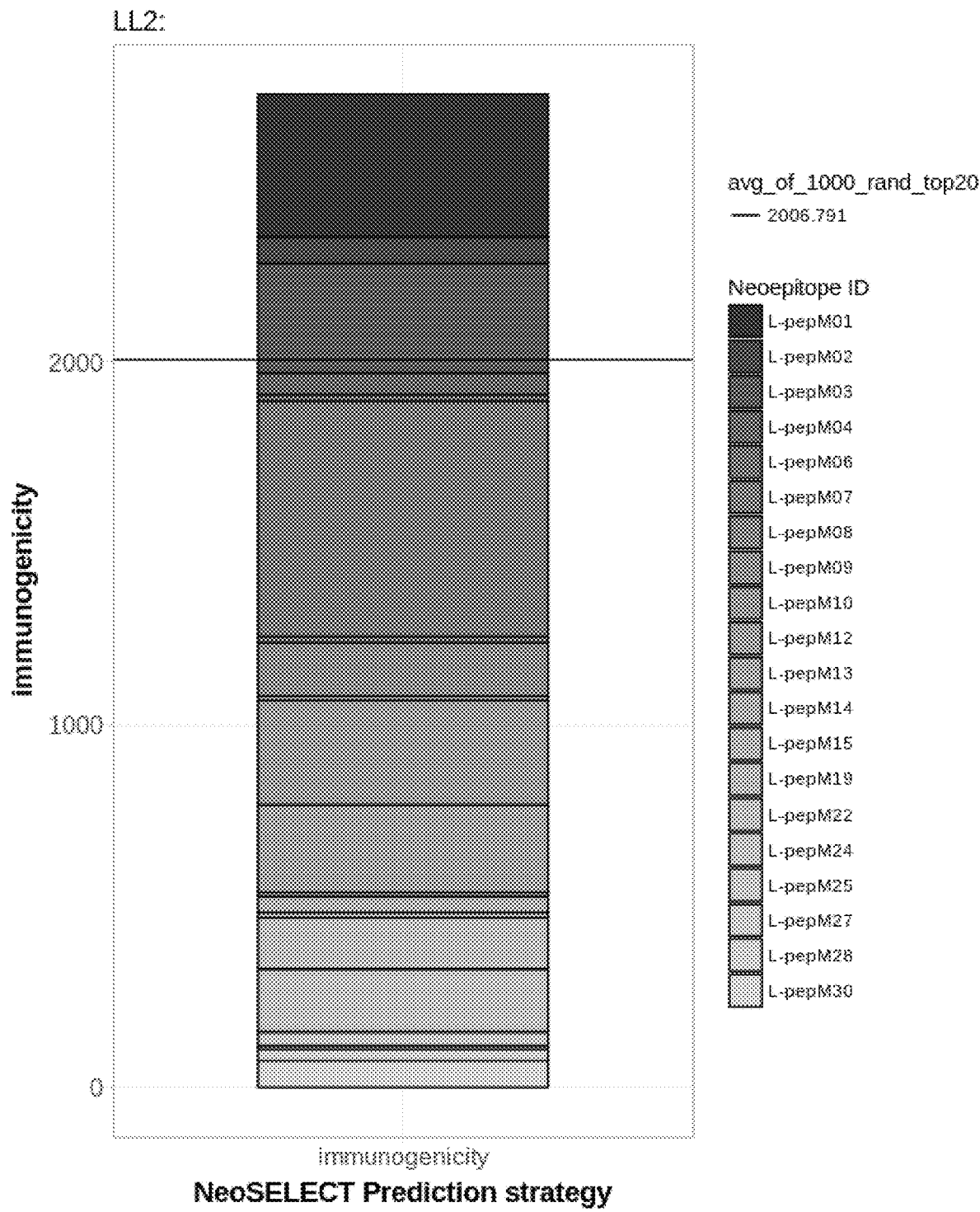

To predict the most immunogenic neoepitopes, a combination of all five factors: the % Rank values for MHCI and MHCII, the number of minimal epitopes within a neoepitope, the binding differential in anchoring position and BLOSUM score are included. The strategy for prioritisation of neoepitopes, called NeoSELECT, weighs these five factors and generates a ranked list of neoepitopes. The NeoSELECT ranking was tested on neoepitopes from the LL2, CT26 and B16 tumor models and their observed immunogenicity is displayed in FIG. 3.

Figure 4A:
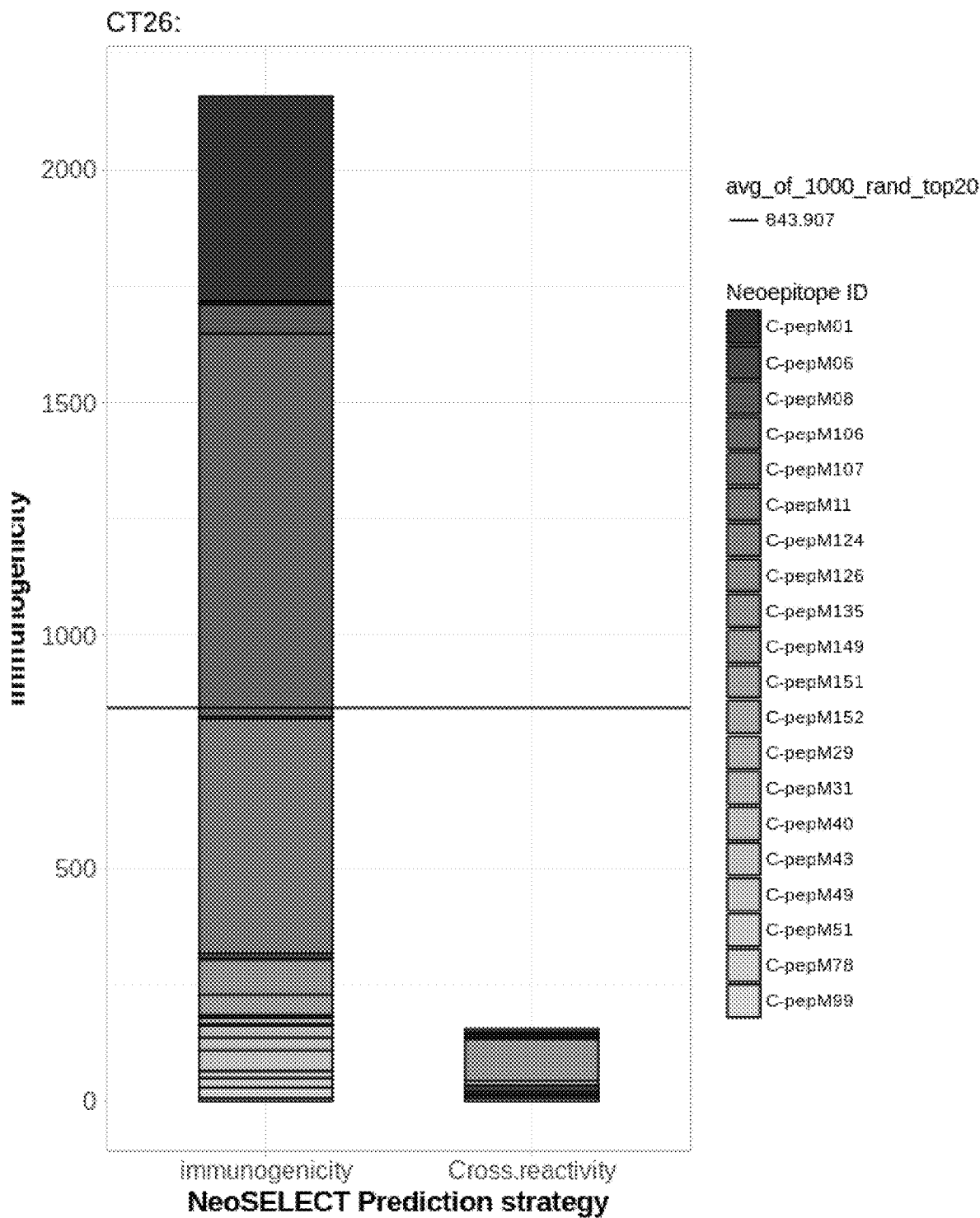
FIGS. 4A-4C. The accumulated number of IFN-γ spots for top 20 neoepitopes (Mutant) and wildtype sequence of these neoepitopes (WT) from CT26 (FIG. 4A), B16 (FIG. 4B) and LL2 (FIG. 4C) data set using NeoSELECT strategy. The average accumulated number of IFN-γ spots for 1 000 randomly chosen neoepitopes from CT26 (FIG. 4A), B16 (FIG. 4B) and LL2 (FIG. 4C) is depicted with the black line.
Figure 4B:
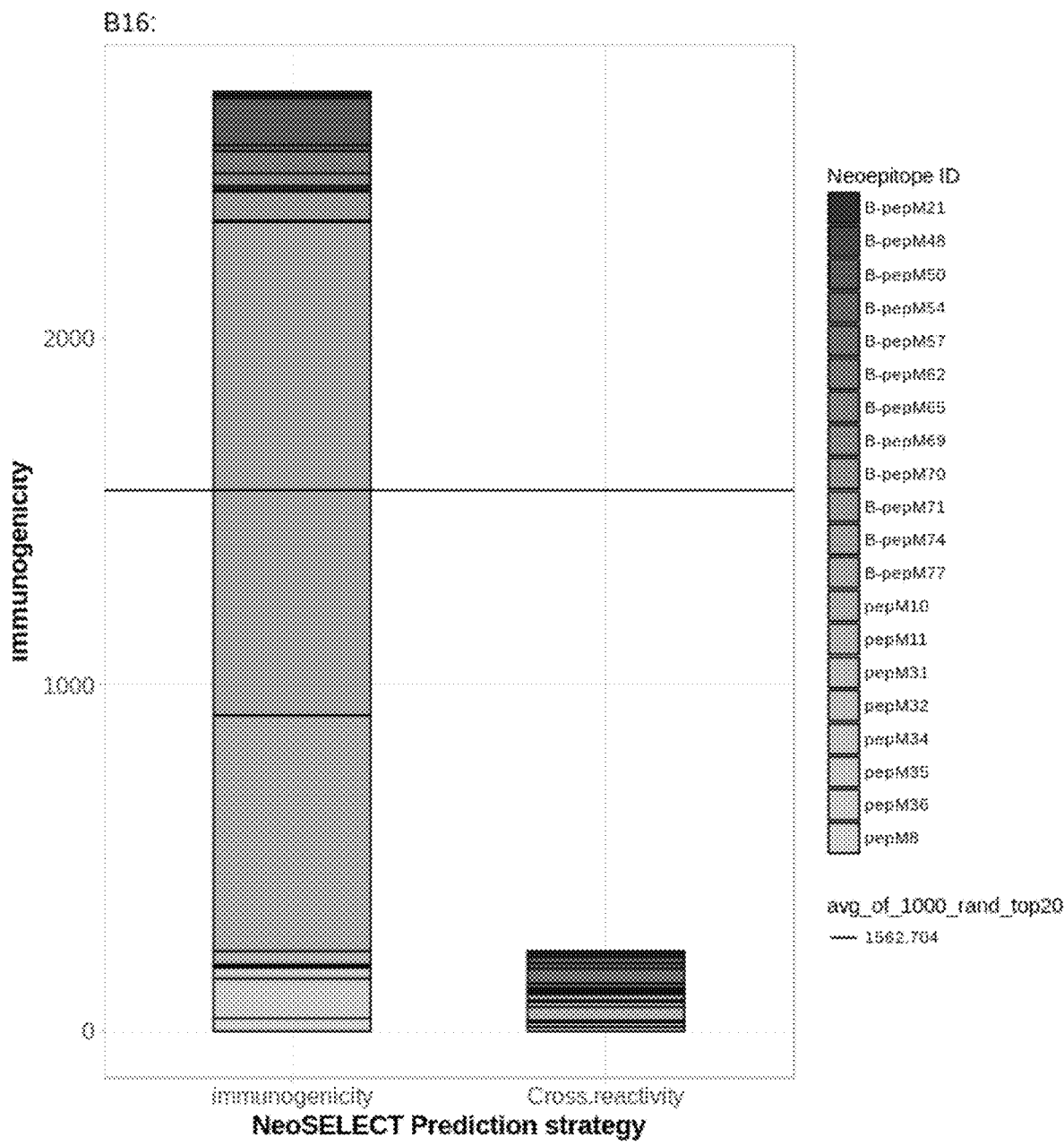
Figure 4C:
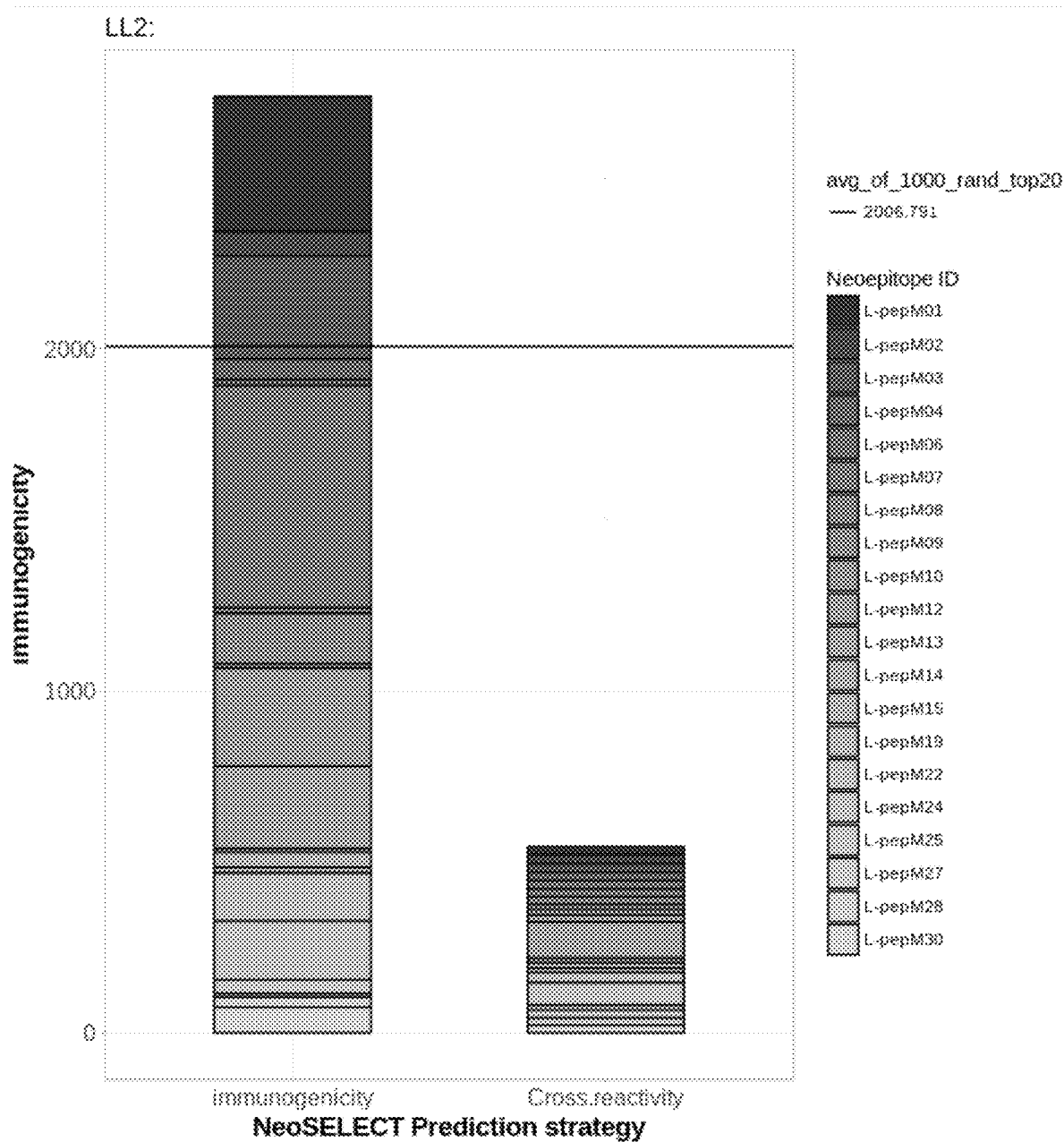

The observed cross-reactivity against the reference peptide sequence of the top 20 neoepitopes predicted by the NeoSELECT strategy is shown together with the response to the mutated peptide sequence in FIG. 4 for (A) CT26, (B) B16 and (C) LL2 models. For the CT26 model, cross-reactivity measurements were obtained for 12 of the 20 neoepitopes; for the B26 model, cross-reactivity measurements were obtained for 17 of the 20 neoepitopes. For the LL2 model, cross-reactivity measurements were obtained for all 20 neoepitopes. Thus, using the NeoSELECT strategy, the risk of inducing cross-reactive T cell is limited.

Example 8—Neoepitope Prediction Process Employed in the VB N-01 Clinical Trial

If more than 20 potential neoepitopes are found for a patient, these are ranked according to the NeoSELECT prioritisation strategy for neoepitope prediction described above. For patient data, the patient specific HLA alleles are used in the process of obtaining % Rank values for reference and WT neoepitope from NetMHCpan and NetMHCIIpan. The binding differentials are calculated and the anchoring positions are determined. The number of minimal epitopes for MHC class I and II is calculated using the complete list of predicted minimal epitopes for all HLA alleles. The BLOSUM score for each mutation is extracted from the BLOSUM score matrix. These factors are subsequently used in the NeoSELECT strategy to obtain a ranked list of the predicted immunogenic neoepitopes. The binding affinity measured in % Rank, binding differential, number of minimal epitopes as well as BLOSUM score, are standardised values, unaffected by the organism in which the neoepitope was identified. Thus, the prediction model developed on mice data does not require additional customisation to be utilised for neoepitope prediction in humans.

Example 9—Final Neoepitope Quality Control and Selection

Finally, additional information for all neoepitopes passing these exclusion criteria is collected to serve as selection criteria. These criteria include:
  Clonality (i.e. the neoepitope found in more than one biopsy sample from the patient are prioritized, for example the neoepitope is found in archival tumor material, in multi-angled biopsies from the same lesion, or in cell free DNA)
  high RNA expression levels (in TPM)
  low % Rank (high binding affinity) for MHC class I and II for the neoepitope
  High binding differential (% Rank of neoepitope versus reference)
  low BLOSUM score: residue characteristics of the substituted amino acid in the neoepitope compared to the wildtype
  high allele frequencies (AFs) or variant allele frequencies (VAFs) at the position of the mutations estimated from VCF files
  the source gene is known cancer-related gene in the Catalogue Of Somatic Mutations In Cancer (COSMIC) database
  the neoepitopes have high resemblance to epitopes which are known to be recognized by T cells, for example as obtained from the Immune Epitope Database and Analysis Resource (IEDB database)
  high number of minimal epitopes (8-15 amino acids) within the 27 amino acid neoepitope
  position of the mutation in the HLA-TCR complex as described in Fritsch et al., 2014
  high binding stability score to MHC class I/MHC class II molecules estimated using NetMHCstabpan (Rasmussen et al., 2016) or similar
  high proteasome cleavage score as predicted by NetChop (Nielsen et al., 2005) or similar.

These criteria, in addition to the predicted prioritisation from NeoSELECT strategy, form the basis for the selection of the final set of 10-20 neoepitopes and are evaluated by a target selection board. The decision criteria are recorded and analysed against the patient's immune response to each neoepitope in the vaccine and the patient's clinical response.

The recommended set of neoepitopes are combined and separated by flexible non-immunogenic glycine/serine-rich linkers (see example 11). The order of the neoepitopes depends on the junctional sequences between each neoepitope and the linker, where all junctional sequences of length 9 amino acids with identical match elsewhere in the proteome are avoided.

Example 10—Data Storage and Analysis

The storage of raw data, as well as the results from exome and RNA sequence analysis, is performed in a safe, controlled computer cluster environment platform that meets requirements for processing and storing of patient sensitive data. All patients are given a unique d-digit code at enrolment to offer safeguards to the patient's identity.

Example 11—Neoepitope Antigenic Module Synthesis

Each patient-specific Neoepitope Antigenic Module are designed by Vaccibody AS on the basis of 10-20 27 amino acid long neoepitopes connected with 10 amino acid long glycine/serine rich linkers. The Neoepitope Antigenic Module is synthesised de novo by a DNA synthesis provider and cloned into the plasmid to generate VB10.NEO.

Figure 6:
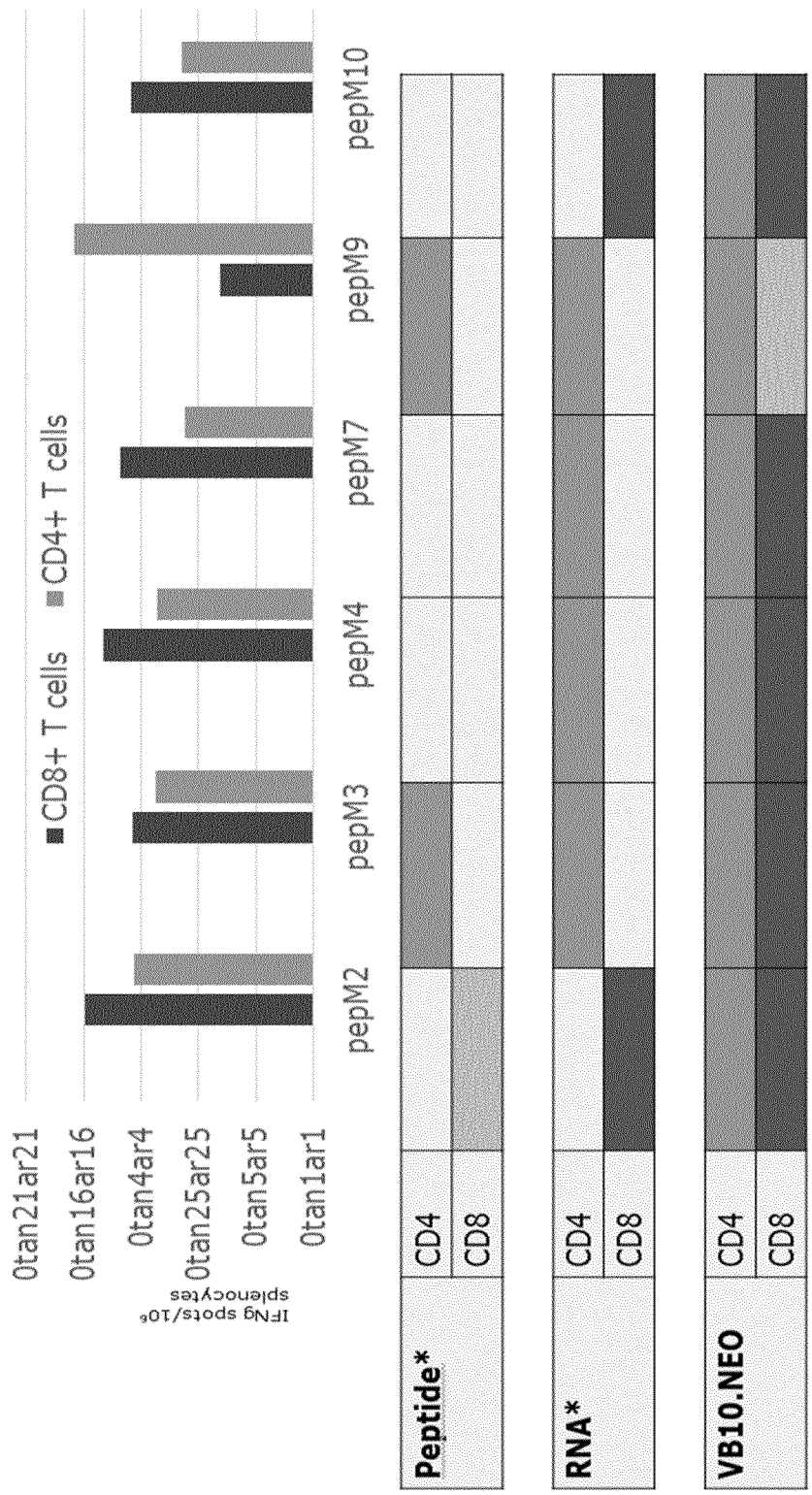
FIG. 6. 10 different neoepitopes (pep1-10) all predicted to bind MCH class I (CD8+ T cell response) have been investigated by Kreiter et al., 2015, and Castle et al., 2012, to investigate if they could induce CD8+ T cell responses in a mouse B16-F10 melanoma tumor model. The responses induced by 6 neoepitopes when administered as vaccibody as described herein ("VB10.NEO") are shown in the upper panel. The CD4 and CD8 response when administered as peptide plus poly ICLC adjuvant, RNA and vaccibody are summarized in the lower panel, where white indicates no response, light grey indicates a weak response, medium grey a medium response and dark grey a strong response.

Example 12—Vaccibody Induces Strong, Dominant CD8+ T Cell Responses Compared to Other Vaccine Formats 10 different neoepitopes (pep1-10) all predicted to bind MCH class I (CD8+ T cell response) have been investigated by Kreiter et al., 2015, and Castle et al., 2012, to investigate if they could induce CD8+ T cell responses in a mouse B16-F10 melanoma tumor model. The responses induced by 6 of the 10 neoepitopes when administered as peptide, as RNA or as vaccibody as described herein ("VB10.NEO") are shown in FIG. 6.

When neoepitopes were administered as synthetic peptides 1 out of 6 induced a CD8+ T cell response and as mRNA 2 out of 6 induced a CD8+ T cell response.

However, when delivering the same 6 neoepitopes as Vaccibody targeting human MIP1α, all neoepitopes induced a CD8+ T cell response clearly demonstrating the importance of the vaccine format to induce strong CD8+ Killer T cells responses against neoepitopes.

Example 13—Immunogenicity of Selected Neoepitopes

Neoepitopes were selected using the described methods for 4 patients suffering from renal cell carcinoma or squamous cell carcinoma of the head and neck. Personalised vaccines were constructed and administered to the patients. The immunogenicity was measured in peripheral blood mononuclear cells harvested 3 to 9 months after administering the first dose of the personalized vaccine. T cell responses were measured in a 10 day pre-stimulation ELISPOT assay (background was subtracted). Vaccine-induced response: >30 SFU increased response post-vaccination. Immunogenic neoepitopes: >30 SFU in at least one time point.

| Patient ID | Indication | # immunogenic neoepitopes | % immunogenic epitopes | # neoepitopes with increased immune response after vaccination | % neoepitopes with increased immune response after vaccination |
|---|---|---|---|---|---|
| 01-001 | RCC | 20 | 100% | 17 | 85% |
| 01-002 | SCCHN | 20 | 100% | 19 | 95% |
| 01-004 | SCCHN | 19 | 95% | 12 | 60% |
| 01-005 | RCC | 17 | 85% | 14 | 70% |

RCC: renal cell carcinoma; SCCHN: squamous cell carcinoma of the head and neck.

On average, 95% of the neoepitopes selected by the method in these 4 patients were immunogenic, i.e. able to activate a T cell response in the patients harbouring the corresponding mutated sequences in their tumour. When the selected neoepitopes were incorporated in a personalized vaccine and administered to the patients, an increased T cell response was induced compared to before vaccination towards 78% of the neoepitopes on average.

The example shows that the method of selection of neoepitopes results in selection of neoepitopes which are able to increase T cell responses when administered to the patient.

Sequences
SEQ ID NO: 1
C-C motif chemokine 3-like 1 precursor including signal peptide and mature peptide (LD78-beta), aa 24-93:

MQVSTAALAVLLCTMALCNQVLSAPLAADTPTACCFSYTSRQIPQNFIAD

YFETSSQCSKPSVIFLTKRGRQVCADPSEEWVQKYVSDLELSA

REFERENCES

Andreatta, M. et al. (2015) "Accurate pan-specific prediction of peptide-MHC class II binding affinity with improved binding core identification." Immunogenetics. 2015. 67(11-12):641-50.
Castle, J. C. et al (2012) "Exploiting the Mutanome for Tumor Vaccination." Cancer Res; 72(5):1081-91.
Dobin, A. et al. (2013) "STAR: ultrafast universal RNA-seq aligner." Bioinformatics. 1; 29(1):15-21.
Dutton, G. (2016) "From DNA to Diagnosis without Delay. Purpose-Built for Genomics, Dragen Processor Could Form Core of Clinic-Ready Data Systems." Genet Eng Biotechn N. 36 (5): 8-9.
Fritsch, E. F. et al. (2014) "HLA-binding properties of tumor neoepitopes in humans." Cancer Immunol Res.; 2(6):522-9.
Gubin, M. M. et al. (2015) "Tumor neoantigens: building a framework for personalized cancer immunotherapy." J. Clin. Invest. 125(9):3413-21.
Henikoff, S. et al. (1992) "Amino acid substitution matrices from protein blocks." Proc Natl Acad Sci USA; 89(22): 10915-10919.
Jurtz, V. et al (2017) "NetMHCpan-4.0: Improved Peptide—MHC Class I Interaction Predictions Integrating Eluted Ligand and Peptide Binding Affinity Data." Vanessa Jurtz, Sinu Paul, Massimo Andreatta, Paolo Marcatili, Bjoern Peters and Morten Nielsen. The Journal of Immunology (2017))
Kreiter S et al. Mutant MHC class II epitopes drive therapeutic immune responses to cancer. Nature. 2015 Apr. 30; 520(7549):692-6
Kreiter, S. et al. (2015) "Erratum: Mutant MHC Class 2 Epitopes Drive Therapeutic Immune Responses To Cancer." Nature 523.7560:370-370.
Miller, N. A. et al. (2015) "26-hour system of highly sensitive whole genome sequencing for emergency management of genetic diseases". Genome Med. 7:100.
Nielsen, M. et al. (2005) "The role of the proteasome in generating cytotoxic T cell epitopes: Insights obtained from improved predictions of proteasomal cleavage." Immunogenetics., 57(1-2):33-41.
Nielsen, M. et al. (2016) "NetMHCpan-3.0: improved prediction of binding to MHC class I molecules integrating information from multiple receptor and peptide length data sets." Genome Medicine: 8:33.
Rasmussen, M. (2016) "Pan-Specific Prediction of Peptide-MHC Class I Complex Stability, a Correlate of T Cell Immunogenicity." J Immunol.; 197(4):1517-24.
Uhlén, M. et al. (2015) "Proteomics. Tissue-based map of the human proteome." Science; 347(6220)
Van der Auwera G. A. et al. (2013) "From FastQ data to high confidence variant calls: the Genome Analysis Toolkit best practices pipeline." Curr Protoc Bioinformatics. 43.

Items
1. A method for selecting a number A of neoepitopes for an individual, said method comprising the steps of:
   a. Obtaining one or more neoepitopes from said individual, each neoepitope comprising at least one minimal epitope, wherein each neoepitope comprises at least one mutation such as an immunogenic mutation compared to a reference sequence;

b. Determining MHC I and/or MHC II binding affinity for at least one minimal epitope, such as at least two, three or four minimal epitopes within each of said neoepitopes;
c. Selecting neoepitopes comprising at least one minimal epitope predicted to bind to MHC I and/or to MHC II, thereby obtaining MHC binding neoepitopes;
d. Ranking the MHC binding neoepitopes with respect to their likelihood of clinical utility;
e. Selecting A neoepitopes among the highest ranking MHC binding neoepitopes, thereby selecting A neoepitopes likely to have clinical utility.

2. The method according to item 1, wherein some or all of the A neoepitopes bind at least to MHC I.

3. The method according to any one of the preceding items, wherein the at least one minimal epitope is between 1 and 50 minimal epitopes, such as between 1 and 40 minimal epitopes, such as between 1 and 30 minimal epitopes, such as between 1 and 20 minimal epitopes.

4. The method according to any one of the preceding items, wherein each minimal epitope comprises the mutation.

5. The method according to any one of the preceding items, wherein step b is performed by determining MHC I and/or MHC II binding affinity for each of said minimal epitopes, thereby identifying x MHC I binding minimal epitopes and/or y MHC II binding minimal epitopes.

6. The method according to any one of the preceding items, wherein the MHC I and MHC II binding affinity for each of said neoepitopes is calculated as the highest MHC I and MHC II binding affinity of the minimal epitopes comprised within each of said neoepitopes.

7. The method according to any one of the preceding items, wherein step c comprises or consists of selecting neoepitopes comprising at least one minimal epitope predicted to bind to MHC I and/or at least one minimal epitope predicted to bind to MHC II, thereby obtaining MHC binding neoepitopes.

8. The method according to any one of the preceding items, wherein step c comprises selecting neoepitopes comprising at least one minimal epitope predicted to bind to MHC I and at least one minimal epitope predicted to bind to MHC II.

9. The method according to any one of the preceding items, wherein step d comprises the step of determining the number of MHC I and/or MHC II binding minimal epitopes within each of said neoepitope, and wherein a higher number of MHC I and/or MHC II binding minimal epitopes is indicative of a higher likelihood of clinical utility of the neoepitope.

10. The method according to any one of the preceding items, wherein step d comprises the step of determining a binding score for the neoepitope, wherein the binding score is $a*2x+b*y$, wherein preferably $a=0$ if $y=0$ and $b=0$ if $x=0$ and where $a=1$ if $y>0$ and $b=1$ if $x>0$, and wherein a higher binding score is indicative of a higher likelihood of clinical utility of the neoepitope.

11. The method according to any one of the preceding items, wherein step d comprises the step of determining a binding score for the neoepitope, wherein the binding score is $a*x+b*y$, wherein preferably $a=2$ and $b=1$, or $a=0$ if $y=0$ and $b=0$ if $x=0$ and where $a=1$ if $y>0$ and $b=1$ if $x>0$, and wherein a higher binding score is indicative of a higher likelihood of clinical utility of the neoepitope.

12. The method according to any one of the preceding items, wherein step d further comprises the step of determining the MHC I binding differential of the MHC I binding neoepitope of step c, wherein the MHC I binding differential is given by the formula (% Rank score (MHC I) for reference)/(% Rank score (MHC I) for neoepitope), wherein neoepitopes with a high MHC I binding differential are ranked higher than neoepitopes with a lower MHC I binding differential.

13. The method according to any one of the preceding items, wherein step d comprises the step of determining the MHC I binding differential of the MHC I binding minimal epitope of step c, wherein the MHC I binding differential is given by the formula (% Rank score (MHC I) for reference)/(% Rank score (MHC I) for minimal epitope), wherein neoepitopes comprising a minimal epitope with a high MHC I binding differential are ranked higher than neoepitopes comprising a minimal epitope with a lower MHC I binding differential.

14. The method according to any one of the preceding items, wherein the MHC I binding differential of each neoepitope is equal to the greatest MHC I binding differential of the minimal epitopes it comprises.

15. The method according to any one of the preceding items, wherein step d further comprises the step of determining the MHC II binding differential of the MHC II binding neoepitope of step c, wherein the MHC II binding differential is given by the formula (% Rank score (MHC II) for reference)/(% Rank score (MHC II) for neoepitope), wherein neoepitopes with a high MHC II binding differential are ranked higher than neoepitopes with a lower MHC II binding differential.

16. The method according to any one of the preceding items, wherein step d further comprises the step of determining the MHC II binding differential of the MHC II binding minimal epitope of step c, wherein the MHC II binding differential is given by the formula (% Rank score (MHC II) for reference)/(% Rank score (MHC II) for minimal epitope), wherein neoepitopes comprising a minimal epitope with a high MHC II binding differential are ranked higher than neoepitopes comprising a minimal epitope with a lower MHC II binding differential.

17. The method according to any one of the preceding items, wherein the MHC II binding differential of each neoepitope is equal to the highest MHC II binding differential of the minimal epitopes it comprises.

18. The method according to any one of the preceding items, wherein the neoepitopes selected in step c bind to MHC II.

19. The method according to any one of the preceding items, wherein neoepitopes binding to MHC I are selected in step e only if the plurality of neoepitopes does not comprise any neoepitope binding to MHC II.

20. The method according to any one of the preceding items, wherein step d further comprises ranking the neoepitopes as follows:
i) determining whether the mutation is in an anchoring position or a non-anchoring position of the minimal neoepitope for each minimal epitope comprised within the neoepitope;
ii) prioritizing the neoepitopes, preferably wherein neoepitopes with higher binding differential are prioritized over neoepitopes with lower binding differential.

21. The method according to item 20, wherein prioritizing the neoepitopes in step ii) is performed by assigning to said neoepitopes the highest score of the minimal epitopes they comprise.
22. The method according to any one of items 20 or 21, wherein neoepitopes with higher binding differential are scored higher than neoepitopes with lower binding differential, and wherein neoepitopes comprising a mutation in an anchoring position are scored higher than neoepitopes comprising a mutation in a non-anchoring position.
23. The method according to any one of items 19 to 21, wherein the prioritizing of the neoepitopes is performed as follows:
   1) if the mutation is in an anchoring position and the binding differential of the minimal epitope is equal to or greater than 20, the minimal epitope has the highest score;
   2) if the mutation is in a non-anchoring position and the binding differential of the minimal epitope is equal to or greater than 20, the score of the minimal epitope is lower than the score for the minimal epitopes of 1);
   3) if the mutation is in an anchoring position and the binding differential of the minimal epitope is lower than 20 and equal to or greater than 3, the score of the minimal epitope is lower than the score the minimal epitopes of 2);
   4) if the mutation is in a non-anchoring position and the binding differential of the minimal epitope is lower than 20 and equal to or greater than 3, the score of the minimal epitope is lower than the score the minimal epitopes of 3);
   5) if the mutation is in an anchoring position and the binding differential of the minimal epitope is less than 3 and equal to or greater than 1, the score of the minimal epitope is lower than the score of the minimal epitopes of 4);
   6) if the mutation is in a non-anchoring position and the binding differential of the minimal epitope is less than 3 and equal to or greater than 1, the score of the minimal epitope is lower than the score of the minimal epitopes of 5);
   7) if the minimal epitope has a mutation with a binding differential lower than 1, regardless of the position of the mutation, the minimal epitope has the lowest score.
24. The method according to any one of the preceding items, wherein step d further comprises the step of prioritizing the neoepitopes with respect to their MHC I rank.
25. The method according to item 24, wherein the % Rank score (MHC I) of a neoepitope comprising one or more minimal epitopes predicted to bind to MHC I is equal to the lowest % Rank score (MHC I) of said one or more minimal epitopes.
26. The method according to any one of the preceding items, wherein step e comprises selecting neoepitopes having a % Rank score (MHC I) below 2.0, such as below 1.5, such as below 1, preferably equal to or below 0.5.
27. The method according to any one of the preceding items, wherein MHC I binding neoepitopes having a % Rank score (MHC I) above 2, are excluded or down-prioritized.
28. The method according to any one of the preceding items, wherein step d further comprises the step of prioritizing the neoepitopes with respect to their MHC II rank.
29. The method according to any one of items 24 to 28, wherein the % Rank score (MHC II) of a neoepitope comprising one or more minimal epitopes predicted to bind to MHC II is equal to the lowest % Rank score (MHC II) of said one or more minimal epitopes.
30. The method according to any one of the preceding items, wherein step e comprises selecting neoepitopes having a % Rank score (MHC II) below 10, such as below 2.
31. The method according to any one of the preceding items, wherein MHC I binding neoepitopes having a % Rank score (MHC I) above 10, such as above 2, are excluded or down-prioritized.
32. The method according to any one of the preceding items, wherein step d further comprises the step of prioritizing the neoepitopes with respect to their BLOSUM score in a descending order, where the BLOSUM score of a neoepitope is equal to the BLOSUM score of the best ranking minimal epitope it comprises, wherein a minimal epitope with a BLOSUM score <1 is ranked higher than a minimal epitope with a BLOSUM score ≥1.
33. The method according to any one of the preceding items, wherein step d according to item 1 further comprises determining a probability that an amino acid substitution present in the neoepitope occurs randomly, and wherein neoepitopes comprising an amino acid substitution that occurs randomly with a low probability are ranked higher than neoepitopes comprising an amino acid substitution that occurs randomly with a higher probability.
34. The method according to item 33, wherein said probability that an amino acid substitution present in the neoepitopes occurs randomly is determined using an evolutionary based scoring matrix.
35. The method according to item 34, wherein said scoring matrix is a log-odd matrix.
36. The method according the item 35, wherein said log-odd matrix is the BLOSUM matrix.
37. The method according the item 36, wherein said BLOSUM matrix is the BLOSUM62 matrix.
38. The method according to item 37, wherein neoepitopes devoid of mutations linked to an amino acid substitution pair with a BLOSUM62 score below 1 are excluded or down-prioritized.
39. The method according to any one of the preceding items, further comprising determining the RNA expression levels of said neoepitopes, wherein neoepitopes for which RNA expression is not detected are excluded or down-prioritized.
40. The method according to item 39, wherein neoepitopes with a high RNA expression level are ranked higher than neoepitopes with a lower RNA expression level.
41. The method according to any one of items 39 or 40, wherein said RNA expression levels are determined for MHC I binding and/or MHC II binding neoepitopes.
42. The method according to any one of the preceding items, further comprising a step of comparing neoepitope peptide sequences with peptide sequences of the human proteome, wherein neoepitopes comprising a peptide sequence that matches a peptide sequence in the human proteome are excluded or down-prioritized.

43. The method according to item 42, wherein said neoepitope peptide comprises or consists of 5 to 15 amino acids.
44. The method according to any one of the preceding items, further comprising a step of identifying said plurality of neoepitopes by identifying one or more tumor specific mutations in said individual.
45. The method according to item 44, wherein said one or more tumor specific mutations are identified by exome sequencing of tumor DNA from said individual.
46. The method according to any one of any one of items 44 to 45, wherein said one or more tumor specific mutations result in amino acid substitutions.
47. The method according to any one of the preceding items, wherein said MHC binding affinity comprises determining the HLA genotype of said individual.
48. The method according to any one of the preceding items, wherein said HLA genotype is determined from a blood sample of said individual.
49. The method according to any one of the preceding items, wherein said MHC I and/or MHC II binding affinities are determined by in silico prediction.
50. The method according to item 49, wherein said in silico prediction is performed by using a computer program that predicts binding of peptides to MHC class I and/or MHC class II molecules.
51. The method according to any one of the preceding items, wherein neoepitopes present in genes showing at least 5-fold higher RNA expression level in a given organ or tissue compared to other organs or tissues, are excluded or down-prioritized.
52. The method according to item 51, wherein said organ is selected from heart and brain.
53. The method according to item 52, wherein said organ is selected from liver, lungs, stomach, kidney, spleen, colon and intestine.
54. The method according to any one of the preceding items, wherein step d further comprises a step of determining the allele frequency of mutations present in the MHC binding neoepitopes, wherein MHC binding neoepitopes with a high allele frequency are ranked above MHC binding neoepitopes with a lower allele frequency.
55. The method according to any one of the preceding items, wherein MHC binding neoepitopes comprising a mutation that is found in more than one biopsy is ranked above MHC binding neoepitopes comprising a mutation that are found in only one biopsy.
56. The method according to any one of the preceding items, wherein said neoepitopes have a length of from 7 to 40 amino acids.
57. The method according to any one of the preceding items, wherein said neoepitopes have a length of from 15 to 30 amino acids.
58. The method according to any one of the preceding items, wherein said neoepitopes have a length of from 25 to 30 amino acids, such as 27 amino acids.
59. The method according to any one of the preceding items, wherein said mutation is positioned essentially in the middle of the neoepitope sequence.
60. The method according to any one of the preceding items, wherein said individual is a cancer patient.
61. The method according to any one of the preceding items, wherein the neoepitopes, which are selected for said individual, are used in a cancer vaccine.
62. The method according to any one of the preceding items, wherein A is an integer of from 1 to 100, such as from 5 to 50, such as from 5 to 30.
63. The method according to any one of the preceding items, wherein A is an integer of from 10 to 20.
64. The method according to any one of the preceding items, wherein x>y.
65. The method according to any one of the preceding items, wherein x≥2y.
66. The method according to any one of the preceding items, wherein x>2.5y.
67. The method according to any one of the preceding items, wherein A≥3.
68. The method according to any one of the preceding items, wherein at least some of the A neoepitopes, such as A/2 of the A neoepitopes, such as between A/2 and A of the A neoepitopes are capable of inducing a CD8+ T cell response.
69. The method according to any one of the preceding items, said method comprising the steps of:
   a. Obtaining a plurality of neoepitopes from said individual, each neoepitope comprising at least 3 minimal epitopes, wherein each neoepitope comprises at least one immunogenic mutation compared to reference sequences;
   b. Determining MHC I and MHC II binding affinity for each of said neoepitopes, thereby identifying x MHC I binding neoepitopes and y MHC II binding neoepitopes, wherein x+y≥3;
   c. Selecting neoepitopes predicted to bind at least to MHC I and optionally to MHC II, thereby obtaining MHC binding neoepitopes;
   d. Ranking the MHC binding neoepitopes with respect to their likelihood of clinical utility; wherein the ranking is performed as follows:
      i. Neoepitopes are ranked according to the number of MHC I and optionally MHC II binding minimal epitopes they comprise, where a higher number gives a higher rank;
   e. Selecting A neoepitopes among the highest ranking MHC binding neoepitopes, thereby selecting A neoepitopes likely to have clinical utility.
70. The method according to item 69, wherein the number of MHC I binding minimal epitopes comprised within a neoepitope is weighed more than the number of MHC II binding minimal epitopes comprised within said neoepitope, such as twice more.
71. The method according to any one of items 69 to 70, wherein step i. of step d is followed by step ii wherein:
   ii. The MHC I and/or MHC II binding differential score of the neoepitope is determined, wherein the MHC I binding differential is given by the formula (% Rank score (MHC I) for reference)/(% Rank score (MHC I) for neoepitope) and the MHC II binding differential is given by the formula (% Rank score (MHC II) for reference)/(% Rank score (MHC II) for neoepitope); wherein neoepitopes with a high binding differential are ranked higher than neoepitopes with a lower binding differential.
72. The method according to item 70, wherein the neoepitopes are ranked in a descending order as follows:

1) if the mutation is in an anchoring position and the binding differential of the minimal epitope is equal to or greater than 20, the minimal epitope has the highest score;
2) if the mutation is in a non-anchoring position and the binding differential of the minimal epitope is equal to or greater than 20, the score of the minimal epitope is lower than the score for the minimal epitopes of 1);
3) if the mutation is in an anchoring position and the binding differential of the minimal epitope is lower than 20 and equal to or greater than 3, the score of the minimal epitope is lower than the score the minimal epitopes of 2);
4) if the mutation is in a non-anchoring position and the binding differential of the minimal epitope is lower than 20 and equal to or greater than 3, the score of the minimal epitope is lower than the score the minimal epitopes of 3);
5) if the mutation is in an anchoring position and the binding differential of the minimal epitope is less than 3 and equal to or greater than 1, the score of the minimal epitope is lower than the score of the minimal epitopes of 4);
6) if the mutation is in a non-anchoring position and the binding differential of the minimal epitope is less than 3 and equal to or greater than 1, the score of the minimal epitope is lower than the score of the minimal epitopes of 5;
7) if the minimal epitope has a mutation with a binding differential lower than 1, regardless of the position of the mutation, the minimal epitope has the lowest score.

73. The method according to any one of items 69 to 72, wherein step i. or step ii. of step d is followed by step iii wherein:
   iii. The neoepitopes are ranked according to their % Rank score, wherein neoepitopes with a low % Rank score are ranked higher than neoepitopes with a high % Rank score.

74. The method according to item 73, wherein the % Rank score of a neoepitope is equal to the lowest % Rank score of the minimal epitopes it comprises.

75. The method according to any one of items 73 to 74, wherein a neoepitope or minimal epitope is predicted to be:
   a strong MHC I binder if it has a % Rank score (MHC I) ≤0.5;
   a weak MHC I binder if 0.5<% Rank score (MHC I) ≤2;
   a non-MHC I binder if it has a % Rank score (MHC I) >2.

76. The method according to any one of items 73 to 75, wherein a neoepitope or minimal epitope is predicted to be:
   a strong MHC I binder if it has a % Rank score (MHC II) ≤2;
   a weak MHC I binder if 2<% Rank score (MHC II) ≤10;
   a non-MHC I binder if it has a % Rank score (MHC II) >10.

77. The method according to any one of items 69 to 76, wherein step i., ii. or iii. is followed by step iv, wherein:
   iv. The neoepitopes are scored according to their BLOSUM score, wherein a low BLOSUM score gives a higher score.

78. The method according to any one of items 69 to 77, wherein the neoepitopes with a BLOSUM score <3, such as BLOSUM score <2, such as BLOSUM score <1, such as BLOSUM score <0, are prioritised.

79. A method for selecting a number A of neoepitopes for an individual, said method comprising the steps of:
   a. Obtaining one or more neoepitopes from said individual, each neoepitope comprising at least one minimal epitope, wherein each neoepitope comprises at least one mutation such as an immunogenic mutation compared to a reference sequence;
   b. Determining MHC I binding affinity for at least one minimal epitope, such as at least two, three or four minimal epitopes within each of said neoepitopes, and determining the number of MHC I binding minimal epitopes for each of said neoepitopes;
   c. Ranking the neoepitopes as follows:
      i. prioritizing neoepitopes comprising a high number of MHC I binding minimal epitopes and selecting a first group of neoepitopes having a high score;
      ii. optionally, prioritizing neoepitopes from the first group of neoepitopes as follows:
         1) if the mutation is in an anchoring position and the binding differential of the minimal epitope is equal to or greater than 20, the minimal epitope has the highest score;
         2) if the mutation is in a non-anchoring position and the binding differential of the minimal epitope is equal to or greater than 20, the score of the minimal epitope is lower than the score for the minimal epitopes of 1);
         3) if the mutation is in an anchoring position and the binding differential of the minimal epitope is lower than 20 and equal to or greater than 3, the score of the minimal epitope is lower than the score the minimal epitopes of 2);
         4) if the mutation is in a non-anchoring position and the binding differential of the minimal epitope is lower than 20 and equal to or greater than 3, the score of the minimal epitope is lower than the score the minimal epitopes of 3);
         5) if the mutation is in an anchoring position and the binding differential of the minimal epitope is less than 3 and equal to or greater than 1, the score of the minimal epitope is lower than the score of the minimal epitopes of 4);
         6) if the mutation is in a non-anchoring position and the binding differential of the minimal epitope is less than 3 and equal to or greater than 1, the score of the minimal epitope is lower than the score of the minimal epitopes of 5);
         7) if the minimal epitope has a mutation with a binding differential lower than 1, regardless of the position of the mutation, the minimal epitope has the lowest score;
         wherein the MHC I binding differential is given by the formula (% Rank score (MHC I) for reference)/(% Rank score (MHC I) for minimal epitope); and selecting a second group of neoepitopes having a high score;
      iii. optionally, prioritizing neoepitopes from the second group based on their MHC I % Rank score and selecting a third group of neoepitopes having a low MHC I % Rank score;
      iv. optionally, selecting a fourth group of neoepitopes from the second or the third group including minimal epitopes with high resemblance to epitopes known to be recognized by T cells;

v. prioritizing neoepitopes from the second group, from the third group or from the fourth group based on their BLOSUM score, wherein a BLOSUM score less than a predetermined threshold is ranked higher than a BLOSUM score equal to or greater than said threshold, and selecting a fifth group of neoepitopes having a BLOSUM score less than said threshold, wherein said threshold preferably is 1;

wherein the first, second, third, fourth or fifth group of neoepitopes comprises said A neoepitopes.

80. The method according to item 79, wherein step c comprises steps i. and ii., or i. and iii., or i. and iv., or i. and v., or i., ii. and iii., or i., ii. and iv., or i., iii. and iv., or i., ii. and v., or i., iii. and v., or i., iv. and v., or i., ii., iii. and iv., or i., ii., iii. and v., or i., ii., iv. and v., or i., iii., iv. and v., or i., ii., iii., iv. and v.

81. The method according to any one of items 79 to 80, wherein the method further comprises any of the features of the method according to any one of items 1 to 78.

82. A method for selecting a number A of neoepitopes for an individual, said method comprising the steps of:
a. Obtaining one or more neoepitopes from said individual, each neoepitope comprising at least one minimal epitope, wherein each neoepitope comprises at least one mutation such as an immunogenic mutation compared to a reference sequence;
b. Determining MHC I binding affinity for at least one minimal epitope, such as at least two, three or four minimal epitopes within each of said neoepitopes, and determining the number of MHC I binding minimal epitopes for each of said neoepitopes;
c. Ranking the neoepitopes as follows:
  i. prioritizing neoepitopes comprising a high number of MHC I binding minimal epitopes and selecting a first group of neoepitopes having a high score;
  ii. optionally, prioritizing neoepitopes from the first group of neoepitopes as follows:
    1) if the mutation is in an anchoring position and the binding differential of the minimal epitope is equal to or greater than 20, the minimal epitope has the highest score;
    2) if the mutation is in a non-anchoring position and the binding differential of the minimal epitope is equal to or greater than 20, the score of the minimal epitope is lower than the score for the minimal epitopes of 1);
    3) if the mutation is in an anchoring position and the binding differential of the minimal epitope is lower than 20 and equal to or greater than 3, the score of the minimal epitope is lower than the score the minimal epitopes of 2);
    4) if the mutation is in a non-anchoring position and the binding differential of the minimal epitope is lower than 20 and equal to or greater than 3, the score of the minimal epitope is lower than the score the minimal epitopes of 3);
    5) if the mutation is in an anchoring position and the binding differential of the minimal epitope is less than 3 and equal to or greater than 1, the score of the minimal epitope is lower than the score of the minimal epitopes of 4);
    6) if the mutation is in a non-anchoring position and the binding differential of the minimal epitope is less than 3 and equal to or greater than 1, the score of the minimal epitope is lower than the score of the minimal epitopes of 5);
    7) if the minimal epitope has a mutation with a binding differential lower than 1, regardless of the position of the mutation, the minimal epitope has the lowest score;
    wherein the MHC I binding differential is given by the formula (% Rank score (MHC I) for reference)/(% Rank score (MHC I) for minimal epitope); and selecting a second group of neoepitopes having a high score;
  iii. optionally, prioritizing neoepitopes from the second group based on their MHC I % Rank score and selecting a third group of neoepitopes having a low MHC I % Rank score;
  iv. optionally, selecting a fourth group of neoepitopes from the second or the third group including minimal epitopes with high resemblance to epitopes known to be recognized by T cells;
  v. prioritizing neoepitopes from the second group, from the third group or from the fourth group based on their BLOSUM score, wherein a BLOSUM score less than a predetermined threshold is said threshold, and selecting a fifth group of neoepitopes having a BLOSUM score less than said threshold, wherein said threshold preferably is 1;
  vi. optionally, selecting neoepitopes from the first, second, third, fourth or fifth group of neoepitopes based on the neoepitopes being found in two or more samples, and selecting a sixth group of neoepitopes found in two or more samples;
  vii. optionally, selecting neoepitopes from the first, second, third, fourth, fifth or sixth group of neoepitopes based on the identification of the mutation by at least two different variant callers, and selecting a seventh group of neoepitopes comprising a mutation identified by at least two different variant callers, wherein the first, second, third, fourth, fifth, sixth or seventh group of neoepitopes comprises said A neoepitopes.

83. The method according to item 82, wherein step c comprises steps i. and ii., or i. and iii., or i. and iv., or i. and v., or i. and vi., or i. and vii., or i., ii. and iii., or i., ii. and iv., or i., ii. and v., or i., ii. and vi., or i., ii. and vii., or i., iii. and iv., or i., iii. and v., or i., iii. and vi., or i., iii. and vii., or i., iv. and v., or i., iv. and vi., or i., iv. and vii., or i., v. and vi., or i., v. and vii., or i., vi. and vii., or ii., iii. and iv., or ii., iii. and v., or ii., iii. and vi., or ii., iii. and vii., or ii., iv. and v., or ii., iv. and vi., or ii., iv. and vii., or ii., v. and vi. or ii., v. and vii., or ii., vi. and vii., or iii., iv. and v., or iii., iv. and vi., or iii., iv. and vii., or iii., v. and vi., or iii., v. and vii., or iii., vi. and vii., or iv., v. and vi., or iv., v. and vii., or iv., vi. and vii., or v., vi. and vii.

84. The method according to any one of items 82 to 83, wherein the method further comprises any of the features of the method according to any one of items 1 to 78.

85. A method of preparing a cancer vaccine comprising neoepitopes, said method comprising a step of selecting said neoepitopes using the method according to any one of items 1-78 or 79 to 84.

86. The method according to item 85, wherein 10-20 neoepitopes are selected.

87. The method according to any one of items 85 to 86, wherein said cancer vaccine comprises a nucleotide construct comprising:
a targeting unit
a dimerization unit a first linker an antigenic unit, wherein said antigenic unit comprises A-1 antigenic subunits, each subunit comprising a sequence encoding at least one of said neoepitopes and a second linker and said antigenic unit further comprising a final sequence encoding one of said neoepitopes, wherein A is an integer of from 1 to 100, preferably A is an integer of from 3 to 50, wherein said nucleotide construct is applied to the anticancer vaccine in an immunologically effective amount.

88. The method according to any one of items 85 to 87, wherein the second linker is a Serine-Glycine linker.

89. The method according to any one of items 85 to 88, wherein the targeting unit has affinity for a chemokine receptor selected from CCR1, CCR3 and CCR5.

90. The method according to item 89, wherein the targeting unit comprises an amino acid sequence having at least 80% sequence identity to amino acids 5-70 of the amino acid sequence SEQ ID NO:1 (MIP1a).

91. A cancer vaccine obtainable by the method according to any one of items 85 to 90.

92. The cancer vaccine according to item 91, wherein said cancer vaccine comprises a nucleotide construct comprising:

a targeting unit a dimerization unit a first linker an antigenic unit, wherein said antigenic unit comprises n−1 antigenic subunits, each subunit comprising a sequence encoding at least one of said neoepitopes and a second linker and said antigenic unit further comprising a final sequence encoding one of said neoepitopes, wherein n is an integer of from 1 to 100, such as from 3 to 50.

wherein said nucleotide construct is applied to the anticancer vaccine in an immunologically effective amount.

93. The cancer vaccine according to any one of items 91 to 92, wherein the second linker is a Serine-Glycine linker.

94. The cancer vaccine according to any one of items 91 to 93, wherein the targeting unit has affinity for a chemokine receptor selected from CCR1, CCR3 and CCR5.

95. The cancer vaccine according to any one of items 91 to 94, wherein the targeting unit comprises an amino acid sequence having at least 80% sequence identity to amino acids 5-70 of the amino acid sequence SEQ ID NO: 1 (MIP1a).

96. A method for selecting a number A of neoepitopes for an individual, said method comprising the steps of:
a. Obtaining one or more neoepitopes from said individual, each neoepitope comprising at least one minimal epitope, wherein each neoepitope comprises at least one mutation such as an immunogenic mutation compared to a reference sequence;
b. Determining MHC I and/or MHC II binding affinity for each of said neoepitopes;
c. Selecting neoepitopes comprising at least one minimal epitope predicted to bind to MHC I and/or to MHC II, thereby obtaining MHC binding neoepitopes;
d. Ranking the MHC binding neoepitopes with respect to their likelihood of clinical utility;
e. Selecting A neoepitopes among the highest ranking MHC binding neoepitopes, wherein A is an integer and A is at least 3, such as at least 4, such as at least 5, thereby selecting A neoepitopes capable of inducing a CD8+ T cell response when administered in an immunologically active amount to an individual.

97. The method according to item 96, wherein the method further comprises any of the features of the method according to any one of items 1 to 78.

98. A method for selecting a number A of neoepitopes for an individual suffering from or suspected of suffering from cancer, said method comprising the steps of:
a. Obtaining one or more neoepitopes from said individual, each neoepitope comprising at least one minimal epitope, wherein each neoepitope comprises at least one mutation such as an immunogenic mutation compared to a reference sequence, wherein the minimal epitope consists of a number of amino acids equal to or smaller than the number of amino acids of the neoepitope and comprises said at least one mutation; wherein preferably obtaining the neoepitopes comprises the step of identifying mutations in nucleic acid sequences which are specific for the tumor;
b. Determining MHC I and/or MHC II binding affinity for at least one minimal epitope, such as at least two, three or four minimal epitopes within each of said neoepitopes, optionally wherein the binding affinity is determined by in silico prediction;
c. Selecting neoepitopes comprising at least one minimal epitope predicted to bind to MHC I and/or to MHC II, thereby obtaining MHC binding neoepitopes;
d. Ranking the MHC binding neoepitopes with respect to their likelihood of clinical utility;
e. Selecting A neoepitopes among the highest ranking MHC binding neoepitopes, thereby selecting A neoepitopes likely to have clinical utility, wherein step d further comprises ranking the neoepitopes as follows:
i) determining whether the mutation is in an anchoring position or a non-anchoring position of the minimal neoepitope for each minimal epitope comprised within the neoepitope;
ii) prioritizing the neoepitopes,
optionally wherein prioritizing the neoepitopes in step ii) is performed by assigning to each neoepitope the highest score of the minimal epitopes they comprise, and wherein the prioritizing of the neoepitopes is performed as follows:
1) if the mutation is in an anchoring position and the binding differential of the minimal epitope is equal to or greater than 20, the minimal epitope has the highest score;
2) if the mutation is in a non-anchoring position and the binding differential of the minimal epitope is equal to or greater than 20, the score of the minimal epitope is lower than the score for the minimal epitopes of 1);
3) if the mutation is in an anchoring position and the binding differential of the minimal epitope is lower than 20 and equal to or greater than 3, the score of the minimal epitope is lower than the score the minimal epitopes of 2);
4) if the mutation is in a non-anchoring position and the binding differential of the minimal epitope is lower than 20 and equal to or greater than 3, the score of the minimal epitope is lower than the score the minimal epitopes of 3);
5) if the mutation is in an anchoring position and the binding differential of the minimal epitope is less than 3 and equal to or greater than 1, the score of the minimal epitope is lower than the score of the minimal epitopes of 4);
6) if the mutation is in a non-anchoring position and the binding differential of the minimal epitope is less than 3 and equal to or greater than 1, the score of the minimal epitope is lower than the score of the minimal epitopes of 5);
7) if the minimal epitope has a mutation with a binding differential lower than 1, regardless of the position of the mutation, the minimal epitope has the lowest score.

99. A method for selecting a number A of neoepitopes for an individual suffering from or suspected of suffering from cancer, said method comprising the steps of:
a. Obtaining one or more neoepitopes from said individual, each neoepitope comprising at least one minimal epitope, wherein each neoepitope comprises at least one mutation such as an immunogenic mutation compared to a reference sequence, wherein the minimal epitope consists of a number of amino acids equal to or smaller than the number of amino acids of the neoepitope and comprises said at least one mutation; wherein preferably obtaining the neoepitopes comprises the step of identifying mutations in nucleic acid sequences which are specific for the tumor;
b. Determining MHC I and/or MHC II binding affinity for at least one minimal epitope, such as at least two, three or four minimal epitopes within each of said neoepitopes, optionally wherein the binding affinity is determined by in silico prediction;
c. Selecting neoepitopes comprising at least one minimal epitope predicted to bind to MHC I and/or to MHC II, thereby obtaining MHC binding neoepitopes;
d. Ranking the MHC binding neoepitopes with respect to their likelihood of clinical utility;
e. Selecting A neoepitopes among the highest ranking MHC binding neoepitopes, thereby selecting A neoepitopes likely to have clinical utility,
wherein step d comprises ranking the neoepitopes with respect to the number of minimal epitopes they comprise, where a higher number of minimal epitopes gives a higher rank.

100. A method for selecting a number A of neoepitopes for an individual suffering from or suspected of suffering from cancer, said method comprising the steps of:
a. Obtaining one or more neoepitopes from said individual, each neoepitope comprising at least one minimal epitope, wherein each neoepitope comprises at least one mutation such as an immunogenic mutation compared to a reference sequence, wherein the minimal epitope consists of a number of amino acids equal to or smaller than the number of amino acids of the neoepitope and comprises said at least one mutation; wherein preferably obtaining the neoepitopes comprises the step of identifying mutations in nucleic acid sequences which are specific for the tumor;
b. Determining MHC I and/or MHC II binding affinity for at least one minimal epitope, such as at least two, three or four minimal epitopes within each of said neoepitopes, optionally wherein the binding affinity is determined by in silico prediction;
c. Selecting neoepitopes comprising at least one minimal epitope predicted to bind to MHC I and/or to MHC II, thereby obtaining MHC binding neoepitopes;
d. Ranking the MHC binding neoepitopes with respect to their likelihood of clinical utility;
e. Selecting A neoepitopes among the highest ranking MHC binding neoepitopes, thereby selecting A neoepitopes likely to have clinical utility,
wherein step d comprises ranking the neoepitopes with respect to the number of samples in which they are found, wherein neoepitopes found in a higher number of samples are ranked higher than neoepitopes found in a lower number of samples, preferably wherein the samples are samples from different lesions.

101. The method according to any one of items 99 to 100, wherein the method further comprises any of the features of the method according to any one of items 1 to 78.

The invention claimed is:

1. A method for producing a cancer vaccine composition comprising one or more nucleic acid sequences encoding a number A of neoepitopes, wherein A is an integer from 3 to 100, said method comprising:

A) Producing A nucleic acid sequences encoding said A neoepitopes selected by a method comprising the steps of:
   a) Obtaining one or more nucleic acid sequence encoding one or more neoepitopes from an individual having or suspected of having cancer comprising a tumor, each neoepitope comprising at least one minimal epitope, wherein each neoepitope comprises at least one mutation compared to a reference sequence, wherein the at least one minimal epitope consists of a number of amino acids equal to or smaller than the number of amino acids of the neoepitope and comprises said at least one mutation; wherein the one or more nucleic acid sequences encoding the neoepitopes comprise at least one mutation which is specific for the tumor;

b) Measuring a MHC I and/or MHC II binding affinity for the at least one minimal epitope and a corresponding reference peptide, wherein the binding affinity is determined by in silico prediction by calculating a % Rank score, wherein a low % Rank score indicates a strong binding affinity and a high % Rank score indicates a weak binding affinity, and wherein the corresponding reference peptide is obtained from body fluid or healthy tissue of the same individual or in a normal, healthy population;

c) Producing said A nucleic acid sequences,
   wherein said A neoepitopes comprise at least three of the top ten highest ranking MHC binding neoepitopes comprising at least one minimal epitope predicted to bind to MHC I and/or to MHC II, when ranked with respect to their likelihood of clinical utility by:
   i) determining the number of minimal epitopes comprised in the MHC binding neoepitopes, wherein neoepitopes comprising a high number of minimal epitopes are ranked higher than neoepitopes comprising a lower number of minimal epitopes;
   ii) determining a MHC I binding differential of the MHC I binding neoepitopes, wherein the MHC I binding differential is given by the formula (% Rank score (MHC I) for reference)/(% Rank score (MHC I) for neoepitope) wherein neoepitopes with a high MHC I binding differential are ranked higher than neoepitopes with a lower MHC I binding differential;
   iii) determining whether the at least one mutation is in an anchoring position or a non-anchoring position of the minimal neoepitope for each minimal epitope comprised within the neoepitopes, wherein minimal neoepitopes with the mutation in an anchoring position are prioritized;
   iv) prioritizing the MHC I binding neoepitopes with respect to their MHC I rank, wherein neoepitopes with a low % Rank score (MHC I) are ranked higher than neoepitopes with a higher % Rank score (MHC I), wherein the % Rank score (MHC I) of a neoepitope comprising one or more minimal epitopes predicted to bind to MHC I is equal to the lowest % Rank score (MHC I) of said one or more minimal epitopes; and
   v) determining a BLOSUM score, wherein the MHC I binding neoepitopes are prioritized with respect to their BLOSUM score in a descending order, wherein the BLOSUM score of a neoepitope is equal to the BLOSUM score of the best ranking minimal epitope it comprises, wherein a minimal epitope with a BLOSUM score <2 is prioritized; and B) Producing the cancer vaccine composition comprising said A nucleic acid sequences encoding said A neoepitopes produced in step (A).

2. The method according to claim 1, wherein said at least one mutation in the nucleic acid sequence is identified from one or more samples derived from tumor cells of the individual compared to the reference sequence of a reference sample obtained from a healthy tissue of the individual or from a healthy individual.

3. The method according to claim 1, wherein the MHC I binding and/or MHC II binding neoepitopes measured in step b are found in at least two samples derived from tumor cells of the individual.

4. The method according to claim 1, wherein the neoepitope comprises from 1 to 50 minimal epitopes.

5. The method according to claim 1, wherein the selected neoepitopes used in step c comprise at least one minimal epitope predicted to bind to MHC I and at least one minimal epitope predicted to bind to MHC II.

6. The method according to claim 1, wherein step c iv comprises prioritizing neoepitopes having a % Rank score (MHC I) below 2.0.

7. The method according to claim 1, wherein said neoepitopes have a length of 7 to 40 amino acids.

8. The method according to claim 1, wherein the neoepitopes of step c, iii are ranked by assigning to each neoepitope the highest score of the minimal epitopes they comprise, and wherein the ranking of the neoepitopes is performed in a descending order 1) to 7) as follows:
   1) if the mutation is in an anchoring position and the binding differential of the minimal epitope is equal to or greater than 20, the minimal epitope has the highest score;
   2) if the mutation is in a non-anchoring position and the binding differential of the minimal epitope is equal to or greater than 20, the score of the minimal epitope is lower than the score for the minimal epitopes of 1);
   3) if the mutation is in an anchoring position and the binding differential of the minimal epitope is lower than 20 and equal to or greater than 3, the score of the minimal epitope is lower than the score of the minimal epitopes of 2);
   4) if the mutation is in a non-anchoring position and the binding differential of the minimal epitope is lower than 20 and equal to or greater than 3, the score of the minimal epitope is lower than the score of the minimal epitopes of 3);
   5) if the mutation is in an anchoring position and the binding differential of the minimal epitope is less than 3 and equal to or greater than 1, the score of the minimal epitope is lower than the score of the minimal epitopes of 4);
   6) if the mutation is in a non-anchoring position and the binding differential of the minimal epitope is less than 3 and equal to or greater than 1, the score of the minimal epitope is lower than the score of the minimal epitopes of 5;
   7) if the minimal epitope has a mutation with a binding differential lower than 1, regardless of the position of the mutation, the minimal epitope has the lowest score.

9. The method according to claim 1, wherein the vaccine comprises a polynucleotide comprising a targeting unit, a dimerization unit, and an antigenic unit, wherein the antigenic unit comprises the A nucleic acid sequences encoding the A neoepitopes.

10. The method according to claim 1, wherein in step b) MHC I binding affinity and MHC II binding affinity are determined for at least one minimal epitope.

11. The method according to claim 1, wherein the selected neoepitopes used in step c comprise at least one minimal epitope predicted to bind to MHC I.

12. The method according to claim 1, wherein neoepitopes found in more than one sample derived from tumor cells are ranked higher than neoepitopes found in only one sample derived from tumor cells.

13. The method according to claim 1, further comprising a step of measuring the RNA expression levels of said neoepitopes, wherein neoepitopes with a high RNA expression level are ranked higher than neoepitopes with a low RNA expression level.

14. The method according to claim 1, further comprising a step of measuring the allele frequency of mutations present in the MHC binding neoepitopes, wherein neoepitopes with an allele frequency greater than 0.05 are ranked higher than neoepitopes with lower allele frequency.

15. The method according to claim 1, wherein neoepitopes comprising at least 5 MHC binding minimal epitopes are ranked higher than neoepitopes comprising less than 5 MHC binding minimal epitopes.

16. The method according to claim 1, wherein MHC I binding neoepitopes having a % Rank score (MHC I) above 10 are excluded or down-prioritized.

17. The method according to claim 1, wherein neoepitopes encoded by a nucleic acid sequence comprised in a gene showing at least 5-fold higher RNA expression level in a given organ or tissue compared to other organs or tissues, are excluded or down-prioritized.

18. The method according to claim 1, wherein in step c, steps ii and iii are performed at the same time.

19. The method according to claim 1, wherein the at least one mutation is identified by at least two different variant callers.

20. The method according to claim 1, wherein neoepitopes which do not comprise any minimal epitopes predicted to bind to MHC I are down-prioritized or excluded in the ranking or excluded from being selected for use in step c.

* * * * *

SEQUENCE LISTING

```
<160> NUMBER OF SEQ ID NOS: 5

<210> SEQ ID NO 1
<211> LENGTH: 93
<212> TYPE: PRT
<213> ORGANISM: Homo sapiens

<400> SEQUENCE: 1

Met Gln Val Ser Thr Ala Ala Leu Ala Val Leu Leu Cys Thr Met Ala
1               5                   10                  15

Leu Cys Asn Gln Val Leu Ser Ala Pro Leu Ala Ala Asp Thr Pro Thr
            20                  25                  30

Ala Cys Cys Phe Ser Tyr Thr Ser Arg Gln Ile Pro Gln Asn Phe Ile
        35                  40                  45

Ala Asp Tyr Phe Glu Thr Ser Ser Gln Cys Ser Lys Pro Ser Val Ile
    50                  55                  60

Phe Leu Thr Lys Arg Gly Arg Gln Val Cys Ala Asp Pro Ser Glu Glu
65                  70                  75                  80
```

```
Trp Val Gln Lys Tyr Val Ser Asp Leu Glu Leu Ser Ala
                85                  90

<210> SEQ ID NO 2
<211> LENGTH: 5
<212> TYPE: PRT
<213> ORGANISM: Artificial sequence
<220> FEATURE:
<223> OTHER INFORMATION: Linkers
<220> FEATURE:
<221> NAME/KEY: MISC_FEATURE
<222> LOCATION: (1)..(5)
<223> OTHER INFORMATION: linker

<400> SEQUENCE: 2

Gly Gly Gly Ser Ser
1               5

<210> SEQ ID NO 3
<211> LENGTH: 5
<212> TYPE: PRT
<213> ORGANISM: Artificial sequence
<220> FEATURE:
<223> OTHER INFORMATION: Linkers
<220> FEATURE:
<221> NAME/KEY: MISC_FEATURE
<222> LOCATION: (1)..(5)
<223> OTHER INFORMATION: linker

<400> SEQUENCE: 3

Gly Gly Gly Ser Gly
1               5

<210> SEQ ID NO 4
<211> LENGTH: 5
<212> TYPE: PRT
<213> ORGANISM: Artificial sequence
<220> FEATURE:
<223> OTHER INFORMATION: Linkers
<220> FEATURE:
<221> NAME/KEY: MISC_FEATURE
<222> LOCATION: (1)..(5)
<223> OTHER INFORMATION: linker

<400> SEQUENCE: 4

Gly Gly Gly Gly Ser
1               5

<210> SEQ ID NO 5
<211> LENGTH: 10
<212> TYPE: PRT
<213> ORGANISM: Artificial sequence
<220> FEATURE:
<223> OTHER INFORMATION: Linkers
<220> FEATURE:
<221> NAME/KEY: MISC_FEATURE
<222> LOCATION: (1)..(10)
<223> OTHER INFORMATION: linker

<400> SEQUENCE: 5

Gly Gly Gly Gly Ser Gly Gly Gly Ser
1               5                   10
```